United States Patent
Tanaka et al.

(10) Patent No.: US 9,414,059 B2
(45) Date of Patent: Aug. 9, 2016

(54) IMAGE PROCESSING DEVICE, IMAGE CODING METHOD, AND IMAGE PROCESSING METHOD

(75) Inventors: Takeshi Tanaka, Osaka (JP); Hiroshi Amano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 566 days.

(21) Appl. No.: 13/877,389

(22) PCT Filed: Oct. 3, 2011

(86) PCT No.: PCT/JP2011/005575
§ 371 (c)(1),
(2), (4) Date: Apr. 2, 2013

(87) PCT Pub. No.: WO2012/046435
PCT Pub. Date: Apr. 12, 2012

(65) Prior Publication Data
US 2013/0188723 A1    Jul. 25, 2013

(30) Foreign Application Priority Data
Oct. 4, 2010    (JP) .................................. 2010-224547

(51) Int. Cl.
*H04N 7/12* (2006.01)
*H04N 19/503* (2014.01)
(Continued)

(52) U.S. Cl.
CPC ....... *H04N 19/00575* (2013.01); *H04N 19/176* (2014.11); *H04N 19/43* (2014.11); *H04N 19/436* (2014.11); *H04N 19/44* (2014.11); *H04N 19/61* (2014.11)

(58) Field of Classification Search
USPC .................................................... 375/240.16
See application file for complete search history.

(56) References Cited

U.S. PATENT DOCUMENTS

| 6,714,686 B2 | 3/2004 | Hashimoto |
| 8,218,642 B2 | 7/2012 | Gao et al. |

(Continued)

FOREIGN PATENT DOCUMENTS

| CN | 1529512 | 9/2004 |
| CN | 101673391 | 3/2010 |

(Continued)

OTHER PUBLICATIONS

International Search Report issued Jan. 10, 2012 in corresponding International Application No. PCT/JP2011/005575.

(Continued)

*Primary Examiner* — Tracy Li
(74) *Attorney, Agent, or Firm* — Wenderoth, Lind & Ponack, L.L.P.

(57) ABSTRACT

Provided is an image processing device which performs plural processes efficiently, by pipelining, on a coded stream obtained by coding an image based on various coding unit blocks. The image processing device which performs plural first processes, by pipelining, on a coded stream obtained by dividing an image into plural coding unit blocks having at least two sizes, and coding the image on a coding unit block-by-block basis includes: plural first process units which perform, by the pipelining, the plural first processes on the coded stream by each executing one of the plural first processes; and a control unit which divides the coded stream into plural first processing unit blocks each having a first size, and control the plural first process units to cause the plural first processes to be executed for each of the first processing unit blocks.

17 Claims, 51 Drawing Sheets

(51) Int. Cl.
*H04N 19/176* (2014.01)
*H04N 19/61* (2014.01)
*H04N 19/44* (2014.01)
*H04N 19/43* (2014.01)
*H04N 19/436* (2014.01)

(56) References Cited

U.S. PATENT DOCUMENTS

| | | | |
|---|---|---|---|
| 8,363,936 B2 | 1/2013 | Divorra Escoda et al. | |
| 8,581,913 B2 | 11/2013 | Nakazono et al. | |
| 8,588,304 B2 | 11/2013 | Amano et al. | |
| 8,654,847 B2 | 2/2014 | Amano et al. | |
| 8,754,895 B2 | 6/2014 | Gala | |
| 8,873,631 B2 | 10/2014 | Amano et al. | |
| 2002/0015445 A1 | 2/2002 | Hashimoto | |
| 2005/0111551 A1* | 5/2005 | Sato | H04N 19/51 375/240.16 |
| 2006/0239354 A1 | 10/2006 | Amano et al. | |
| 2008/0181522 A1* | 7/2008 | Hosaka | H04N 19/63 382/251 |
| 2009/0060039 A1 | 3/2009 | Tanaka et al. | |
| 2009/0196517 A1 | 8/2009 | Divorra Escoda et al. | |
| 2010/0060651 A1 | 3/2010 | Gala | |
| 2010/0074337 A1 | 3/2010 | Gao et al. | |
| 2010/0158125 A1 | 6/2010 | Park et al. | |
| 2010/0166053 A1* | 7/2010 | Fukuhara | H04N 19/46 375/240.01 |
| 2010/0169892 A1 | 7/2010 | Stam et al. | |
| 2010/0199071 A1 | 8/2010 | Nakazono et al. | |
| 2010/0295922 A1* | 11/2010 | Cheung | H04N 19/176 348/42 |
| 2012/0087413 A1 | 4/2012 | Amano et al. | |
| 2012/0128069 A1 | 5/2012 | Sato | |
| 2013/0089149 A1 | 4/2013 | Hayashi et al. | |
| 2013/0243096 A1 | 9/2013 | Amano et al. | |
| 2014/0369412 A1 | 12/2014 | Amano et al. | |

FOREIGN PATENT DOCUMENTS

| | | |
|---|---|---|
| CN | 101686388 | 3/2010 |
| CN | 101754019 | 6/2010 |
| CN | 101795381 | 8/2010 |
| JP | 11-252549 | 9/1999 |
| JP | 2001-275116 | 10/2001 |
| JP | 2005-295526 | 10/2005 |
| JP | 2006-311526 | 11/2006 |
| JP | 2008-271127 | 11/2008 |
| JP | 2009-81830 | 4/2009 |
| JP | 2010-502102 | 1/2010 |
| JP | 2011-041037 | 2/2011 |
| WO | 2008/027192 | 3/2008 |
| WO | 2011/161949 | 12/2011 |

OTHER PUBLICATIONS

Reply to Written Opinion issued Jan. 10, 2012 in corresponding International Application No. PCT/JP2011/005575 (with English translation).

Thomas Wiegand et al., "Overview of the H.264/AVC Video Coding Standard", IEEE Transactions on Circuits and Systems for Video Technology, vol. 13, No. 7, Jul. 2003, pp. 560-576.

"Test Model under Consideration", Joint Collaborative Team on Video Coding (JCT-VC) of ITU-T SG16 WP3 and ISO/IEC JTC1/SC29/WG11, JCTVC-A205 (draft007), 1st Meeting: Dresden, DE, Apr. 15-23, 2010.

Chi-Cheng Ju et al., "A 125Mpixels/sec Full-HD MPEG-2/H.264/VC-1 Video Decoder for Blu-ray Applications", IEEE Asian Solid-State Circuits Conference, Nov. 3-5, 2008.

Ting-An Lin et al., "An H.264/AVC Decoder with 4x4-block Level Pipeline", 2005 IEEE International Symposium on Circuits and Systems (ISCAS 2005), May 23-26, 2005.

M. Yasuda et al., "MPEG2 Video Decoder and AC-3 Audio Decoder LSIs for DVD Player", IEEE Transactions on Consumer Electronics, vol. 43, No. 3, Aug. 1997.

Office Action and Search Report issued Oct. 26, 2015 in Chinese Application No. 201180046531.9, with partial English translation.

* cited by examiner

SC: Start code
SH: Slice header

FIG. 7B

|      | CU size   | TU size | PU size         |
|------|-----------|---------|-----------------|
| CU0  | 128 x 128 | 64 x 64 | Inter 128 x 128 |
| CU1  | 64 x 64   | 64 x 64 | Inter 64 x 64   |
| CU2  | 64 x 64   | 64 x 64 | Inter 64 x 64   |
| CU3  | 64 x 64   | 64 x 64 | Inter 64 x 64   |
| CU4  | 64 x 64   | 32 x 32 | Inter 64 x 64   |
| CU5  | 128 x 128 | 64 x 64 | Inter 128 x 128 |
| CU6  | 128 x 128 | 64 x 64 | Inter 128 x 128 |
| CU7  | 128 x 128 | 64 x 64 | Inter 128 x 128 |

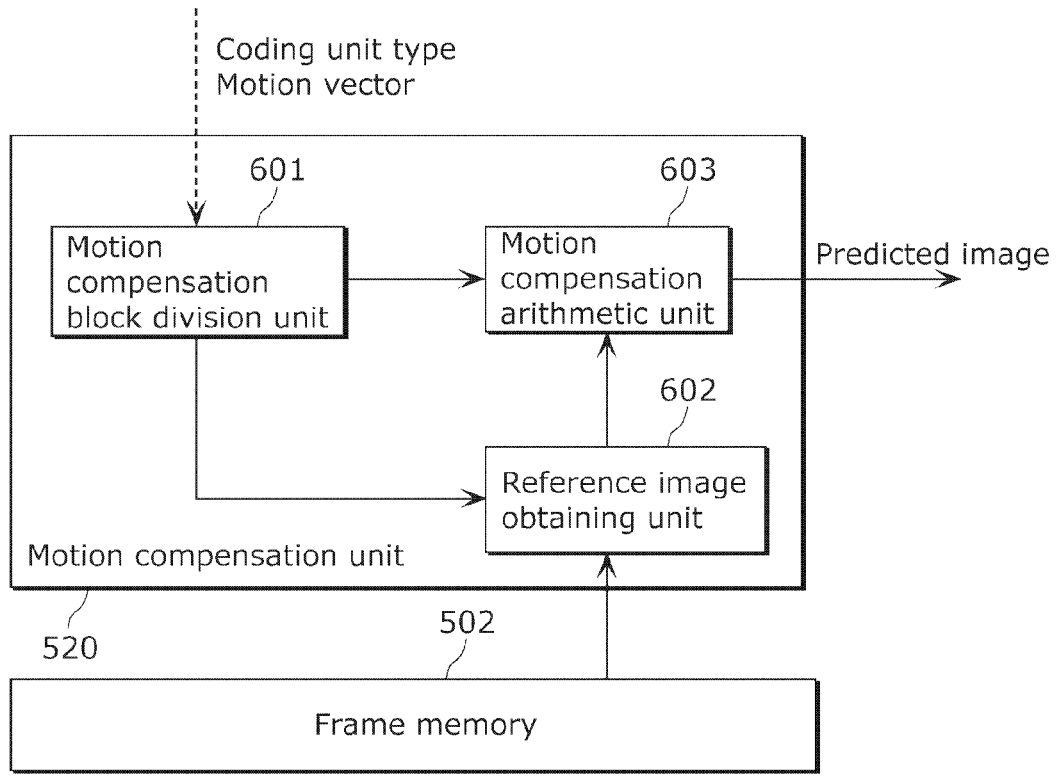
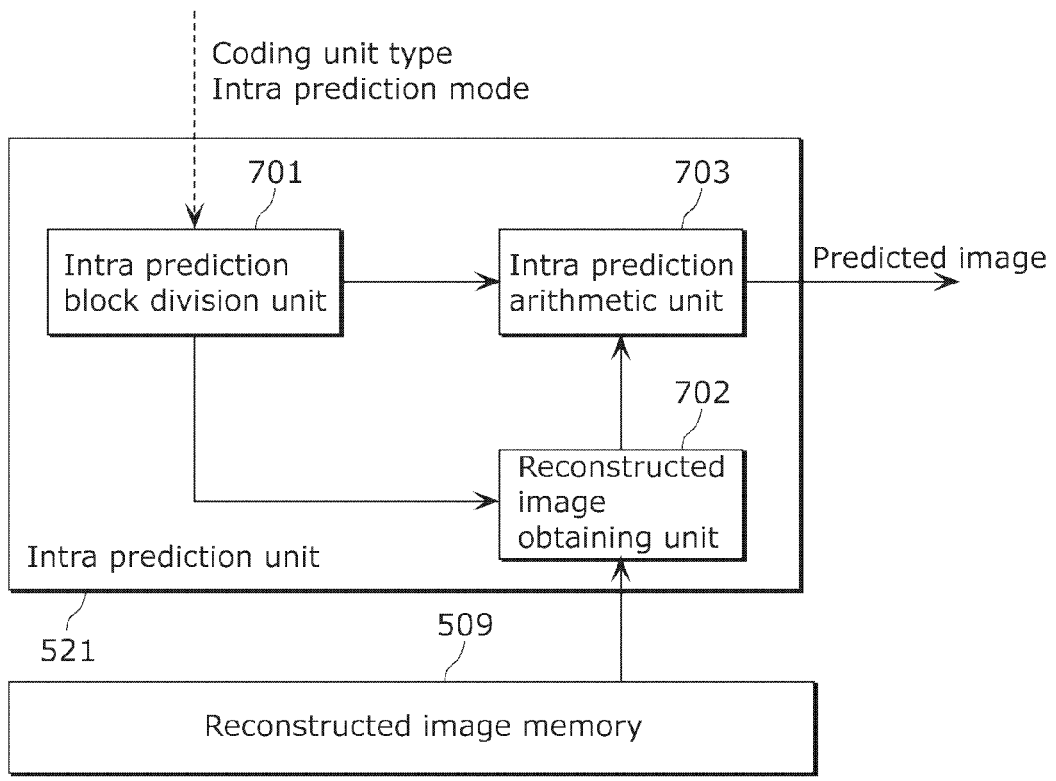

Numbers in parentheses indicate processing order

Numbers in parentheses indicate processing order

Numbers in parentheses indicate processing order

CU10 : Inter prediction
CU11 : Inter prediction
CU12 : Intra prediction
CU13 : Inter prediction

IMAGE PROCESSING DEVICE, IMAGE CODING METHOD, AND IMAGE PROCESSING METHOD

TECHNICAL FIELD

The present invention relates to an image processing device which performs, by pipelining, plural processes on a coded stream obtained by dividing an image into plural coding unit blocks having at least two sizes, and coding the image on a coding unit block-by-block basis.

BACKGROUND ART

An image coding device which codes a moving picture divides pictures which form a moving picture into plural macroblocks each include 16×16 pixels (a macroblock may be abbreviated and referred to as MB). Then, the image coding device codes the macroblocks in the raster scan order. The image coding device generates a coded stream by coding and compressing the moving picture. An image decoding device decodes this coded stream on a macroblock-by-macroblock basis in the raster scan order, and reproduces pictures of the original moving picture.

One conventional image coding system is the ITU-T H.264 standard (see Non-Patent Literature (NPL) 1). An image decoding device reads a coded stream first, in order to decode an image coded in accordance with the H.264 standard. Then, the image decoding device decoding various header information pieces, and thereafter performs variable-length decoding. The image decoding device performs inverse quantization on coefficient information obtained by variable-length decoding, and performs inverse frequency transform, thereby generating a difference image.

Next, the image decoding device performs intra prediction or motion compensation according to a macroblock type obtained by variable-length decoding. The image decoding device thereby generates a predicted image. After that, the image decoding device performs a reconstruction process by adding the difference image to a predicted image. Then, the image decoding device decodes a current image by performing a deblocking filtering process on the reconstructed image.

In this manner, the image decoding device performs processing from the variable-length decoding process through the deblocking filtering process for each macroblock, to decode a coded image. As a technique of accelerating this decoding processing, a technique of executing the decoding processing by pipeline processing for macroblock units is generally used (see PTL 1). In pipeline processing performed for macroblock units, a series of processes from a variable-length decoding process through a deblocking filtering process is divided at some stages. Then, processes at the stages are executed in parallel.

FIG. 62 illustrates an example of pipeline processing performed in the case where the decoding processing described above is divided at five stages. In the example illustrated in FIG. 62, processes from a process at the first stage through a process at the fifth stage are sequentially performed on one macroblock. Then, the processes from the process at the first stage through the process at the fifth stage are simultaneously performed on plural macroblocks different from one another.

At the first stage, the image decoding device performs variable-length decoding on a coded stream, and outputs coding information such as a motion vector, and coefficient information corresponding to data on each pixel. At the second stage, the image decoding device performs inverse quantization and inverse frequency transform on the coefficient information obtained at the first stage, thereby generating a difference image.

At the third stage, the image decoding device performs motion compensation according to a macroblock type obtained by variable-length decoding, thereby generating a predicted image. At the fourth stage, the image decoding device performs a reconstruction process using the difference image obtained at the second stage and one of the predicted image obtained by motion compensation at the third stage and a predicted image obtained by an intra prediction process performed at the fourth stage. At the fifth stage, the image decoding device performs a deblocking filtering process.

In this way, the image decoding device simultaneously processes plural different macroblocks at the stages using pipeline processing. Accordingly, the image decoding device can execute parallel processing, and accelerate decoding processing.

At this time, cycles in time slots (TSs) of pipeline processing are determined based on the longest processing cycle at a stage. Accordingly, if a processing cycle at only a certain stage is long, processes on next macroblocks cannot be started at other stages until the longest process at the stage is completed. Consequently, this causes idle time. To efficiently execute pipeline processing, it is important to make settings such that the time periods for processing cycles included in pipeline processing are as equivalent as possible.

An image coding device in conformity with the H.264 standard codes an image on a macroblock-by-macroblock basis (each macroblock includes 16×16 pixels), as described above. However, 16×16 pixels do not necessarily form an optimal unit for coding. Generally, the higher a correlation between adjacent blocks is, the higher the resolution of an image is. Accordingly, compression efficiency can be further improved by increasing the size of a coding unit.

In recent years, an extremely high definition display has been developed, such as a 4K2K (3840 pixels×2160 pixels) display, for instance. Thus, it is expected that the resolution of an image to be handled will be increasingly high. The image coding device in conformity with the H.264 standard is becoming unable to code such high resolution images efficiently, along with an increase in the resolution of images as described above.

Techniques proposed as next-generation image coding standards include a technique for addressing such a problem (NPL 2). With such a technique, the size of a coding unit block in conformity with the conventional H.264 standard can be changed. The image coding device according to this technique can code an image on a block-by-block basis (each block is larger than a conventional 16×16 pixel block), and appropriately code extremely high definition images.

Specifically, a coding unit (CU) is defined as a data unit for coding in NPL 2. This coding unit is a data unit for which intra prediction for performing intra prediction and inter prediction for performing motion compensation can be switched, and is defined as a most basic block size for coding, as with a macroblock in the conventional coding standard.

The size of such a coding unit is one of 4×4 pixels, 8×8 pixels, 16×16 pixels, 32×32 pixels, 64×64 pixels and 128×128 pixels. A coding unit having the largest size is referred to as a largest coding unit (LCU).

4096-pixel data is included in a 64×64-pixel coding unit. 16384-pixel data is included in a 128×128-pixel coding unit. Thus, a 128×128-pixel coding unit includes 4 times the data of a 64×64-pixel coding unit.

FIG. 63 illustrates examples of plural coding units which include 128×128 pixels and 64×64 pixels. Furthermore, a transform unit (TU) is defined in NPL2. A transform unit is defined as a block size for frequency transform. Specifically, the size of such a transform unit is one of 4×4 pixels, 8×8 pixels, 16×16 pixels, 32×32 pixels, and 64×64 pixels.

In addition, a prediction unit (PU) is further defined as a data unit for intra prediction or inter prediction. The size of a prediction unit is selected from among various rectangular sizes of 4×4 pixels or more within a coding unit, such as 128×128 pixels, 64×128 pixels, 128×64 pixels, and 64×64 pixels.

CITATION LIST

Patent Literature

[PTL 1] Japanese Unexamined Patent Application Publication No. 2005-295526

Non Patent Literature

[NPL 1] Thomas Wiegand et al, "Overview of the H.264/AVC Video Coding Standard", IEEE TRANSACTIONS ON CIRCUITS AND SYSTEMS FOR VIDEO TECHNOLOGY, July 2003, pp. 560-576

[NPL 2] "Test Model Under Consideration (TMuC)", [online], Joint Collaborative Team on Video Coding (JCT-VC), Apr. 15, 2010, accessed on Aug. 27, 2010 <http://wftp3.itu.int/av-arch/jctvc-site/2010_04_A_Dresden/JCTVC-A205.zip>

SUMMARY OF INVENTION

Technical Problem

As described above, NPL2 discloses a technique of improving coding efficiency by allowing the size of a coding unit, namely, a macroblock to be changed. However, if pipeline processing disclosed in PTL1 is applied to such a coding unit of a changeable size, a necessary amount of processing increases in proportion to the number of pixels included in a coding unit. In addition, the number of processing cycles also increases, similarly.

Specifically, when a coded stream includes coding units of different sizes, a time period for a processing cycle at each stage of pipeline processing will greatly differ depending on the size of a coding unit. Accordingly, waiting time in which no processing can be performed is generated at a stage where processing is performed on a small coding unit. Then, processing efficiency of pipelining will fall. Specifically, a coding unit having a changeable size will decrease processing efficiency of the image decoding device.

For example, FIG. 64 illustrates an example in which a coded stream is decoded by pipeline processing at five stages. In this example, as shown in FIG. 63, CU0 is a coding unit including 128×128 pixels, and CU1 to CU4 each include 64×64 pixels. In this case, CU0 is a coding unit including 4 times the pixels of CU1 to CU4 each, and thus a time period for a cycle of processing on CU0 in the cycle will be 4 times the time periods for a cycle of processing on each of the other coding units.

Accordingly, at the first stage, idle time occurs when the process on CU1 at the first stage is completed up to when the process on CU0 at the second stage is completed. At the second stage, idle time occurs similarly when the process on CU1 at the second stage is completed up to when the process on CU0 at the third stage is completed. Also, at the third stage, idle time occurs when the process on CU1 at the third stage is completed up to when the process on CU0 at the fourth stage is completed. Accordingly, idle time during which the process is not performed occurs at all the stages.

In this way, if the size of a coding unit is changed, the amount of pixel data to be processed varies. If a coded stream is decoded by pipeline processing, a unit time for pipeline processing is determined based on a coding unit having a large amount of pixel data. As a result, idle time occurs after processing a coding unit having a small amount of pixel data. Accordingly, processing efficiency and processing performance fall.

In view of this, an object of the present invention is to provide an image processing device which efficiently performs plural processes, by pipelining, on a coded stream obtained by coding an image based on various coding unit blocks.

Solution to Problem

In order to solve the above problems, an image processing device according to the present invention is an image processing device which performs plural first processes, by pipelining, on a coded stream obtained by dividing an image into plural coding unit blocks having at least two sizes and coding the image on a coding unit block-by-block basis, the image processing device including: plural first process units configured to perform, by the pipelining, the plural first processes on the coded stream by each executing one of the plural first processes; and a control unit configured to divide the coded stream into plural first processing unit blocks each having a first size, and control the plural first process units to cause the plural first processes to be executed for each of the first processing unit blocks.

Accordingly, the plural process units perform plural processes on a coded stream by pipelining, based on one size. Thus, idle time is reduced, and operation efficiency improves.

In addition, the plural first process units may be configured to perform, on the coded stream, the plural first processes for decoding the image.

Accordingly, the image is decoded efficiently.

In addition, the control unit may be configured to divide the coded stream into the plural first processing unit blocks by dividing a coding unit block included in the coded stream or uniting at least two coding unit blocks included in the coded stream, and control the plural first process units to cause the plural first processes to be executed for each of the first processing unit blocks.

Accordingly, the plural processing unit blocks are obtained from the plural coding unit blocks. All the plural processing unit blocks have one size. Thus, idle time is reduced, and operation efficiency improves.

In addition, the control unit may be configured to control the plural first process units to cause each of the plural first processes to be executed on each of the plural first processing unit blocks in a predetermined period.

Accordingly, the plural processes are sequentially performed on the plural processing unit blocks in each time slot. Thus, idle time is reduced, and operation efficiency improves.

In addition, the control unit may be configured to divide the coded stream into the plural first processing unit blocks, and control the plural first process units to cause the plural first processes to be executed for each of the first processing unit blocks, the coded stream being obtained by dividing the image into the plural coding unit blocks which are smallest units for each of which inter prediction and intra prediction are switchable, and coding the image on the coding unit block-by-block basis.

Accordingly, an image coded based on the coding unit blocks to increase coding efficiency is processed based on the processing unit blocks to increase processing efficiency.

In addition, the control unit may be configured to divide the coded stream into the plural first processing unit blocks each having the first size predetermined to be a size of a largest coding unit block, and control the plural first process units to cause the plural first processes to be executed for each of the first processing unit blocks.

Accordingly, the plural coding unit blocks are handled as one processing unit block. Thus, idle time is reduced, and operation efficiency improves.

In addition, the control unit may be configured to divide the coded stream into the plural first processing unit blocks each having the first size predetermined to be a size of a largest coding unit which is the largest coding unit block, and control the plural first process units to cause the plural first processes to be executed for each of the first processing unit blocks.

Accordingly, the plural process units perform the plural processes on the coded stream by pipelining, based on a size predetermined in a standard, for instance. Thus, idle time is reduced, and operation efficiency improves.

In addition, the control unit may be configured to divide the coded stream into the plural first processing unit blocks each having the first size predetermined to be a size of a largest frequency transform block, and control the plural first process units to cause the plural first processes to be executed for each of the first processing unit blocks.

Accordingly, pipeline processing is executed based on a smaller size. Thus, operation efficiency improves.

In addition, the plural first process units may include plural second process units configured to execute plural second processes included in the plural first processes, and the control unit may be configured to divide the plural first processing unit blocks into plural second processing unit blocks each having a second size smaller than the first size, and control the plural second process units to cause the plural second processes to be executed for each of the second processing unit blocks.

Accordingly, pipeline processing is executed based on a smaller size. Thus, operation efficiency further improves.

In addition, the plural first process units may include plural second process units configured to execute plural second processes included in the plural first processes, and the control unit may be configured to divide the plural first processing unit blocks into plural second processing unit blocks each having a size equal to or smaller than the first size, and control the plural second process units to cause the plural second processes to be executed for each of the second processing unit blocks.

Accordingly, pipeline processing is executed based on a smaller size. Thus, operation efficiency further improves.

In addition, the control unit may be configured to divide the plural first processing unit blocks into the plural second processing unit blocks to separate luma information and chroma information, and control the plural second process units to cause the plural second processes to be executed for each of the second processing unit blocks.

Accordingly, luma information and chroma information are processed separately. Thus, pipeline processing is executed based on a small size, and operation efficiency improves.

In addition, the plural first process units may include a motion compensation process unit configured to execute a motion compensation process, the control unit may be configured to divide the plural first processing unit blocks into plural third processing unit blocks each having a third size smaller than the first size, and control the motion compensation process unit to cause the motion compensation process to be executed for each of the third processing unit blocks, and the control unit may be configured to divide the plural first processing unit blocks into the plural third processing unit blocks each including the luma information and the chroma information.

Accordingly, luma information and chroma information are processed together in the motion compensation process. Thus, wasteful operation is reduced.

In addition, the plural first process units may include a motion compensation process unit configured to execute a motion compensation process, and when a prediction block to be used for the motion compensation process has a size larger than the first size, the control unit may be configured to divide the prediction block into the plural first processing unit blocks, and control the motion compensation process unit to cause the motion compensation process to be executed for each of the first processing unit blocks.

Accordingly, the amount of information to be exchanged between the motion compensation process unit and other processing units is further reduced. Thus, a circuit size can be decreased.

In addition, the plural first process units may include an intra prediction process unit configured to execute an intra prediction process, and when a prediction block to be used for the intra prediction process has a size larger than the first size, the control unit may be configured to divide the prediction block into the plural first processing unit blocks, and control the intra prediction process unit to cause the intra prediction process to be executed for each of the first processing unit blocks.

Accordingly, the amount of information to be exchanged between the intra prediction process unit and other process units is further reduced. Thus, a circuit size can be decreased.

In addition, the plural first process units may include a deblocking filtering process unit configured to execute a deblocking filtering process for eliminating coding distortion at a block boundary, and the control unit may be configured to control the deblocking filtering process unit to cause the deblocking filtering process to be executed for each of frequency transform blocks according to order in which a frequency transform process has been executed when the image is coded.

Accordingly, the deblocking filtering process is executed based on a small size. Thus, idle time is reduced, and operation efficiency improves.

Furthermore, an image coding method according to the present invention may be an image coding method for coding an image, the method including: dividing the image into plural coding unit blocks having at least two sizes, and executing coding processing on the image on a coding unit block-by-block basis; and executing a deblocking filtering process on one of a vertical boundary and a horizontal boundary and thereafter on the other of the vertical boundary and the horizontal boundary, on a predetermined data unit-by-unit basis different from the coding unit block-by-block basis, the deblocking filtering process being for eliminating coding distortion at a block boundary included in the image on which the coding processing has been executed.

Accordingly, the processing cycle of the deblocking filtering process is made even, and the deblocking filtering process is executed smoothly. In addition, the deblocking filtering process is executed based on a size suitable for the deblocking filtering process, thereby improving processing efficiency.

In addition, an image coding method according to the present invention may be an image coding method for coding an image, the method including: dividing the image into plural coding unit blocks having at least two sizes, and executing coding processing on the image on a coding unit block-by-block basis; and executing a deblocking filtering process for eliminating coding distortion at a block boundary on the coding unit block-by-block basis according to order in which the coding processing has been executed on the image.

Accordingly, idle time between the deblocking filtering process and a process at a previous stage is reduced. Thus, operation efficiency improves. Typically, the same order is used by a coding device and a decoding device. Thus, operation efficiency for the decoding device also improves.

In addition, an image coding method according to the present invention may be an image coding method for coding an image on a coding unit block-by-block basis, the method including: dividing a coding unit block included in the image into plural frequency transform blocks, and executing a frequency transform process on the coding unit block on a frequency transform block-by-block basis; and executing a deblocking filtering process for eliminating coding distortion at a block boundary for each of the frequency transform blocks according to order in which the frequency transform process has been executed on the coding unit block.

Accordingly, the deblocking filtering process is executed based on a small size. Thus, idle time is reduced, and operation efficiency improves.

In addition, an image coding method according to the present invention may be an image coding method for coding an image on a coding unit block-by-block basis, the method including: dividing a coding unit block included in the image into plural frequency transform blocks, and executing a frequency transform process on the coding unit block on a frequency transform block-by-block basis; and coding the coding unit block on which the frequency transform process has been executed, and generating a coded stream in which luma information and chroma information of the image are collectively included for each of the frequency transform blocks.

Accordingly, the decoding device can also execute pipeline processing without separating luma information and chroma information, for each data unit which is the frequency transform block. Thus, operation efficiency improves.

In addition, an image processing method according to the present invention may be an image processing method for performing plural first processes, by pipelining, on a coded stream obtained by dividing an image into plural coding unit blocks having at least two sizes and coding the image on a coding unit block-by-block basis, the image processing method including: (a) performing, by the pipelining, the plural first processes on the coded stream by executing each of the plural first processes; and (b) dividing the coded stream into plural first processing unit blocks each having a first size, and controlling step (a) to cause the plural first processes to be executed for each of the first processing unit blocks.

Accordingly, the image processing device is achieved as an image processing method.

In addition, a program according to the present invention may be a program for causing a computer to execute the image processing method.

Accordingly, the image processing method is achieved as a program.

In addition, an integrated circuit according to the present invention may be an integrated circuit for performing plural first processes, by pipelining, on a coded stream obtained by dividing an image into plural coding unit blocks having at least two sizes and coding the image on a coding unit block-by-block basis, the integrated circuit including: plural first process units configured to perform, by the pipelining, the plural first processes on the coded stream by each executing one of the plural first processes; and a control unit configured to divide the coded stream into plural first processing unit blocks each having a first size, and control the plural first process units to cause the plural first processes to be executed for each of the first processing unit blocks.

Accordingly, the image processing device is achieved as an integrated circuit.

Advantageous Effects of Invention

The present invention allows plural processes to be efficiently performed, by pipelining, on a coded stream obtained by coding an image based on various coding unit blocks.

BRIEF DESCRIPTION OF DRAWINGS

FIG. 7B illustrates details of plural coding units used for describing the operation according to Embodiment 1.

FIG. 13 illustrates a configuration of a motion compensation unit according to Embodiment 3.

FIG. 14 illustrates a configuration of an intra prediction unit according to Embodiment 3.

DESCRIPTION OF EMBODIMENTS

In the following, a detailed description is given of embodiments of the present invention using drawings. It should be noted that the embodiments described below each show a preferred specific example of the present invention. The numerical values, shapes, materials, constituent elements, the arrangement and connection of the constituent elements, steps, the processing order of the steps, and the like described in the following embodiments are mere examples, and thus do not limit the scope of the appended Claims. The present invention is defined only by the scope of the claims. Therefore, although a constituent element which is included in the constituent elements in the embodiments below, and is not described in independent claims each showing the broadest concept of the present invention is not necessarily needed in order to achieve the object of the present invention, such a constituent element will be described for a description of a more preferred configuration.

In addition, expressions such as 128×128 pixels and 64×64 pixels mean sizes such as a 128×128-pixel size and a 64×64-pixel size, respectively.

In addition, in the following, expressions such a block, a data unit, a coding unit (CU) each mean a united area. The expressions may each mean an image area. Alternatively, the expressions may each mean a data area in a coded stream.

In addition, an image may be a moving picture, a still picture, plural pictures which form a moving picture, one picture, or a part of a picture.

Embodiment 1

(1-1. Outline)

First is a description of an outline of an image decoding device according to the present embodiment. An image decoding device according to the present embodiment decodes a coded stream. The size of a coding unit included in a coded stream can be changed. In addition, the image decoding device divides plural processes included in decoding processing at plural stages, and performs the plural processes in parallel by pipelining.

At that time, the image decoding device performs plural processes based on the size of the largest coding unit (LCU). It should be noted that the largest coding unit is a largest one of plural coding units included in a coded stream.

Accordingly, even when plural coding units have various sizes, the amount of data to be processed in each of plural processes included in pipeline processing is equivalent, irrespective of the size of each coding unit. Thus, idle time in pipeline processing is reduced, and pipeline processing is performed efficiently. Thus, processing performance improves.

The above is a description of an outline of the image decoding device according to the present embodiment.

(1-2. Configuration)

Next is a description of a configuration of the image decoding device according to the present embodiment.

Figure 1:
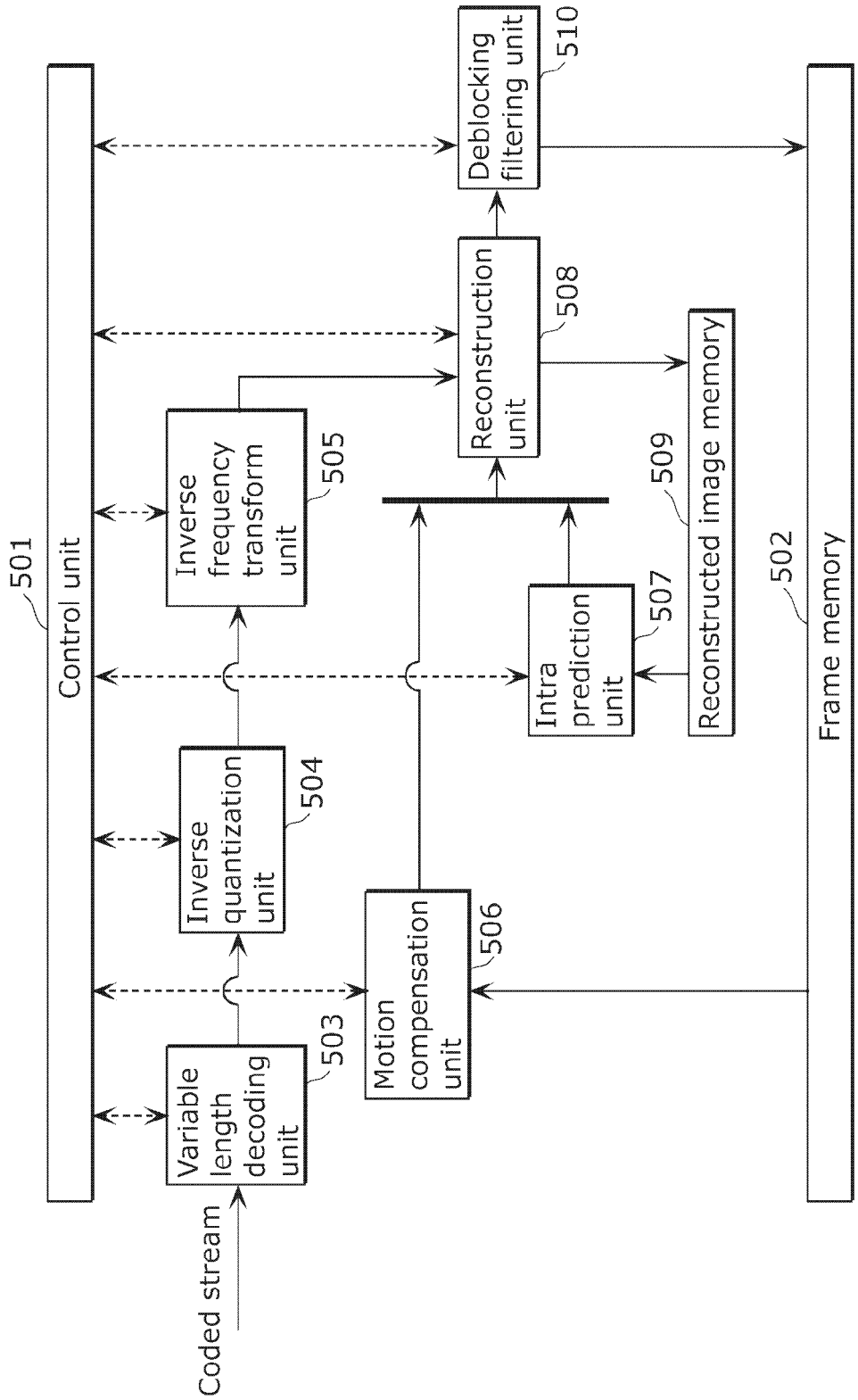
FIG. 1 illustrates a configuration of an image decoding device according to Embodiment 1.

FIG. 1 illustrates a configuration of the image decoding device according to the present embodiment. The image decoding device according to the present embodiment includes: a control unit 501; a frame memory 502; a reconstructed image memory 509; a variable length decoding unit 503; an inverse quantization unit 504; an inverse frequency transform unit 505; a motion compensation unit 506; an intra prediction unit 507; a reconstruction unit 508; and a deblocking filtering unit 510.

The control unit 501 performs overall control. The frame memory 502 is a memory for storing decoded image data. The reconstructed image memory 509 is a memory for storing some of generated reconstructed images. The variable length decoding unit 503 reads a coded stream, and decodes a variable length code. The inverse quantization unit 504 performs inverse quantization. The inverse frequency transform unit 505 performs inverse frequency transform.

The motion compensation unit 506 reads a reference image from the frame memory 502, performs motion compensation, and generates a predicted image. The intra prediction unit 507 reads a reference image from the reconstructed image memory 509, performs intra prediction, and generates a predicted image. The reconstruction unit 508 adds a difference image and a predicted image to generate a reconstructed image, and stores some of such images into the reconstructed image memory 509. The deblocking filtering unit 510 eliminates block noise of a reconstructed image to increase the definition of the reconstructed image.

Figure 2:
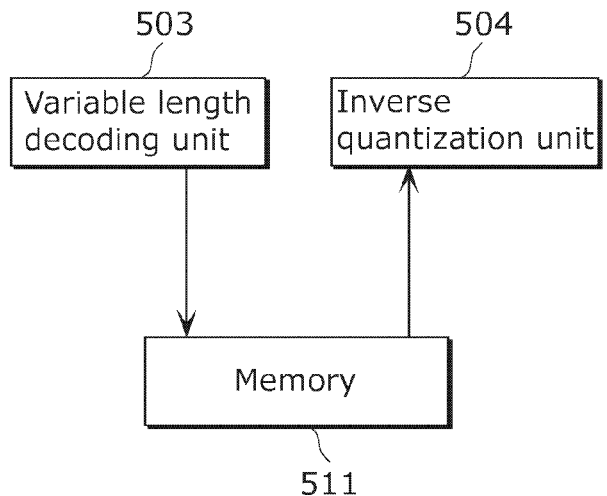
FIG. 2 is a configuration diagram illustrating a connection between a variable length decoding unit and an inverse quantization unit of the image decoding device according to Embodiment 1.

FIG. 2 is a configuration diagram illustrating a connection between the variable length decoding unit 503 and the inverse quantization unit 504. The same numerals are assigned to the same constituent elements as those in FIG. 1, and a description thereof is omitted. The variable length decoding unit 503 and the inverse quantization unit 504 according to the present embodiment are formed so as to be connected to each other via a memory 511 for storing a coefficient. Although FIG. 2 illustrates only a connection between the variable length decoding unit 503 and the inverse quantization unit 504, the process units illustrated in FIG. 1 are connected via an equivalent configuration.

The above is a description of a configuration of the image decoding device according to the present embodiment.

(1-3. Operation)

Next is a description of operation of the image decoding device according to the present embodiment. A coded stream decoded by the image decoding device decodes according to the present embodiment includes a coding unit (CU), and a transform unit (TU) and a prediction unit (PU).

The size of a coding unit (CU) is set to 128×128 pixels to 8×8 pixels, and a coding unit is a data unit for which intra prediction and inter prediction are switchable. The size of a transform unit (TU) is set to 64×64 pixels to 4×4 pixels within a coding unit (CU). The size of a prediction unit (PU) is set to 128×128 pixels to 4×4 pixels within a coding unit (CU), and a prediction unit has an intra prediction mode or a motion vector for inter prediction. In the following, a description is given of a configuration of a coded stream, using FIGS. 3A to 6B.

Figure 3A:
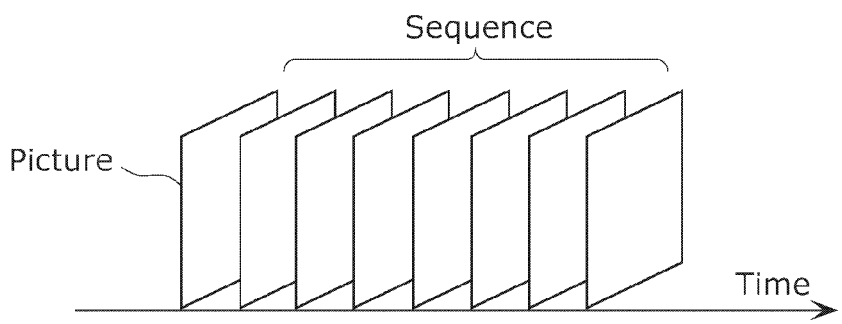
FIG. 3A illustrates a sequence according to Embodiment 1.
Figure 3B:
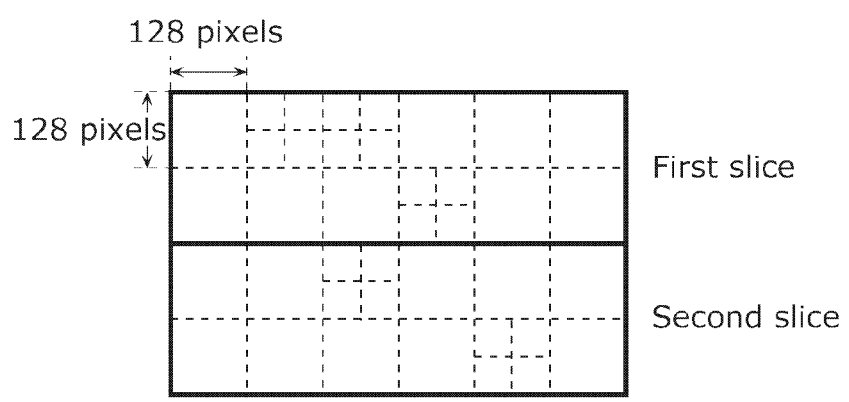
FIG. 3B illustrates a picture according to Embodiment 1.

FIGS. 3A and 3B each illustrate a hierarchical configuration of a coded stream to be decoded by the image decoding device according to the present embodiment. As illustrated in FIG. 3A, a grouping of plural pictures is referred to as a sequence. In addition, as illustrated in FIG. 3B, each picture is divided into slices and, furthermore, each slice is divided into coding units (CUs). A picture may not be divided into slices.

In the present embodiment, the size of the largest coding unit (LCU) is 128×128 pixels. In addition, a 128×128-pixel coding unit (CU) and a 64×64-pixel coding unit (CU) are both included.

Figure 3C:
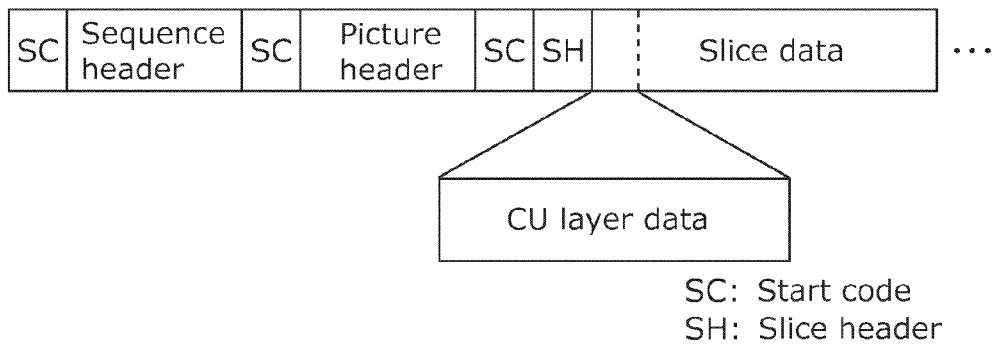
FIG. 3C illustrates a coded stream according to Embodiment 1.

FIG. 3C illustrates a coded stream according to the present embodiment. The coded stream illustrated in FIG. 3C is obtained by hierarchically coding the data illustrated in FIGS. 3A and 3B.

The coded stream illustrated in FIG. 3C includes a sequence header for controlling a sequence, a picture header for controlling a picture, a slice header for controlling a slice, and coding unit layer data (CU layer data). With the H.264 standard, a sequence header is referred to as "sequence parameter set" (SPS), and a picture header is referred to as "picture parameter set" (PPS).

Figure 4A:
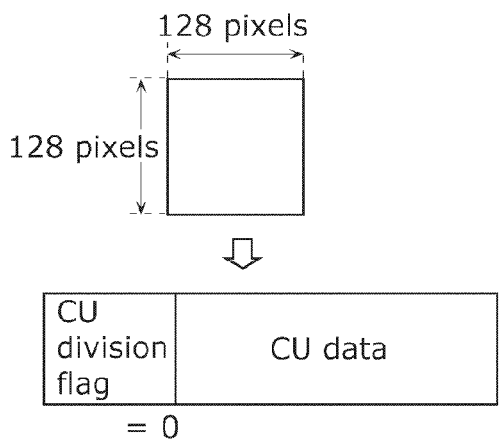
FIG. 4A illustrates an example of a first configuration of a coding unit according to Embodiment 1.
Figure 4B:
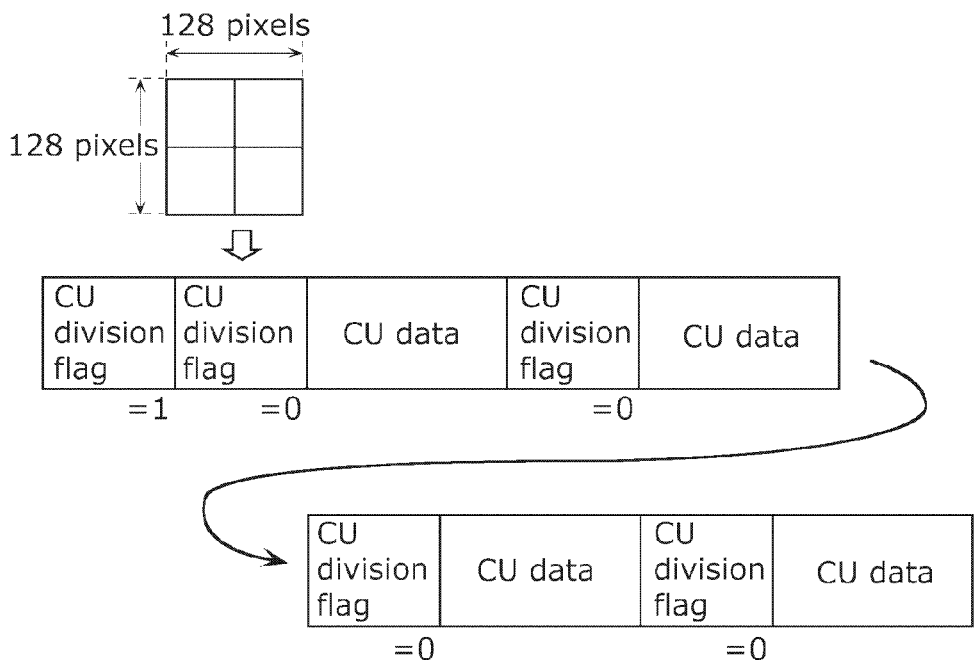
FIG. 4B illustrates an example of a second configuration of the coding unit according to Embodiment 1.

Next, a description is given of configurations of a coding unit and a coded stream which are used for describing the present embodiment, using FIGS. 4A and 4B. A coded stream includes a CU division flag and CU data. This CU division flag indicates that a block is divided into four when the flag is "1", whereas the CU division flag indicates that a block is not divided into four when the flag is "0". In the case of a 128×128-pixel coding unit, a block is not divided as shown in FIG. 4A. Thus, a CU division flag is "0".

As illustrated in FIG. 4B, in the case of four 64×64-pixel coding units, the first CU division flag is "1". This first CU division flag indicates that a 128×128-pixel block is divided into at least four 64×64-pixel blocks. All the four 64×64-pixel blocks are not divided, and thus, the following CU division flag is "0". In this manner, the size of a coding unit is identified as one of the sizes from 128×128 pixels to 4×4 pixels, by a CU division flag.

Figure 5A:
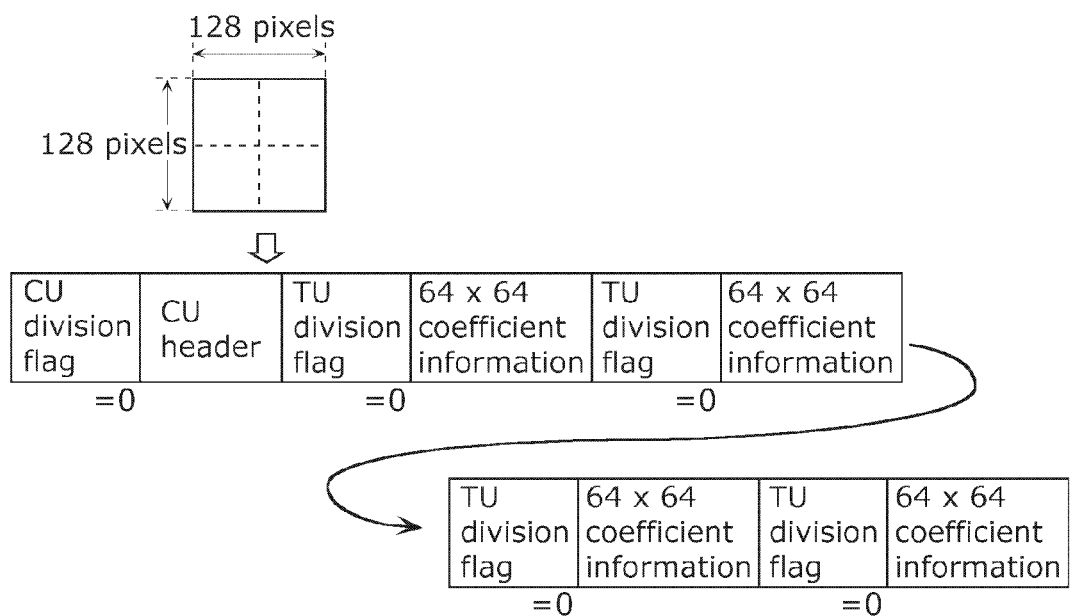
FIG. 5A illustrates an example of a first configuration of a transform unit according to Embodiment 1.
Figure 5B:
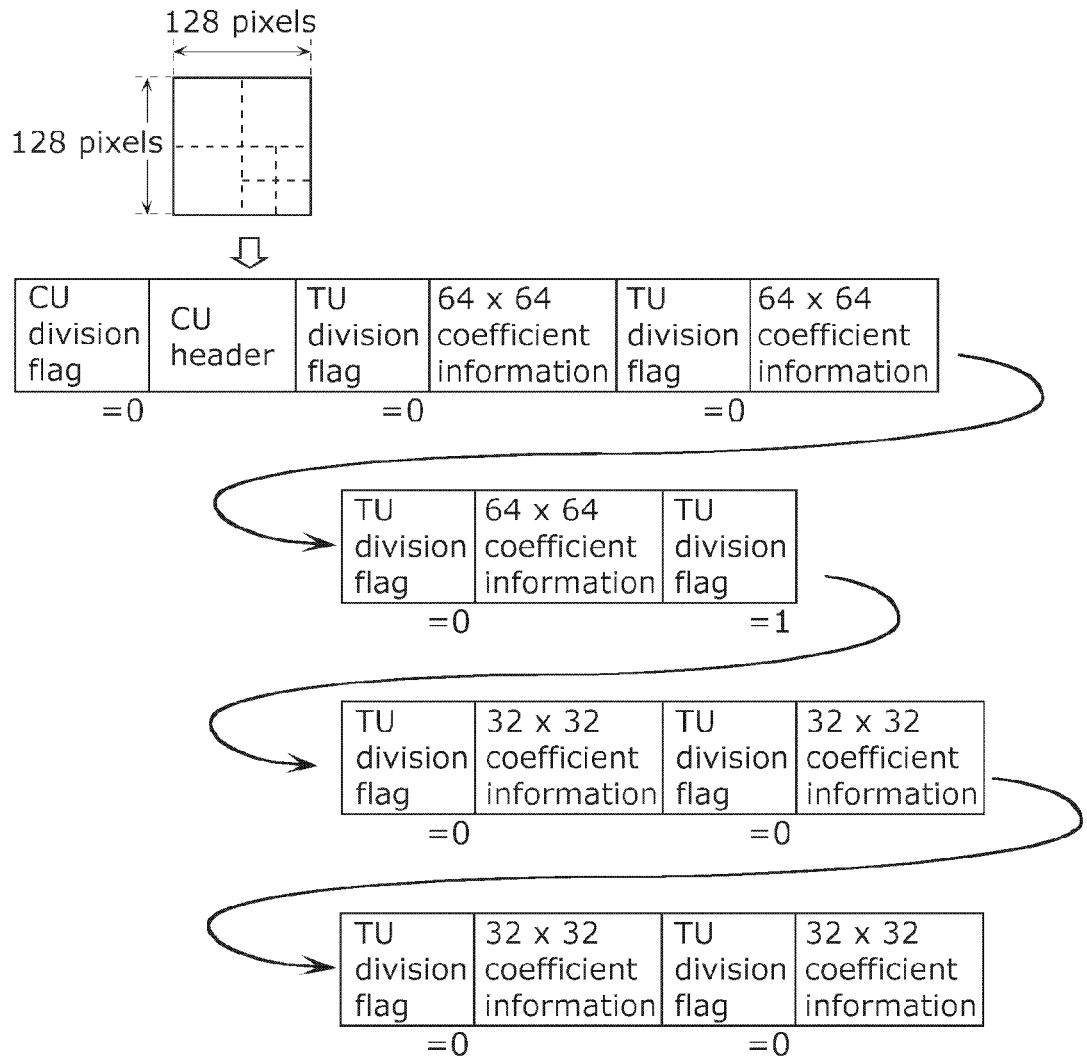
FIG. 5B illustrates an example of a second configuration of the transform unit according to Embodiment 1.

FIGS. 5A and 5B each illustrate an example of a configuration of transform units according to the present embodiment. Furthermore, CU data of each coding unit includes a CU header, a TU division flag, and coefficient information. CU header will be described below. A TU division flag indicates the size of a transform unit in a coding unit, and indicates whether the size thereof is to be divided into four hierarchically, as with a CU division flag.

FIG. 5A illustrates an example in the case where a 128×128-pixel coding unit includes four 64×64-pixel transform units. In the case of a 128×128-pixel coding unit, the maximum size of a transform unit is 64×64 pixels, and thus is always divided into four. In the case of FIG. 5A, all the 64×64-pixel blocks are not divided. Accordingly, all the TU division flags are "0".

FIG. 5B illustrates an example in which a 128×128-pixel coding unit includes three 64×64-pixel transform units and four 32×32-pixel transform units. In this case, a TU division flag having a value of "1" is present.

The transform units in FIGS. 5A and 5B each include luma data (luma information) and chroma data (chroma information). Specifically, in a coded stream, coefficient information which includes both luma data and chroma data is collectively included for each transform unit.

Figure 6A:
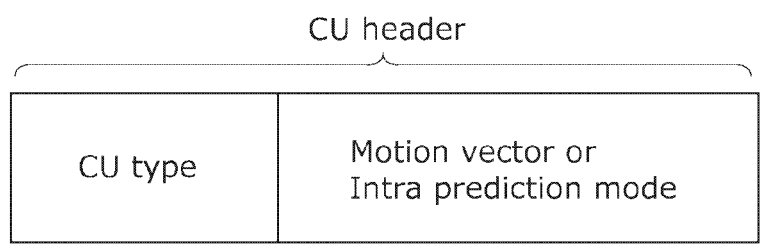
FIG. 6A illustrates a header of the coding unit according to Embodiment 1.
Figure 6B:
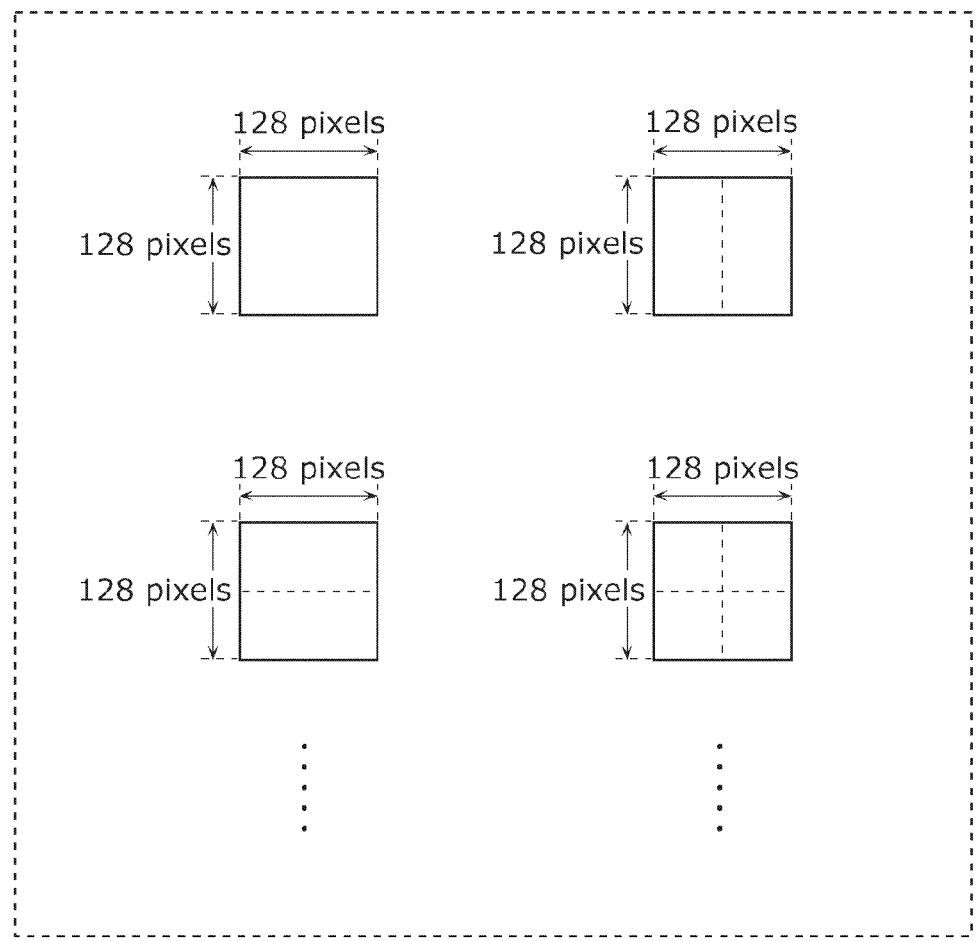
FIG. 6B illustrates prediction units according Embodiment 1.

Next is a description of a CU header. As illustrated in FIG. 6A, a CU header includes a CU type and, further includes a motion vector or an intra prediction mode. The size of a prediction unit is determined according to the CU type. FIG. 6B illustrates prediction units which include 128×128 pixels, 64×128 pixels, 128×64 pixels, and 64×64 pixels. The size of a prediction unit can be selected from the size of 4×4 pixels or more. In addition, the shape of a prediction unit may be rectangular. A motion vector or an intra prediction mode is designated for each prediction unit.

Figure 7A:
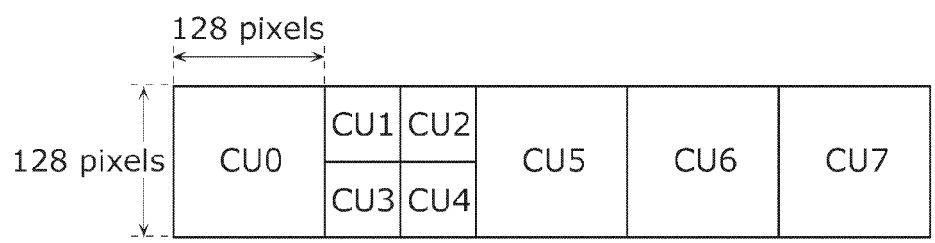
FIG. 7A illustrates an example of a configuration of plural coding units used for describing operation according to Embodiment 1.

Next is a specific description of operation of the image decoding device according to the present embodiment. FIGS. 7A and 7B illustrate examples of configurations of plural coding units used for describing operation. Eight coding units (CU0 to CU7) illustrated in FIG. 7A are used for describing operation.

As illustrated in FIG. 7B, CU0 and CU5 to CU7 are coding units each including 128×128 pixels. CU1 to CU4 are coding units each including 64×64 pixels. The size of a transform unit of CU4 is 32×32 pixels. The size of all the other transform units is 64×64 pixels. The size of a prediction unit of CU0 is 128×128 pixels, the size of prediction units of CU1 to CU4 is 64×64 pixels, and the size of prediction units of CU5 to CU7 is 128×128 pixels.

Figure 8:
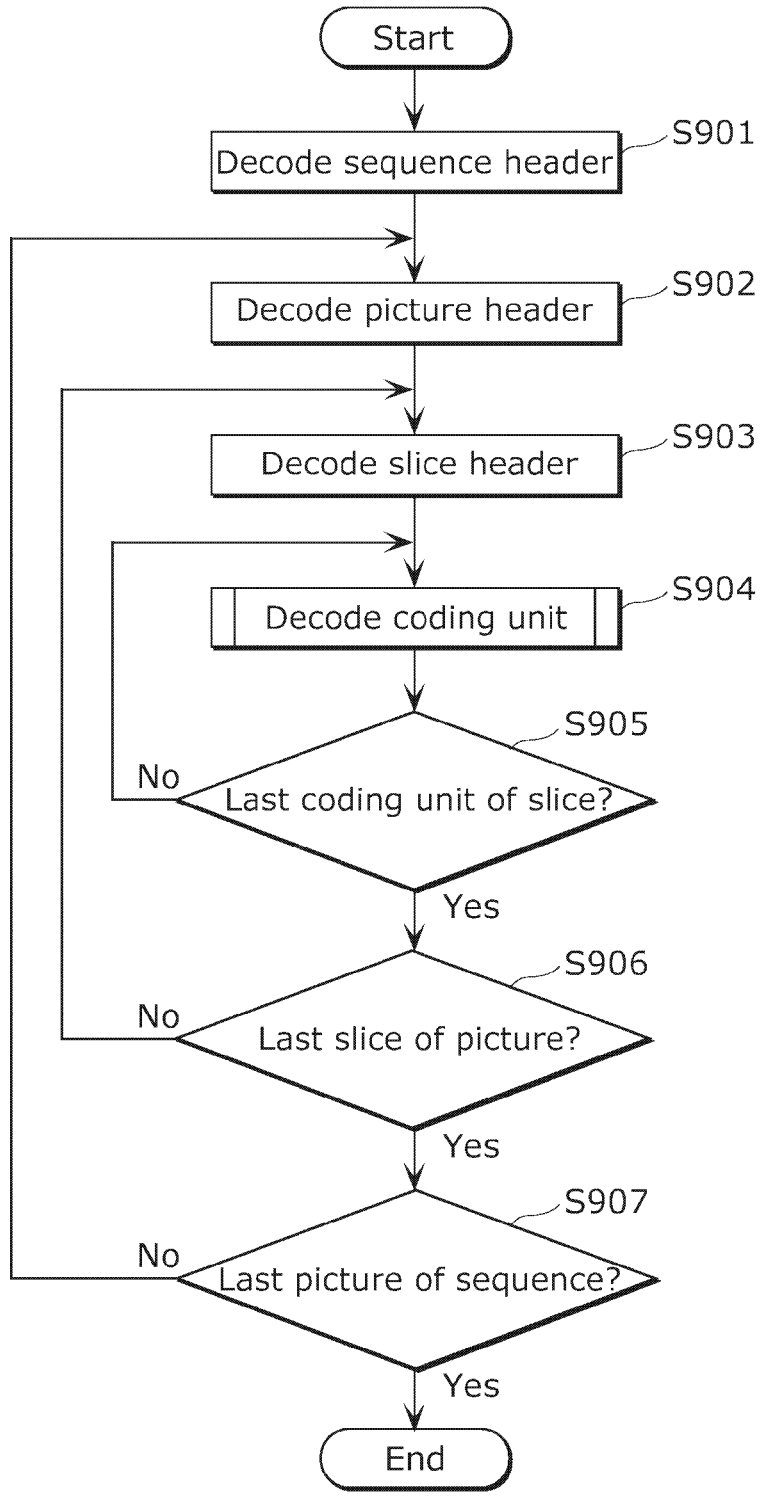
FIG. 8 is a flowchart illustrating operation of the image decoding device according to Embodiment 1.

Next, a description is given of operation of the image decoding device illustrated in FIG. 1, using the flowchart illustrated in FIG. 8. FIG. 8 is a flowchart illustrating decoding operations on one sequence included in a coded stream. As illustrated in FIG. 8, the image decoding device decodes a sequence header, first (S901). At that time, the variable length decoding unit 503 decodes the coded stream under the control of the control unit 501. Next, the image decoding device decodes a picture header (S902), and decodes a slice header (S903), similarly.

Next, the image decoding device decodes a coding unit (S904). A detailed description is given below of decoding a coding unit. The image decoding device determines, after decoding a coding unit, whether the decoded coding unit is the last coding unit of a slice (S905). Then, if the decoded coding unit is not the last coding unit of the slice, the image decoding device decodes another coding unit which is the next coding unit (S904).

Furthermore, the image decoding device determines whether the slice including the decoded coding unit is the last slice of a picture (S906). Then, if the slice is not the last slice of the picture, the image decoding device decodes another slice header (S903).

Furthermore, the image decoding device determines whether a picture including the decoded coding unit is the last picture of a sequence (S907). Then, if the picture is not the last picture of the sequence, the image decoding device decodes another picture header, (S902). The image decoding device ends a series of decoding operations after decoding all the pictures of the sequence.

Figure 9:
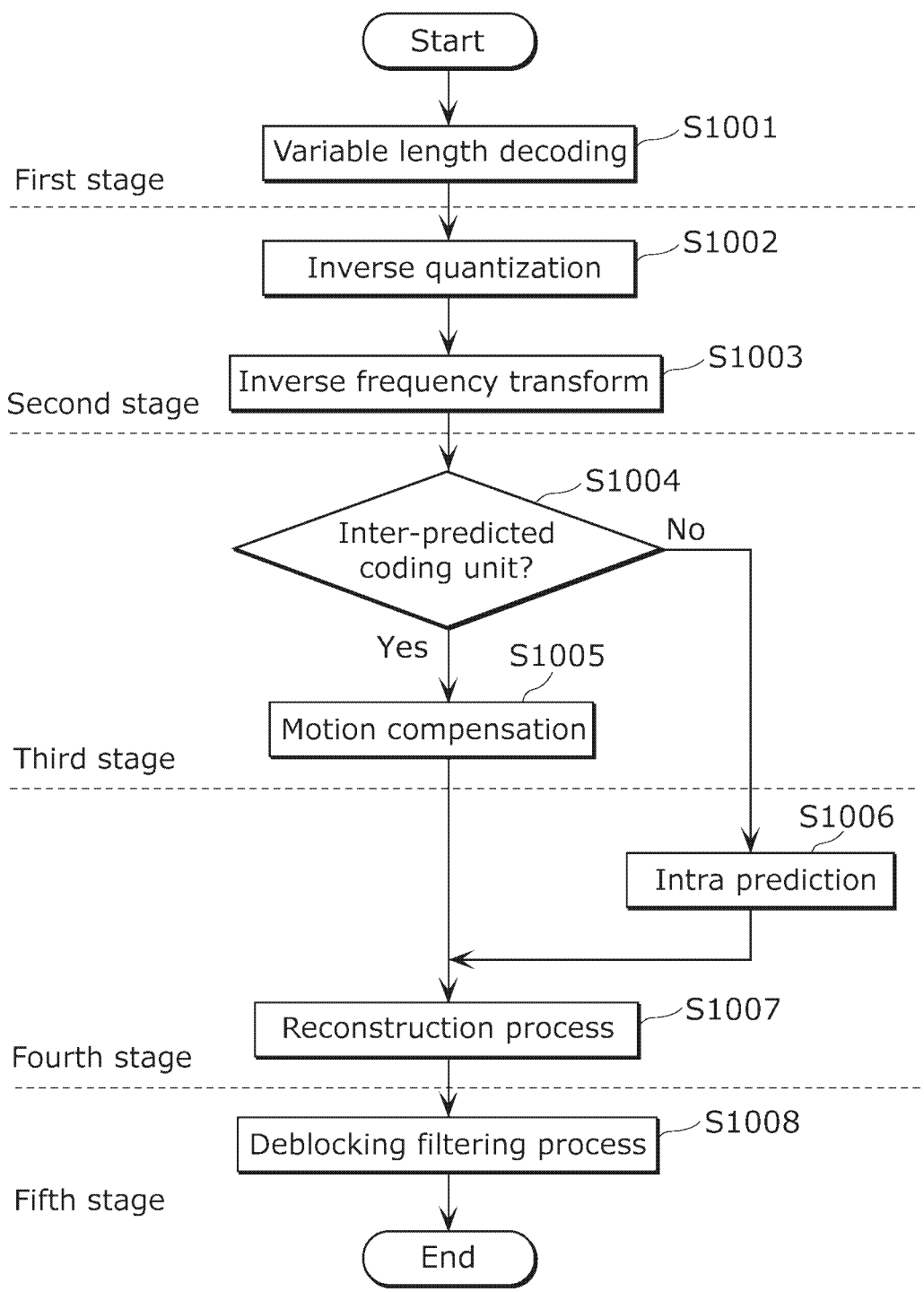
FIG. 9 is a flowchart illustrating decoding processing on a coding unit according to Embodiment 1.

Next, a description is given of operation of decoding a coding unit (S904) illustrated in FIG. 8, using the flowchart illustrated in FIG. 9. FIG. 9 is a flowchart illustrating decoding operations on one coding unit.

First, the variable length decoding unit 503 performs variable-length decoding on a current coding unit to be processed, which is included in an inputted coded stream (S1001). In a variable-length decoding process (S1001), the variable length decoding unit 503 outputs coding information such as a coding unit type, an intra prediction mode, motion vector information, and a quantization parameter, and outputs coefficient information corresponding to each pixel data. Coding information is outputted to the control unit 501, and thereafter is inputted to each process unit. The coefficient information is outputted to the next inverse quantization unit 504. Next, the inverse quantization unit 504 performs an inverse quantization process (S1002). After that, the inverse frequency transform unit 505 performs inverse frequency transform, and generates a difference image (S1003).

Next, the control unit 501 determines which of inter prediction and intra prediction is used for the current coding unit to be processed (S1004). If inter prediction is used, the control unit 501 starts the motion compensation unit 506, and the motion compensation unit 506 generates a predicted images having, for instance, ½ pixel accuracy or ¼ pixel accuracy (S1005). If inter prediction is not used, or in other words, intra prediction is used, the control unit 501 starts the intra prediction unit 507, and the intra prediction unit 507 performs an intra prediction process, and generates a predicted image (S1006).

The reconstruction unit 508 generates a reconstructed image by adding the predicted image outputted by the motion compensation unit 506 or the intra prediction unit 507, and the difference image outputted by the inverse frequency transform unit 505 (S1007).

The generated reconstructed image is inputted to the deblocking filtering unit 510. Simultaneously, a portion to be used for intra prediction is stored in the reconstructed image memory 509. Finally, the deblocking filtering unit 510 performs, on the obtained reconstructed image, a deblocking filtering process for reducing block noise. Then, the deblocking filtering unit 510 stores the result into the frame memory 502 (S1008). The above completes decoding operations on a coding unit.

Here, the processes illustrated in the flowchart illustrated in FIG. 9 are divided at plural stages as shown by the dotted lines in FIG. 9. At these plural stages from the first stage to the fifth stage, the image decoding device performs plural processes simultaneously on plural largest coding units different for the stages. Consequently, parallel processing is executed, and performance improves. Such processing is referred to as pipeline processing.

In the example in FIG. 9, the first stage includes a variable-length decoding process (S1001). The second stage includes an inverse quantization process (S1002) and an inverse frequency transform process (S1003). The third stage includes a motion compensation process (S1005). The fourth stage includes an intra prediction process (S1006) and a reconstruction process (S1007). The fifth stage includes a deblocking filtering process (S1008).

The plural processes divided at these plural stages are executed, by pipelining, on plural largest coding units different for the stages. Each process unit included in the image decoding device according to the present embodiment processes all the coding units in the largest coding unit at one stage.

Specifically, if there is only one 128×128-pixel coding unit in the 128×128-pixel largest coding unit, each process unit processes the one coding unit at one stage. If there are four 64×64-pixel coding units in the 128×128-pixel largest coding unit, each process unit processes all the four coding units at one stage.

Figure 10:
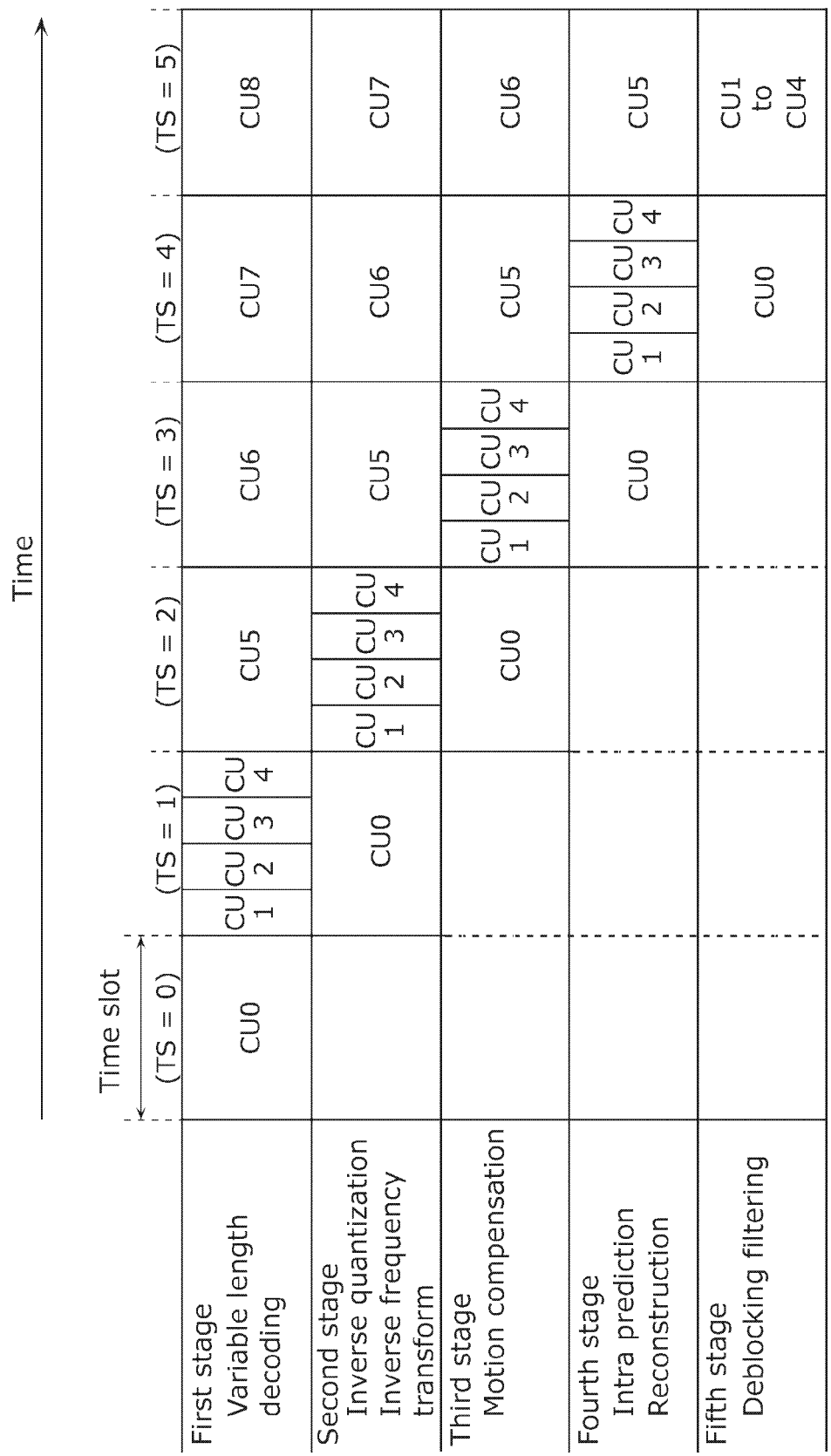
FIG. 10 is a time chart illustrating operation of the image decoding device according to Embodiment 1.

FIG. 10 illustrates time series operation of the image decoding device according to the present embodiment. FIG. 10 illustrates operation performed when plural processes are divided at plural stages as shown in FIG. 9, and furthermore plural coding units are formed as shown in FIG. 7A.

In TS=0, the variable-length decoding process at the first stage (S1001) is performed on CU0.

In TS=1, the inverse quantization process (S1002) and the inverse frequency transform process (S1003) at the second stage are performed on CU0, and simultaneously, the variable-length decoding process at the first stage (S1001) is performed on CU1 to CU4.

In TS=2, the motion compensation process at the third stage (S1005) is performed on CU0, and the inverse quantization process (S1002) and the inverse frequency transform process (S1003) at the second stage are performed on CU1 to CU4. In addition, the variable-length decoding process at the first stage (S1001) is simultaneously performed on CU5.

In TS=3, the intra prediction process (S1006) and the reconstruction process (S1007) at the fourth stage are performed on CU0, and the motion compensation process (S1005) at the third stage is performed on CU1 to CU4. Also, simultaneously, the inverse quantization process (S1002) and the inverse frequency transform process (S1003) at the second stage are performed on CU5, and the variable-length decoding process (S1001) at the first stage is performed on CU6.

In TS=4, the deblocking filtering process (S1008) at the fifth stage is performed on CU0, and the intra prediction process (S1006) and the reconstruction process (S1007) at the fourth stage are performed on CU1 to CU4. Also, simultaneously, the motion compensation process (S1005) at the third stage is performed on CU5, and the inverse quantization process (S1002) and the inverse frequency transform process (S1003) at the second stage are performed on CU6. Also, the variable-length decoding process (S1001) at the first stage is performed on CU7, simultaneously. As a result, the entire decoding processing on CU0 is completed.

In TS=5, the deblocking filtering process (S1008) at the fifth stage is performed on CU1 to CU4, and the intra prediction process (S1006) and the reconstruction process (S1007) at the fourth stage are performed on GUS. Also, simultaneously, the motion compensation process (S1005) at the third stage is performed on CU6, and the inverse quantization process (S1002) and the inverse frequency transform process (S1003) at the second stage are performed on CU7. Also, the variable-length decoding process (S1001) at the first stage is performed on CU8, simultaneously. As a result, the entire decoding processing on CU1 to CU4 is completed.

Here, regarding the deblocking filtering process (S1008) at the fifth stage in TS=5 in FIG. 10, CU1 to CU4 are not separately illustrated. This is due to the following reasons.

Figure 25:
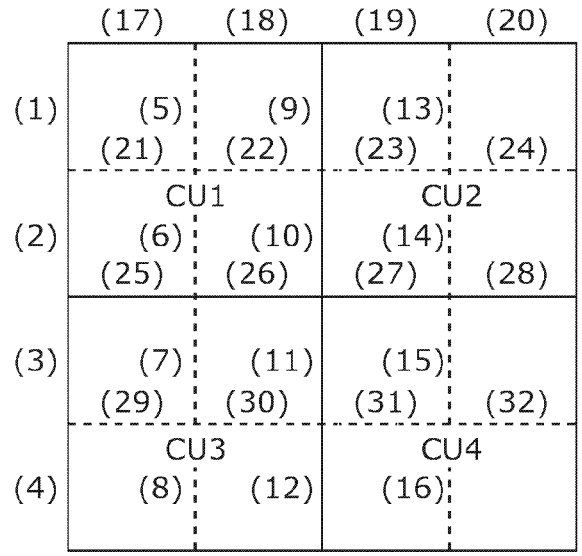
FIG. 25 illustrates an example of the order of a deblocking filtering process according to Embodiment 1.

The deblocking filtering process according to the present embodiment is executed in numerical order illustrated in FIG. 25. Specifically, the deblocking filtering process is performed on a vertical boundary, first, and then the deblocking filtering process is performed on a horizontal boundary.

The deblocking filtering process is executed on all the perpendicular boundaries of CU1 to CU4, and thereafter the deblocking filtering process is executed on all the horizontal boundaries of CU1 to CU4, rather than in the following order: CU1, CU2, CU3, and CU4.

Processing in TS=6 and the following slots is similar to the processing in TS=0 through TS=5, and thus a description thereof is omitted.

Figure 64:
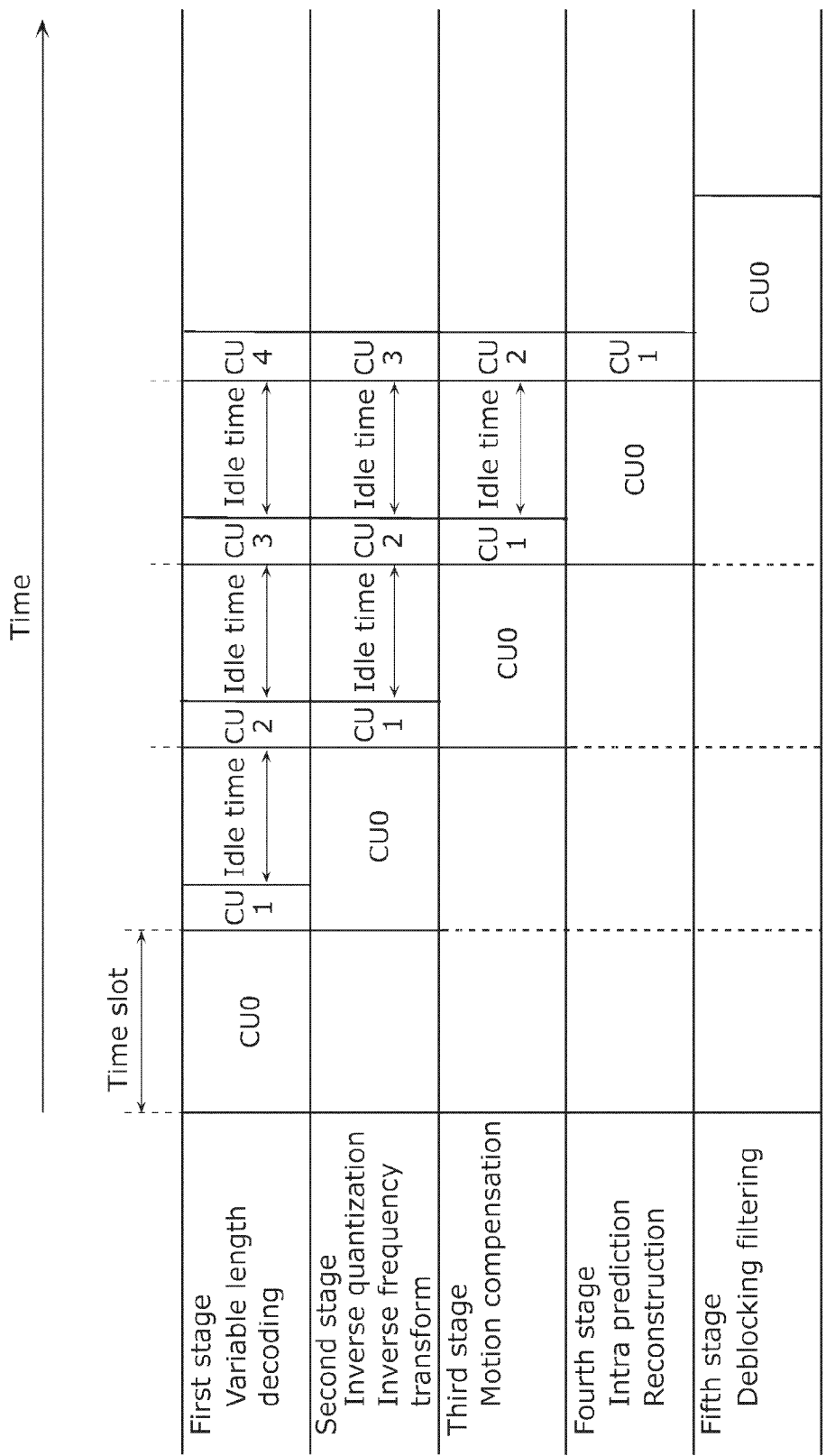
FIG. 64 is an explanatory diagram illustrating operation performed when pipeline processing is applied to blocks having changeable sizes according to conventional technology.

In the present embodiment, compared with FIG. 64 illustrating the conventional operation, the amount of data processed at each stage of pipelining is constant. Accordingly, the idle time in each process is reduced, and pipeline processing is executed efficiently.

Here, in TS=0, the variable-length decoding process (S1001) is performed on CU0. Furthermore, in TS=1, the inverse quantization process (S1002) is performed on CU0, and the variable-length decoding process (S1001) is performed on CU1, to CU4, simultaneously.

These processes are executed by arranging the memory 511 between the variable length decoding unit 503 and the inverse quantization unit 504, as illustrated in FIG. 2. Specifically, in TS=0, the variable length decoding unit 503 writes, into the memory 511, the result of the variable-length decoding process on CU0. In TS=1, the inverse quantization unit 504 reads the result written by the variable length decoding unit 503 from the memory 511. Then, the inverse quantization unit 504 performs the inverse quantization process on CU0.

Simultaneously, in TS=1, the variable length decoding unit 503 writes the results of the variable-length decoding process on CU1 to CU4 into the memory 511. The memory 511 needs the memory capacity for at least storing data necessary for processes on the largest coding unit.

Although a description is given of the memory between the variable length decoding unit 503 and the inverse quantization unit 504, an equivalent memory may also be disposed between other process units. In addition, an equivalent memory may be disposed in the control unit 501.

The above is a description of operation of the image decoding device according to the present embodiment.

(1-4. Advantageous Effect)

The image decoding device described in the present embodiment executes pipeline processing for each data unit which is a largest coding unit. Accordingly, the amount of data processed at each stage is constant. Thus, the processing time at each stage of the pipelining is constant. Therefore, pipeline processing is executed efficiently. As a result, processing performance improves. In addition, a circuit operates efficiently, thereby allowing reduction in power consumption.

(1-5. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

The configuration of the pipeline processing described in the present embodiment is an example. Plural processes do not necessarily need to be divided at plural stages as described in the present embodiment. For example, some processes may be executed at one stage, or one process may be divided at some stages.

Variable length codes are used in the present embodiment. A coding scheme for variable length codes may be any coding scheme such as Huffman coding, run length coding, or arithmetic coding.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

In addition, in the present embodiment, the reconstructed image memory 509 is illustrated explicitly. However, a memory in each process unit may be used as the reconstructed image memory 509, and the frame memory 502 may be used as the reconstructed image memory 509.

In addition, decoding processing is described as an example in the present embodiment. However, pipeline processing is not limited to decoding processing. Coding processing which is processing opposite to decoding processing may be executed by pipelining for each largest coding unit, as with the present embodiment. Accordingly, pipeline processing is executed efficiently as well as the present embodiment.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

Embodiment 2

(2-1. Outline)

First is a description of the outline of an image decoding device according to the present embodiment. The image decoding device according to the present embodiment decodes a coded stream. The size of a coding unit included in a coded stream can be changed, in addition, the image decoding device divides plural processes included in decoding processing at plural stages, and performs the plural processes in parallel by pipelining.

At that time, the image decoding device performs plural processes, based on the size of a transform unit. It should be noted that a transform unit is a data unit for performing frequency transform. In addition, a transform unit is included in a coding unit which is included in a coded stream. In addition, luma data (luma information) and chroma data (chroma information) are included in each transform unit in a coded stream.

Accordingly, even if plural coding units have various sizes, irrespective of the size of each coding unit, the amount of data to be processed in each of plural processes included in pipeline processing is equivalent. Consequently, idle time in pipeline processing is reduced, and pipeline processing is performed efficiently. Thus, performance improves. In addition, it is possible to reduce the capacity of a memory disposed between process units, compared with Embodiment 1.

The above is a description of the outline of the image decoding device according to the present embodiment.

(2-2. Configuration)

FIG. 1 is a configuration diagram of an image decoding device according to the present embodiment. The configuration of the image decoding device according to the present embodiment is the same as that of Embodiment 1, and thus a description thereof is omitted.

FIG. 2 is a configuration diagram illustrating a connection between a variable length decoding unit 503 and an inverse quantization unit 504. The configuration of the connection is the same as that of Embodiment 1, and thus a description thereof is omitted.

(2-3. Operation)

In the present embodiment, the structure of a coded stream illustrated in FIGS. 3A to 6B is used, as with Embodiment 1. In addition, the configuration of plural coding units illustrated in FIGS. 7A and 7B are used as an example, as with Embodiment 1. The operation flow of the image decoding device according to the present embodiment is the same as that of the operation flow of Embodiment 1 illustrated in FIGS. 8 and 9, and thus a description thereof is omitted.

The difference between the present embodiment and Embodiment 1 is a difference in the operation timing at each stage of the flowchart illustrated in FIG. 9.

Figure 11:
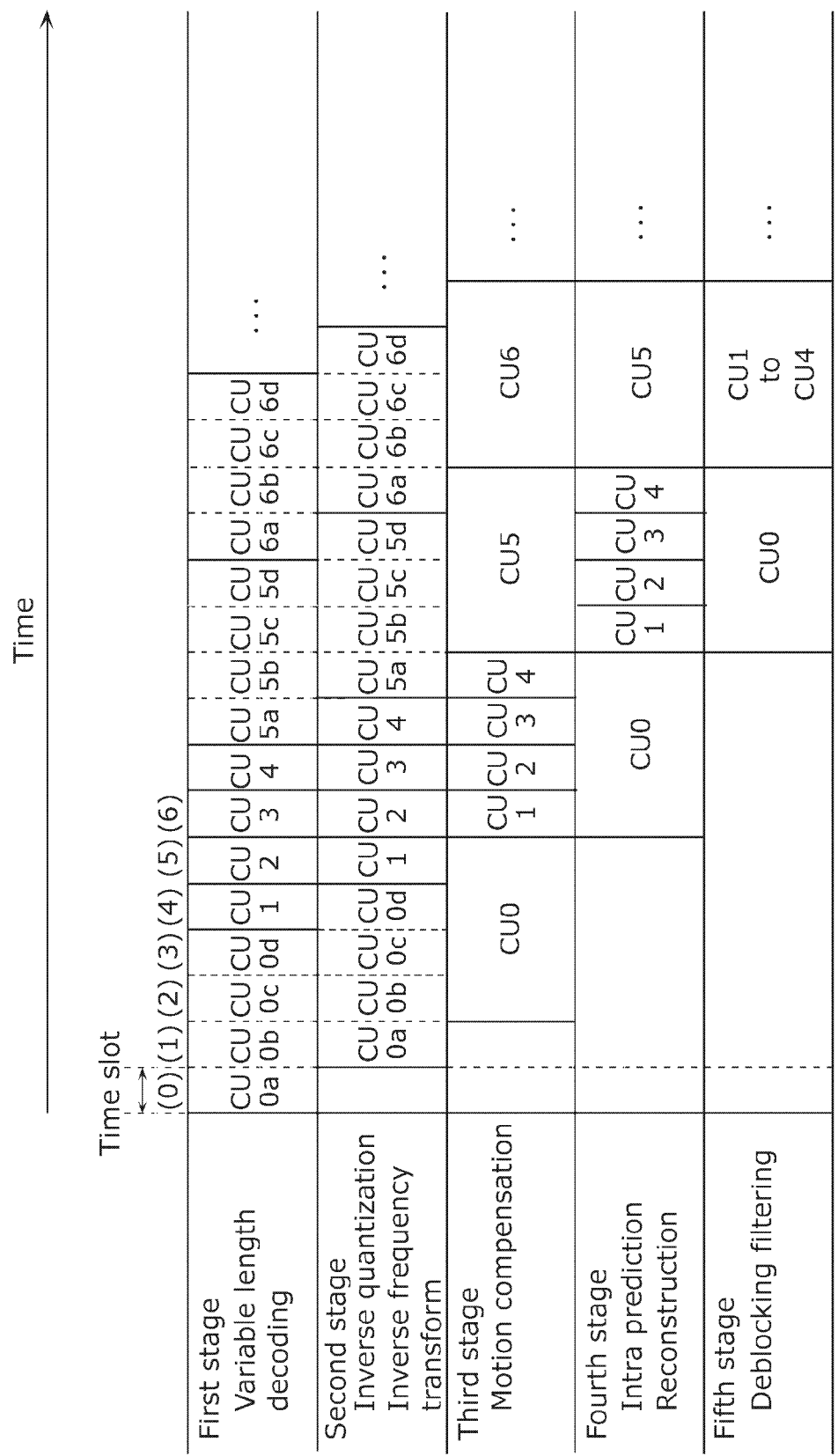
FIG. 11 is a time chart illustrating operation of an image decoding device according to Embodiment 2.

FIG. 11 illustrates time series operation of the image decoding device according to the present embodiment. FIG. 11 illustrates operation in the processes on plural coding units illustrated in FIG. 7A. To facilitate a description, among four 64×64-pixel areas obtained by dividing CU0 into four, an upper left area is referred to as CU0a, an upper right area is referred to as CU0b, a lower left area is referred to as CU0c, and a lower right area is referred to as CU0d.

In TS=0, a variable-length decoding process (S1001) at the first stage is performed on CU0a. CU0a is at a head of the coding unit. Thus, a CU header is also processed.

In TS=1, an inverse quantization process (S1002) and an inverse frequency transform process (S1003) at the second stage are performed on CU0a. Simultaneously, the variable-length decoding process (S1001) at the first stage is performed on CU0b.

In TS=2, a motion compensation process (S1005) at the third stage is performed on CU0, and the inverse quantization process (S1002) and the inverse frequency transform process (S1003) at the second stage are performed on CU0b. Simultaneously, the variable-length decoding process (S1001) at the first stage is performed on CU0c.

Here, the size of a prediction unit of CU0 is 128×128 pixels. Thus, the motion compensation process (S1005) is executed based on the size of 128×128 pixels. Consequently, the motion compensation process (S1005) occupies four time slots. Accordingly, the motion compensation process (S1005) is performed from TS=2 through TS=5.

In TS=3, the motion compensation process (S1005) at the third stage is performed on CU0, continuing from TS=2, and the inverse quantization process (S1002) and the inverse frequency transform process (S1003) at the second stage are performed on CU0c. Simultaneously, the variable-length decoding process (S1001) at the first stage is performed on CU0d.

In TS=4, the motion compensation process (S1005) at the third stage is performed on CU0, continuing from TS=2, and the inverse quantization process (S1002) and the inverse frequency transform process (S1003) at the second stage are performed on CU0d. Simultaneously, the variable-length decoding process (S1001) at the first stage is performed on CU1.

In TS=5, the motion compensation process (S1005) at the third stage is performed on CU0, continuing from TS=2, and the inverse quantization process (S1002) and the inverse frequency transform process (S1003) at the second stage are performed on CU1. Simultaneously, the variable-length decoding process (S1001) at the first stage is performed on CU2.

In TS=6, the intra prediction process (S1006) and the reconstruction process (S1007) at the fourth stage are performed on CU0, and the motion compensation process (S1005) at the third stage is performed on CU1. Simultaneously, the inverse quantization process (S1002) and the inverse frequency transform process (S1003) at the second stage are performed on CU2, and the variable-length decoding process (S1001) at the first stage is performed on CU3.

Processing in TS=7 and the following slots is similar to the processing in TS=0 through TS=6, and thus a description thereof is omitted.

In the present embodiment, if the size of a coding unit is 128×128 pixels as in FIGS. 5A and 5B, the size of a transform unit is always 64×64 pixels or less. Thus, a coded stream is sequentially formed based on a 64×64-pixel data unit. Consequently, pipeline processing is executed based on the data unit including 64×64 pixels which is the maximum size of a transform unit.

In the present embodiment, the amount of data processed at each stage of pipelining is constant, compared with FIG. 64 illustrating the conventional operation. Accordingly, idle time in each process is reduced, and pipeline processing is executed efficiently.

Here, in TS=0, the variable-length decoding process (S1001) is performed on CU0a, Then, in TS=1, the inverse quantization process (S1002) is performed on CU0a, and the variable-length decoding process (S1001) is performed on CU0b, simultaneously.

These processes are executed by disposing a memory 511 between the variable length decoding unit 503 and the inverse quantization unit 504, as illustrated in FIG. 2. Specifically, in TS=0, the variable length decoding unit 503 writes the result of the variable-length decoding process on CU0a into the memory 511. In TS=1, the inverse quantization unit 504 reads the result written by the variable length decoding unit 503 from the memory 511. Then, the inverse quantization unit 504 performs the inverse quantization process on CU0a.

Simultaneously, in TS=1, the variable length decoding unit 503 writes the result of the variable-length decoding process on CU0b into the memory 511. It is sufficient for the memory 511 to have the memory capacity for storing a data unit for executing pipeline processing. The data unit in the present embodiment is the largest transform unit, and the size thereof is 64×64 pixels. Thus, memory capacity according to the present embodiment may be smaller than that in Embodiment 1 in which a data unit is the largest coding unit which is 128×128 pixels.

Although the above description is given of the memory between the variable length decoding unit 503 and the inverse quantization unit 504, an equivalent memory may be disposed between other process units. In addition, an equivalent memory may be disposed in a control unit 501. In addition, in the present embodiment, the motion compensation at the third stage and processes thereafter of pipelining are based on a largest coding unit. Accordingly, the memory capacity for storing data necessary for a process on at least a 128×128-pixel largest coding unit is necessary for these processes, as with Embodiment 1.

The above is a description of operation of the image decoding device according to the present embodiment.

(2-4. Advantageous Effect)

The image decoding device described in the present embodiment executes pipeline processing for each data unit which is the largest transform unit.

Luma data (luma information) and chroma data (chroma information) are included in each transform unit in FIGS. 5A and 5B. Accordingly, without separating luma data and chroma data, as in FIG. 11, it is possible to form pipelining based on a 64×64-pixel data unit which is the size of the largest transform unit. Specifically, even if a 128×128-pixel coding unit and a 64×64-pixel coding unit are both included, the amount of data to be processed at each stage is constant.

Accordingly, the processing time at each stage of pipelining becomes constant. Therefore, pipeline processing is executed efficiently. As a result, processing performance improves. In addition, a circuit operates efficiently, thereby also allowing reduction in power consumption.

Furthermore, pipeline processing is executed based on the largest transform unit, compared with Embodiment 1. The largest transform unit is smaller than the largest coding unit. Accordingly, it is possible to reduce the capacity of the memory disposed between the process units, and decrease a circuit size.

(2-5. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL 2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

The configuration of the pipeline processing described in the present embodiment is an example. Plural processes do not necessarily need to be divided at plural stages as described in the present embodiment. For example, some processes may be executed at one stage, or one process may be divided at some stages.

Variable length codes are used in the present embodiment. A coding scheme for variable length codes may be any coding scheme such as Huffman coding, run length coding, or arithmetic coding.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

Furthermore, pipeline processing is executed for each 64×64-pixel data unit which has the size of the largest transform unit, in the present embodiment. However, the size of a data unit is not necessarily limited to 64×64 pixels.

Generally, a frequency transform process is executed using all the data included in one data unit. Thus, it is difficult to divide a transform unit. Therefore, the size of the largest transform unit is selected in the present embodiment. However, if it is difficult to divide a data unit used for a process other than the frequency transform process, pipeline processing may be executed for each data unit used for that process.

In addition, in the present embodiment, the reconstructed image memory 509 is illustrated explicitly. However, a memory in each process unit may be used as the reconstructed image memory 509, and the frame memory 502 may be used as the reconstructed image memory 509.

In the present embodiment, the presence of a skip block for which the amount of coding a coding unit is zero is not described. However, even if a skip block is present, the image decoding device according to the present embodiment may execute pipeline processing based on the size of the largest transform unit.

In addition, decoding processing is described as an example in the present embodiment. However, pipeline processing is not limited to decoding processing. Coding processing which is processing opposite to decoding processing may be executed by pipelining for each largest transform unit, as with the present embodiment. Accordingly, pipeline processing is executed efficiently as well as the present embodiment.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

Embodiment 3

(3-1. Outline)

First is a description of the outline of an image decoding device according to the present embodiment. The image decoding device according to the present embodiment decodes a coded stream. The size of a coding unit included in a coded stream can be changed. In addition, the image decoding device divides plural processes included in decoding processing at plural stage, and performs the plural processes in parallel by pipelining.

At that time, the image decoding device performs plural processes based on the size of a transform unit. It should be noted that a transform unit is a data unit for performing frequency transform. In addition, a transform unit is included in a coding unit which is included in a coded stream.

In addition, the image decoding device divides a prediction unit used for a motion compensation process or an intra prediction process, based on the size of a transform unit when performing plural processes included in decoding processing.

Accordingly, even if plural coding units have various sizes, irrespective of the size of each coding unit, the amount of data to be processed in each of plural processes included in pipeline processing is equivalent. Accordingly, idle time in pipeline processing is reduced, and pipeline processing is performed efficiently. Thus, performance improves. In addition, it is possible to reduce the capacity of a memory disposed between process units, compared with Embodiments 1 and 2.

The above is a description of the outline of the image decoding device according to the present embodiment.

(3-2. Configuration)

Next is a description of a configuration of the image decoding device according to the present embodiment.

Figure 12:
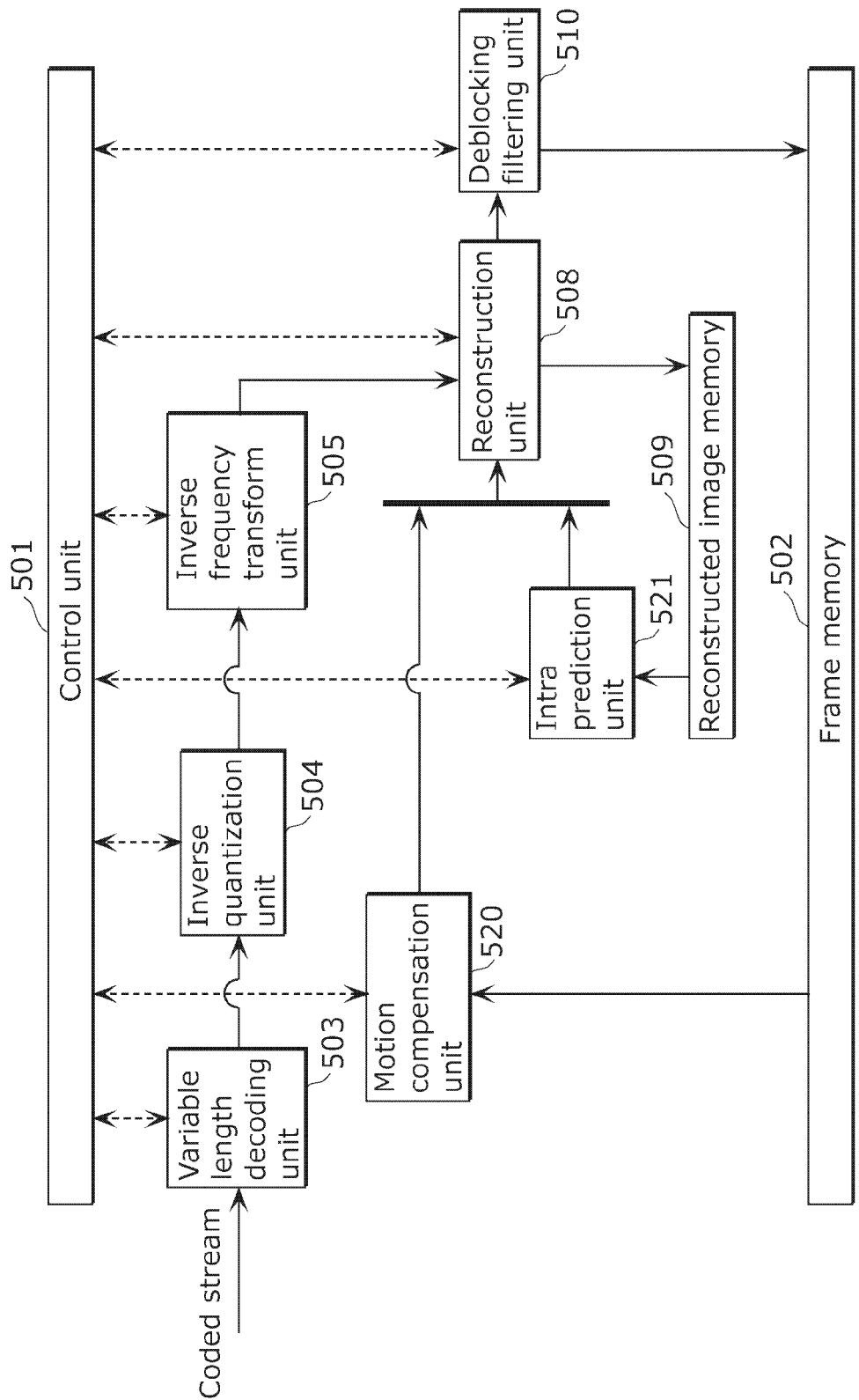
FIG. 12 illustrates a configuration of an image decoding device according to Embodiment 3.

FIG. 12 illustrates a configuration of the image decoding device according to the present embodiment. The same numerals are assigned to the same constituent elements as those in Embodiment 1 illustrated in FIG. 1, and thus a description thereof is omitted. The image decoding device according to the present embodiment includes a motion compensation unit 520 and an intra prediction unit 521. The motion compensation unit 520 divides a prediction unit based on a size equal to or smaller than the size of the largest transform unit, and performs a motion compensation process. The intra prediction unit 521 divides a prediction unit based on a size equal to or smaller than the size of the largest transform unit, and performs an intra prediction process.

FIG. 2 is a configuration diagram illustrating a connection between a variable length decoding unit 503 and an inverse quantization unit 504. The configuration of the connection is the same as that in Embodiment 1, and thus a description thereof is omitted.

FIG. 13 illustrates the configuration of the motion compensation unit 520 in FIG. 12. The same numerals are assigned to the same constituent elements as those illustrated in FIG. 12, and thus a description thereof is omitted. The motion compensation unit 520 includes a motion compensation block division unit 601, a reference image obtaining unit 602, and a motion compensation arithmetic unit 603. The motion compensation block division unit 601 divides a prediction unit. The reference image obtaining unit 602 obtains a reference image from a frame memory 502. The motion compensation arithmetic unit 603 performs a motion compensation process.

FIG. 14 illustrates the configuration of the intra prediction unit 521 in FIG. 12. The same numerals are assigned to the same constituent elements as those illustrated in FIG. 12, and thus a description thereof is omitted. The intra prediction unit 521 includes an intra prediction block division unit 701, a reconstructed image obtaining unit 702, and an intra prediction arithmetic unit 703. The intra prediction block division unit 701 divides a prediction unit. The reconstructed image obtaining unit 702 obtains a reconstructed image from a reconstructed image memory 509. The intra prediction arithmetic unit 703 performs an intra prediction process.

The above is a description of the configuration of the image decoding device according to the present embodiment.

(3-3. Operation)

In the present embodiment, the structure of a coded stream illustrated in FIGS. 3A to 6B is used as with Embodiment 1. In addition, the configuration of plural coding units illustrated in FIGS. 7A and 7B is used as an example, as with Embodiment 1. The operation flow of the image decoding device according to the present embodiment is the same as the operation flow in Embodiment 1 illustrated in FIGS. 8 and 9 except for a motion compensation process (S1005) and an intra prediction process (S1006), and thus a description of the same part is omitted. The following is a description of the motion compensation process (S1005) and the intra prediction process (S1006).

Figure 15:
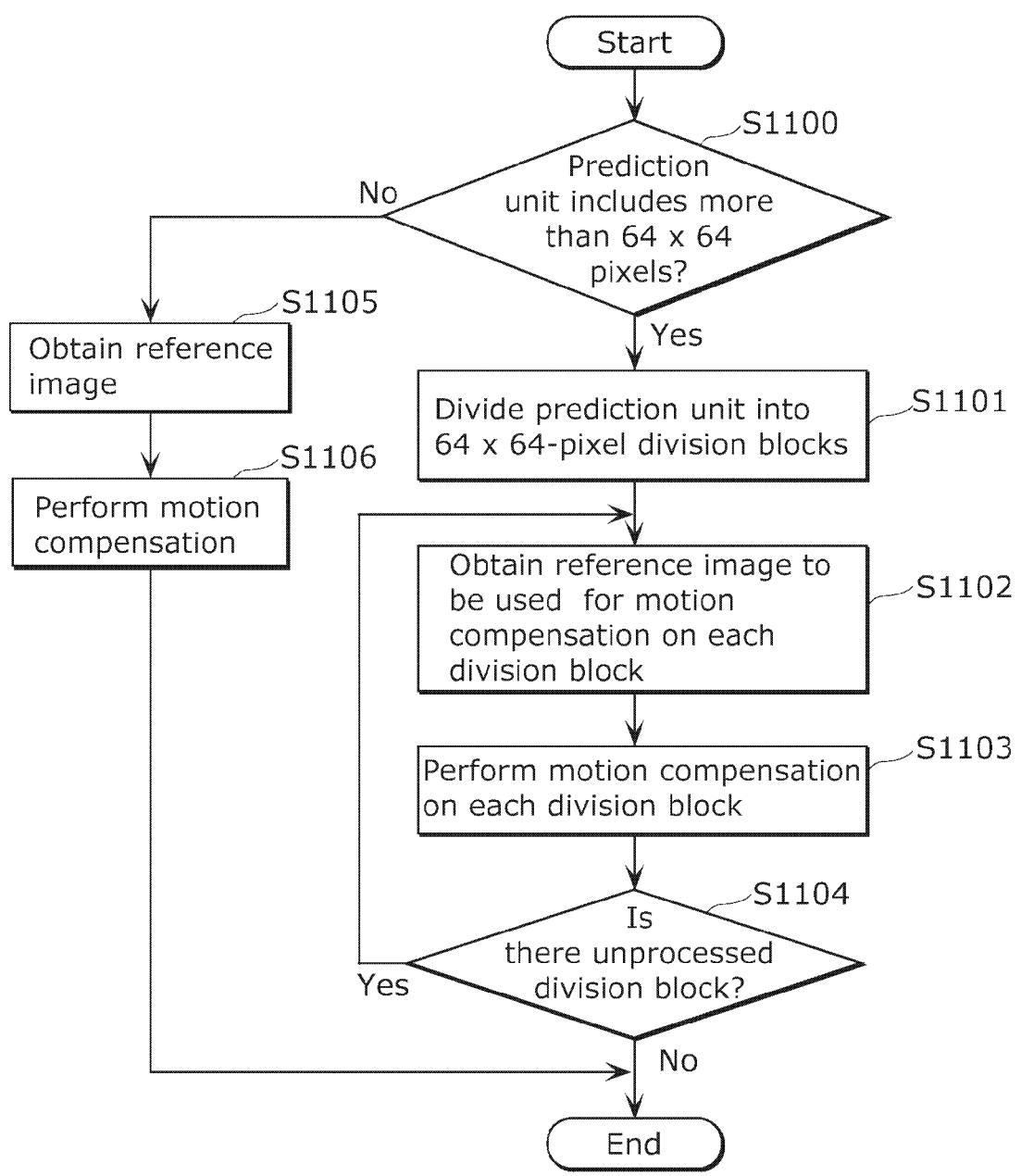
FIG. 15 is a flowchart illustrating operation of the motion compensation unit according to Embodiment 3.

A description is given of operation in the motion compensation process (S1005) performed by the motion compensation unit 520 according to the present embodiment, using the flowchart illustrated in FIG. 15. First, the motion compensation block division unit 601 determines whether a prediction unit includes 64×64 pixels or more (S1100).

If a prediction unit does not include 64×64 pixels or more (No in S1100), a process similar to an ordinary motion compensation process is executed. Specifically, the reference image obtaining unit 602 obtains a reference image (S1105), and the motion compensation arithmetic unit 603 performs motion compensation computation (S1106).

If a prediction unit includes 64×64 pixels or more (Yes in S1100), the motion compensation block division unit 601 divides a prediction unit into plural 64×64-pixel division blocks (S1101). Next, the reference image obtaining unit 602 obtains a reference image for each division block (S1102). The motion compensation arithmetic unit 603 performs motion compensation computation for each division block (S1103). Next, the motion compensation block division unit 601 determines whether there is an unprocessed division block (S1104).

If there is an unprocessed division block (Yes in S1104), the reference image obtaining unit 602 obtains a reference image (S1102), and the motion compensation arithmetic unit 603 performs motion compensation computation (S1103). If there is no unprocessed division block (No in S1104), the motion compensation unit 520 ends the processing.

Figure 16:
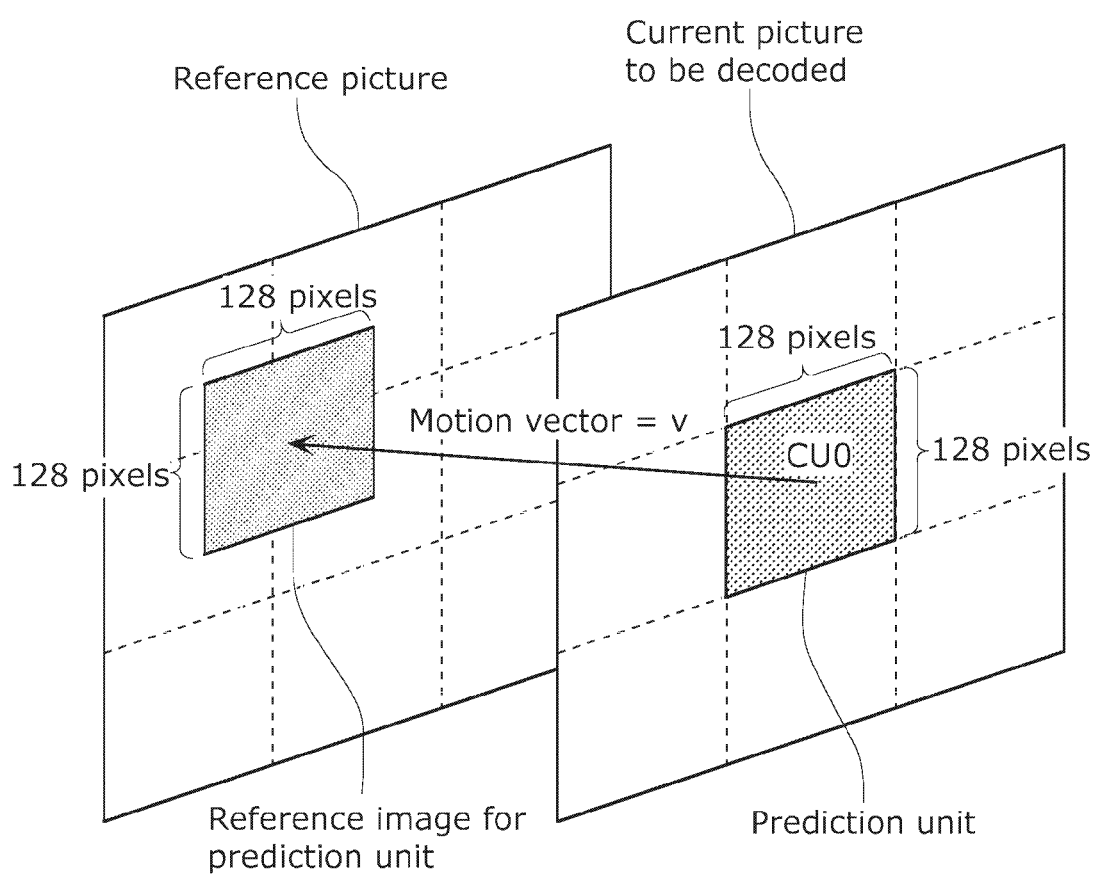
FIG. 16 illustrates a relationship between a prediction unit and a reference image according to Embodiment 3.

Next, a description is given of operation in the above motion compensation, using a specific example. FIG. 16 illustrates operation in motion compensation in the case where a prediction unit includes 128×128 pixels. In this example, a prediction unit of a coding unit of a current picture to be decoded has a 128×128 pixel size, and a motion vector thereof is v. In the motion compensation process, a 128×128-pixel block indicated by the motion vector in a reference picture is used as a reference image.

Figure 17:
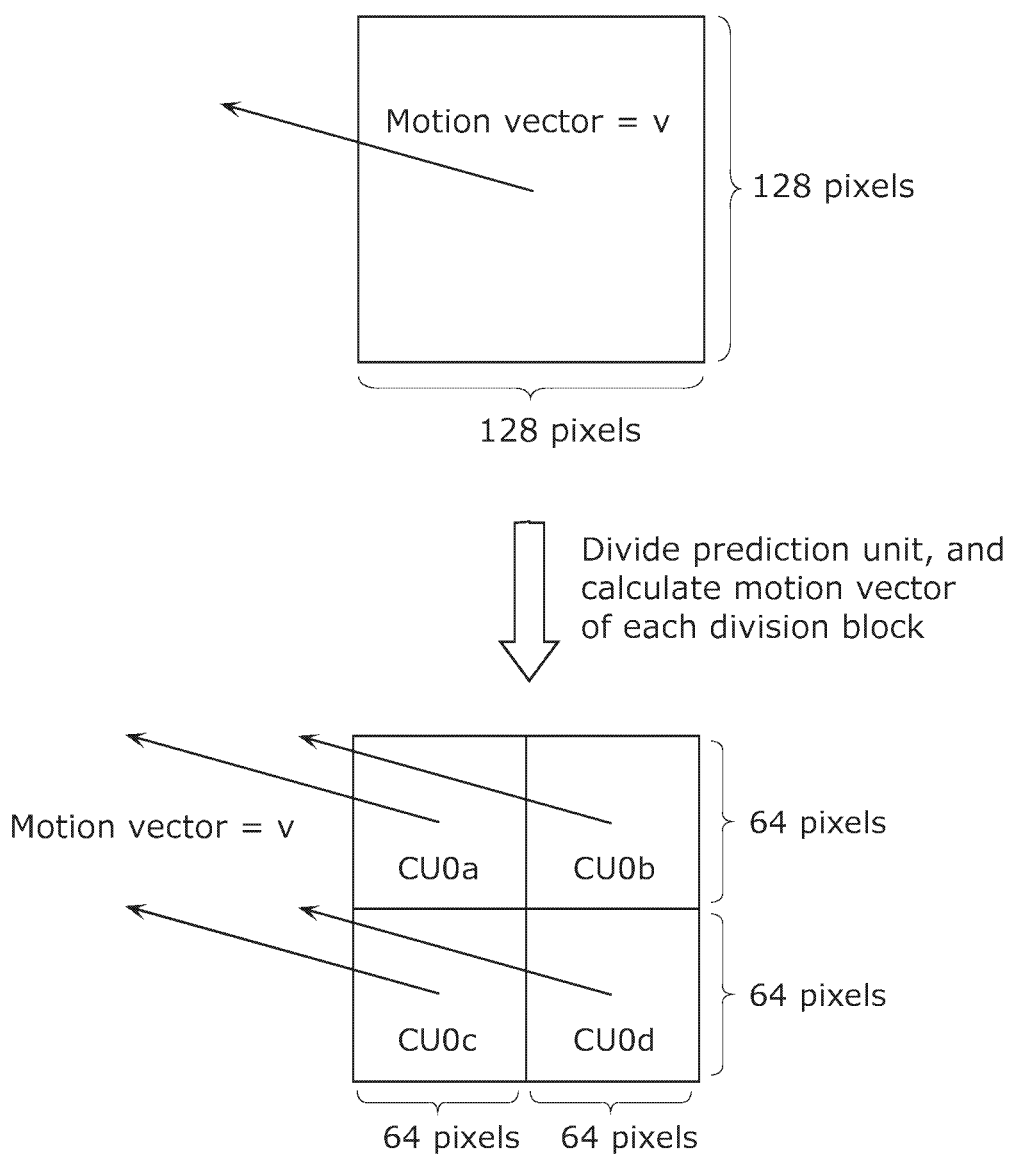
FIG. 17 illustrates a motion compensation process on division blocks according to Embodiment 3.

In this example, the motion compensation block division unit 601 first divides a prediction unit into four 64×64-pixel division blocks having the size of the largest transform unit described in Embodiment 2. The motion vector of each division block may be the same as that of a 128×128-pixel prediction unit, as illustrated in FIG. 17. In other words, all the motion vectors of the division blocks may be v. Here, the block located on the upper left of the prediction unit is referred to as CU0a, the block located on the upper right is referred to as CU0b, the block located on the lower left is referred to as CU0c, and the block located on the lower right is referred to as CU0d.

Figure 18:
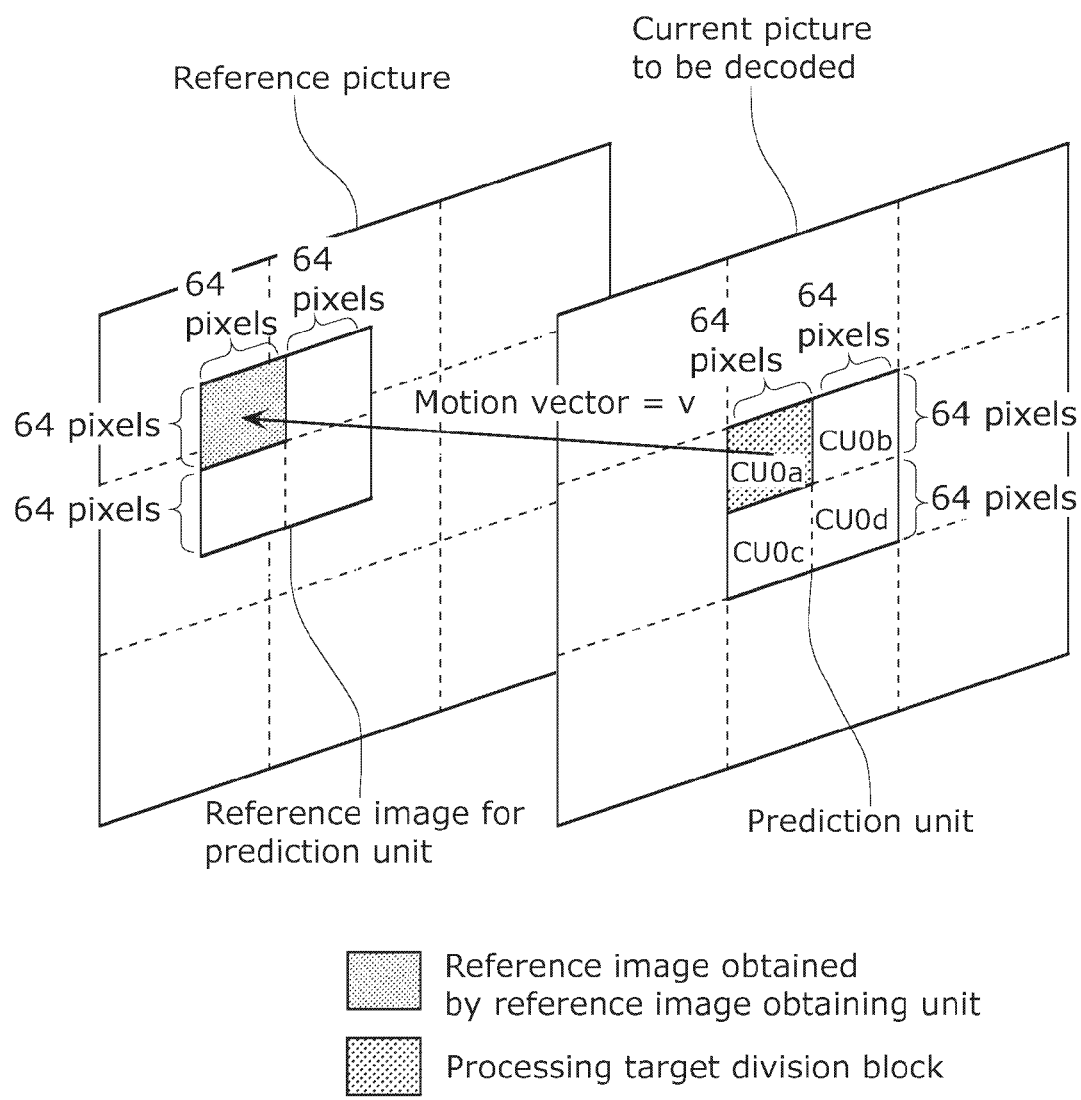
FIG. 18 illustrates a relationship between a first division block and the reference image according to Embodiment 3.

Next, the reference image obtaining unit 602 obtains, from the frame memory 502, an image identified by using the position of CU0a, the motion vector of CU0a, and a reference index. The motion vector of CU0a is v. Thus, as illustrated in FIG. 18, the reference image to be obtained is the upper left 64×64-pixel block included in a 128×128-pixel block which is a reference image for an original prediction unit having the 128×128 pixel size. The reference image obtaining unit 602 obtains this 64×64-pixel block from the frame memory 502.

After completion of obtaining the reference image, the motion compensation arithmetic unit 603 performs motion compensation on CU0a, and generates a predicted image. If a motion vector indicates a decimal pixel position, the motion compensation arithmetic unit 603 performs a filtering process on the obtained reference image, and generates a predicted image. If a motion vector indicates an integer pixel position, the motion compensation arithmetic unit 603 outputs the obtained reference image as a predicted image, as it is. The above completes motion compensation on CU0a.

Figure 19:
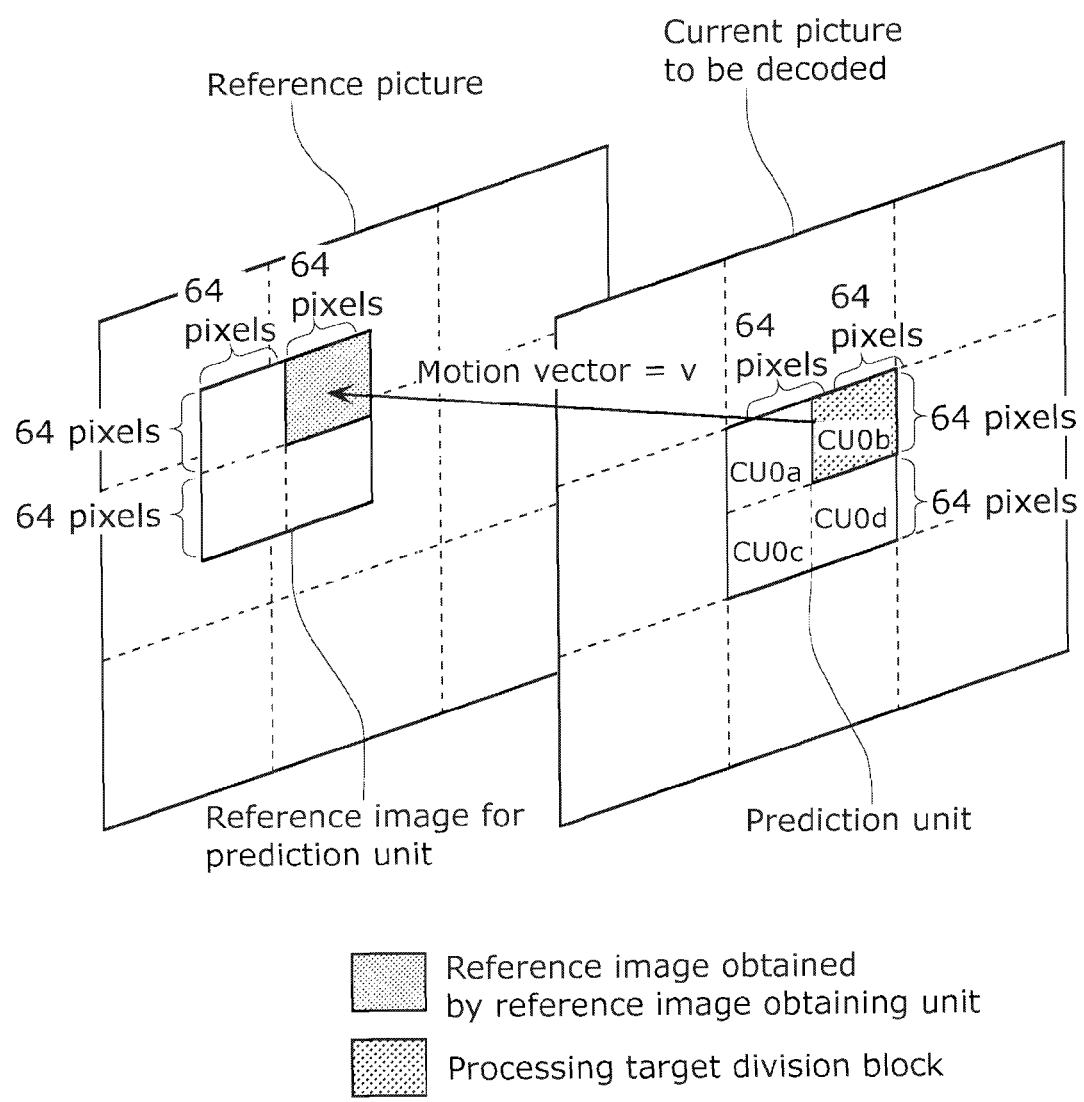
FIG. 19 illustrates a relationship between a second division block and the reference image according to Embodiment 3.

Similarly, the reference image obtaining unit 602 obtains a reference image to be used for motion compensation on CU0b from the frame memory 502. The motion vector of CU0b is v. Accordingly, as illustrated in FIG. 19, a reference image to be obtained is the upper right 64×64-pixel block included in a 128×128-pixel block which is a reference image for the original prediction unit having the 128×128 pixel size. After completion of obtaining the reference image, the motion compensation arithmetic unit 603 performs motion compensation on CU0b, and generates a predicted image. The above completes motion compensation on CU0b.

Figure 20:
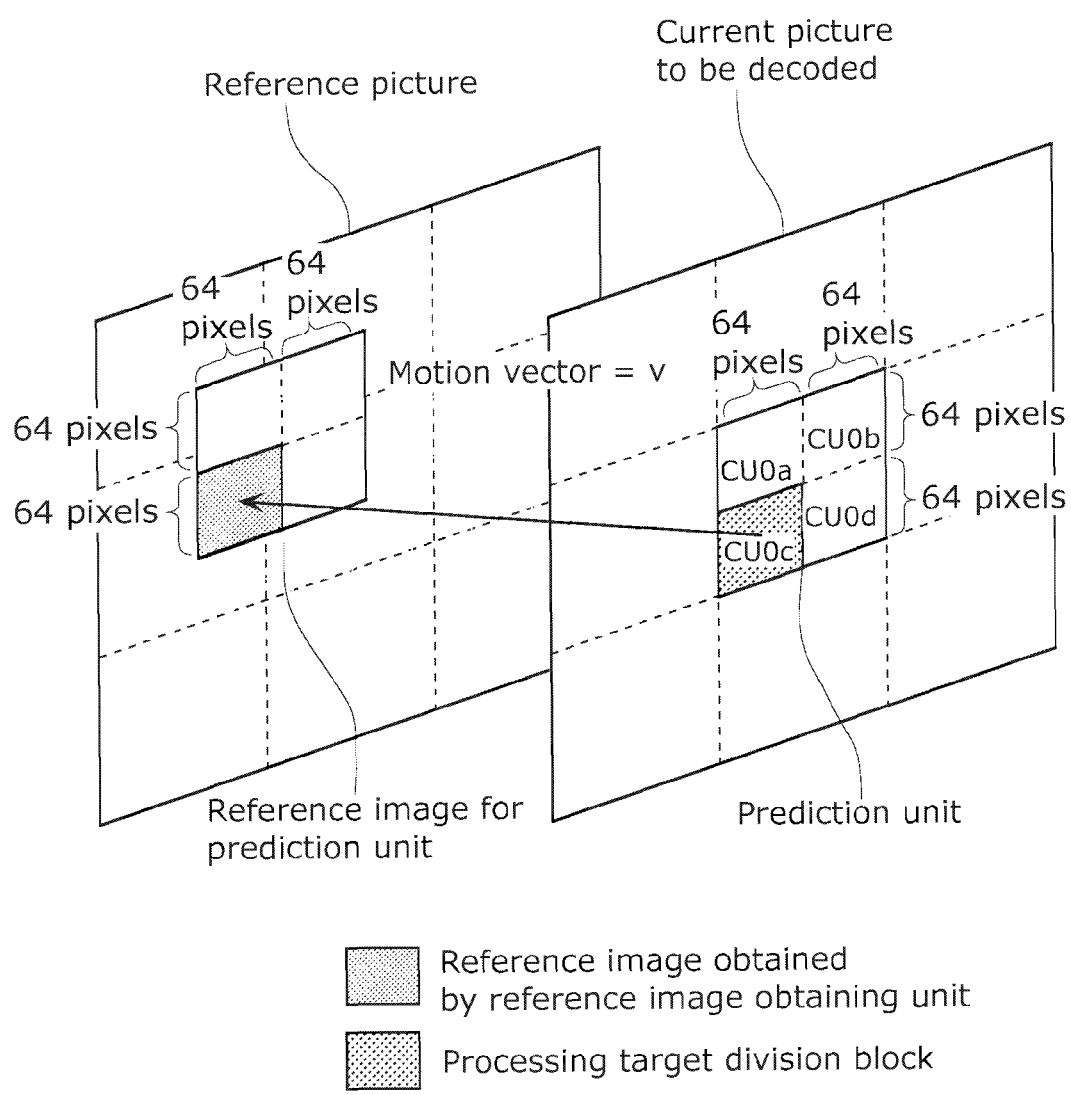
FIG. 20 illustrates a relationship between a third division block and the reference image according to Embodiment 3.
Figure 21:
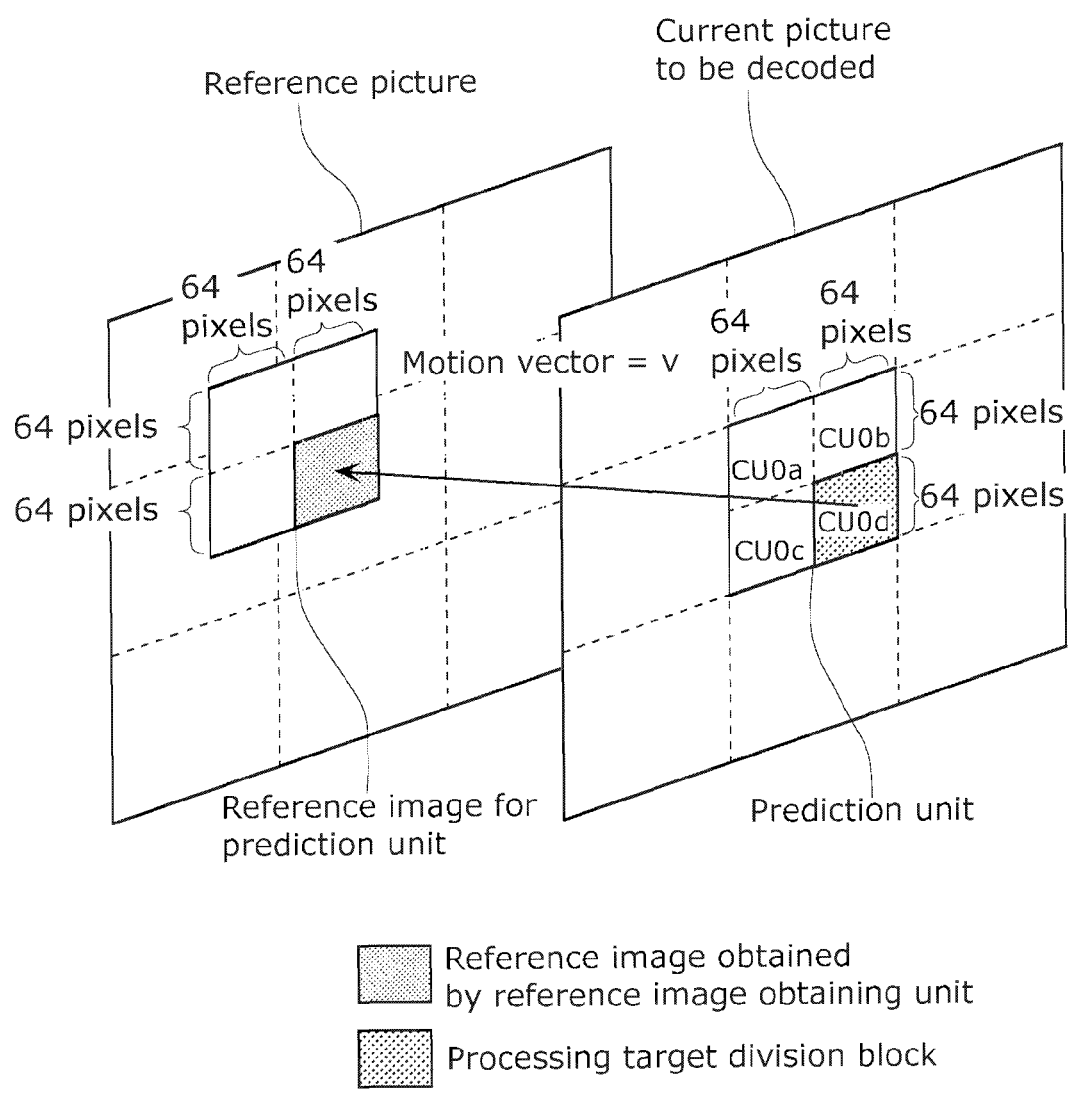
FIG. 21 illustrates a relationship between a fourth division block and the reference image according to Embodiment 3.

Similarly, the reference image obtaining unit 602 obtains a reference image to be used for motion compensation on CU0c from the frame memory 502. The motion vector of CU0c is v. Thus, as illustrated in FIG. 20, the reference image to be obtained is the lower left 64×64-pixel block included in a 128×128-pixel block which is a reference image for the original prediction unit having the 128×128-pixel size. After completion of obtaining the reference image, the motion compensation arithmetic unit 603 performs motion compensation on CU0c, and generates a predicted image. The above completes motion compensation on CU0c.

Similarly, the reference image obtaining unit 602 obtains a reference image to be used for motion compensation on CU0d from the frame memory 502. The motion vector of CU0d is v. Thus, as illustrated in FIG. 20, the reference image to be obtained is the lower right 64×64-pixel block included in a 128×128-pixel block which is a reference image for the original prediction unit having the 128×128 pixel size. After completion of obtaining the reference image, the motion compensation arithmetic unit 603 performs motion compensation on CU0d, and generates a predicted image. The above completes motion compensation on CU0d.

The above completes motion compensation on CU0a to CU0c, thereby completing operation in motion compensation on a prediction unit whose motion vector is v.

Figure 22:
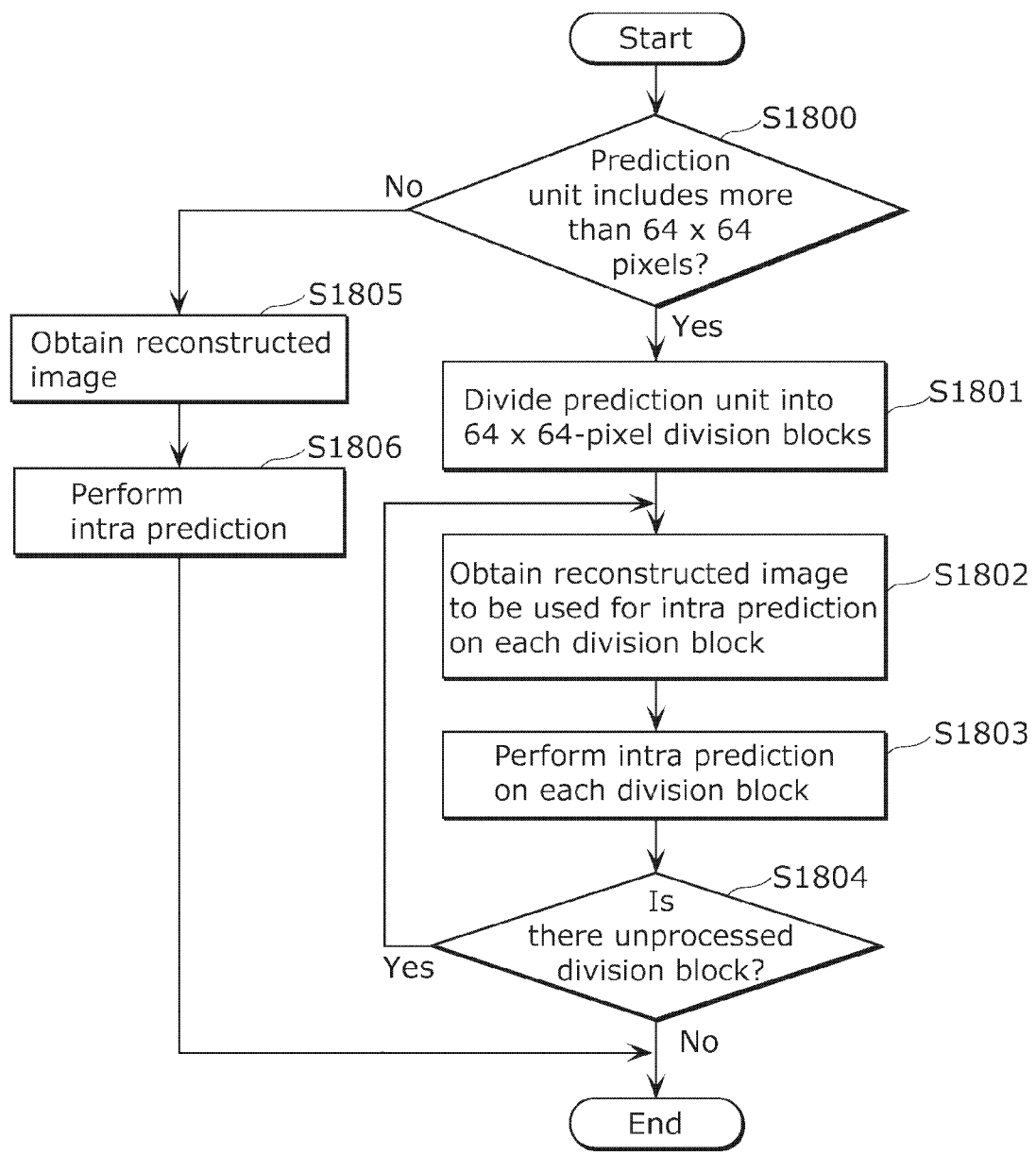
FIG. 22 is a flowchart illustrating operation of the intra prediction unit according to Embodiment 3.

Next, a description is given of operation in the intra prediction process (S1006) by the intra prediction unit 521 according to the present embodiment, using the flowchart illustrated in FIG. 22. First, the intra prediction block division unit 701 determines whether a prediction unit includes 64×64 pixels or more (S1800).

If the prediction unit does not include 64×64 pixels or more (No in S1800), a process similar to an ordinary intra prediction process is executed. Specifically, the reconstructed image obtaining unit 702 obtains a reconstructed image (S1805), and the intra prediction arithmetic unit 703 performs intra prediction computation (S1806).

If the prediction unit includes 64×64 pixels or more (Yes in S1800), the intra prediction block division unit 701 divides a prediction unit into four 64×64-pixel division blocks (S1801). Next, the reconstructed image obtaining unit 702 obtains a reference image for each division block (S1802), and the intra prediction arithmetic unit 703 performs intra prediction computation for each division block (S1803). Next, the intra prediction block division unit 701 determines whether there is an unprocessed division block (S1804).

If there is an unprocessed division block (Yes in S1804), the reconstructed image obtaining unit 702 obtains a reconstructed image (S1802), and the intra prediction arithmetic unit 703 performs intra prediction computation (S1803). If there is no unprocessed division block (No in S1804), the intra prediction unit 521 ends the processing.

Figure 23:
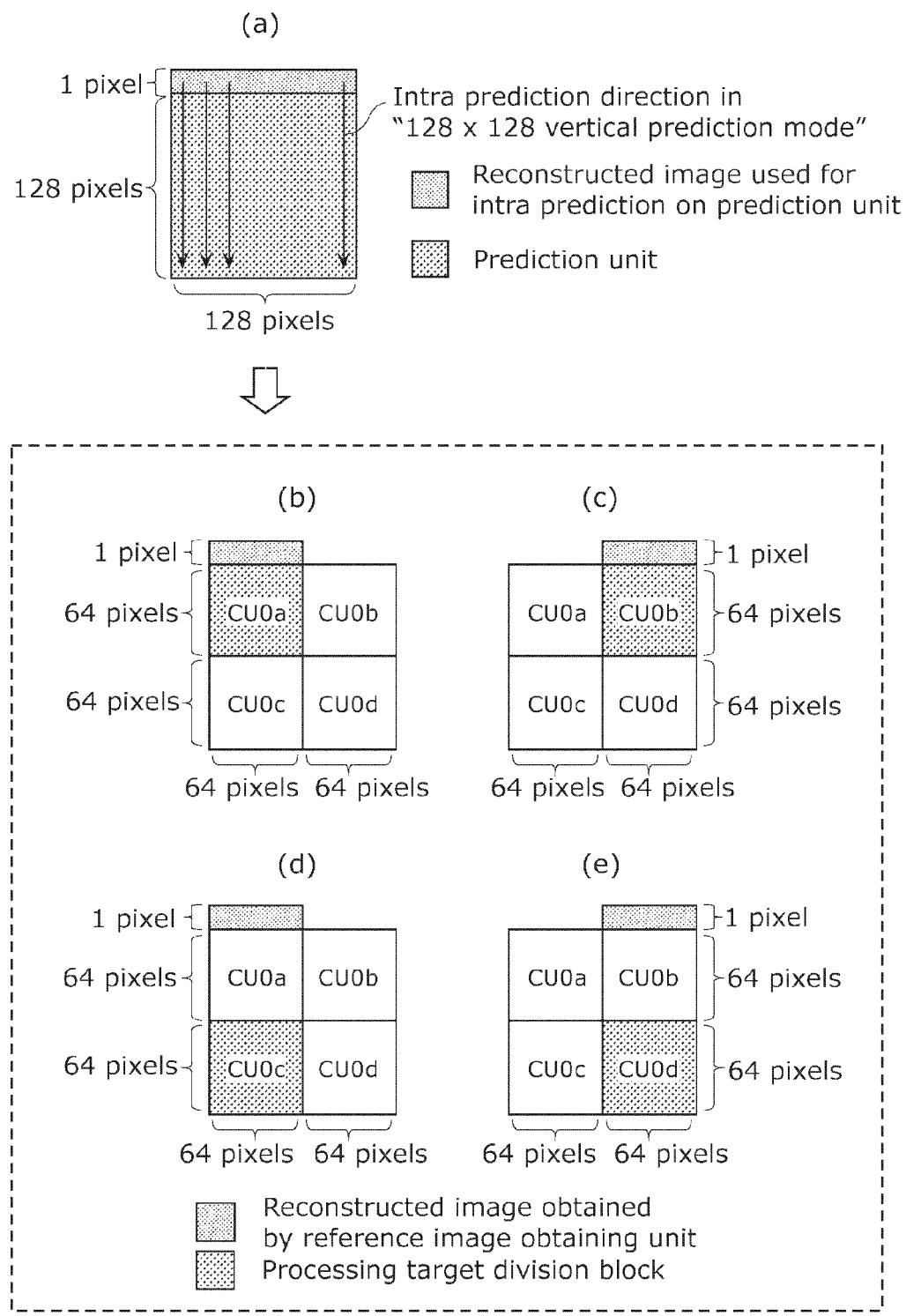
FIG. 23 illustrates an intra prediction process on division blocks according to Embodiment 3.

Next, a description is given of operation in intra prediction described above, using a specific example. FIG. 23 illustrates operation in intra prediction in case where the size of a prediction unit used for intra prediction is 128×128 pixels. In this example, an intra prediction mode is a "128×128 vertical prediction mode" as illustrated in (a) of FIG. 23. Thus, an intra prediction process is performed using a reconstructed image block which is adjacent to and on a current prediction unit to be decoded, and has a 128×1-pixel size. Specifically, a pixel value in the reconstructed image block which is adjacent to and on the current prediction unit to be decoded is copied downward, thereby obtaining a predicted image.

In the example in FIG. 23, the intra prediction block division unit 701 divides a prediction unit into 64×64-pixel division blocks, first. The original prediction unit is larger than each division block, and is a 128×128-pixel block. The intra prediction mode of each division block is a 64×64-pixel intra prediction mode. More specifically, an intra prediction mode of all the division blocks is the "64×64 vertical prediction mode." Here, the block located on the upper left of the prediction unit is referred to as CU0a, the block located on the upper right is referred to as CU0b, the block located on the lower left is referred to as CU0c, and the block located on the lower right is referred to as CU0d.

Next, the reconstructed image obtaining unit 702 obtains a reference image for CU0a from the reconstructed image memory 509, based on the position of CU0a and the intra prediction mode of CU0a. The position and size of a reconstructed image to be obtained are determined following the procedure below.

The intra prediction mode of the original prediction unit is the "128×128 vertical prediction mode." The reconstructed image obtaining unit 702 calculates the position and size of a reconstructed image to be referred to in intra prediction on the area of CU0a in the prediction unit, and obtains a reconstructed image. In this example, the reconstructed image to be obtained is a 64×1 pixel block which is adjacent to and above CU0a, as illustrated in (b) of FIG. 23. The reconstructed image obtaining unit 702 determines the position and size of the 64×1 pixel block which is adjacent to and on CU0a as the position and size of the reconstructed image to be obtained.

Following the above procedure, the reconstructed image obtaining unit 702 determines the position and size of a reconstructed image to be obtained, and thereafter obtains a 64×1-pixel block adjacent to and on CU0a from the reconstructed image memory 509.

After completion of obtaining the reconstructed image, the intra prediction arithmetic unit 703 performs intra prediction on CU0a using the obtained reconstructed image, and generates a predicted image. At this time, the intra prediction mode is the "128×128 vertical prediction mode", and thus the intra prediction arithmetic unit 703 copies the pixel value of the obtained 64×1-pixel block downward, and generates a predicted image. The above completes intra prediction on CU0a.

Similarly, the reconstructed image obtaining unit 702 obtains a reconstructed image referred to in the intra prediction on CU0b, from the reconstructed image memory 509. The intra prediction mode of the original prediction unit is the "128×128 vertical prediction mode." Accordingly, the reconstructed image to be obtained is a 64×1-pixel block adjacent to and on CU0b, as illustrated in (c) of FIG. 23.

After completion of obtaining a reconstructed image, the intra prediction arithmetic unit 703 performs intra prediction on CU0b using the obtained reconstructed image, and generates a predicted image. At this time, since the intra prediction mode is the "128×128 vertical prediction mode", the intra prediction arithmetic unit 703 copies the pixel value of the obtained 64×1-pixel block downward, and generates a predicted image. The above completes intra prediction on CU0b.

Similarly, the reconstructed image obtaining unit 702 obtains a reconstructed image referred to in intra prediction on CU0c, from the reconstructed image memory 509. The intra prediction mode of the original prediction unit is the "128×128 vertical prediction mode." Accordingly, the reconstructed image to be obtained is a 64×1-pixel block adjacent to and on CU0a, as illustrated in (d) of FIG. 23.

After completion of obtaining the reconstructed image, the intra prediction arithmetic unit 703 performs intra prediction on CU0c using the obtained reconstructed image, and generates a predicted image. At this time, since the intra prediction mode is the "128×128 vertical prediction mode", the intra prediction arithmetic unit 703 copies the pixel value of the obtained 64×1-pixel block downward, and generates a predicted image. The above completes intra prediction on CU0c.

Similarly, the reconstructed image obtaining unit 702 obtains a reconstructed image to be referred to in intra prediction on CU0d, from the reconstructed image memory 509. The intra prediction mode of the original prediction unit is the "128×128 vertical prediction mode." Thus, the reconstructed image to be obtained is a 64×1-pixel block adjacent to and on CU0b, as illustrated in (e) of FIG. 23.

After completion of obtaining the reconstructed image, the intra prediction arithmetic unit 703 performs intra prediction on CU0d using the obtained reconstructed image, and generates a predicted image. At this time, since the intra prediction mode is the "128×128 vertical prediction mode", the intra prediction arithmetic unit 703 copies the pixel value of the obtained 64×1-pixel block downward, and generates a predicted image. The above completes intra prediction on CU0d.

The above completes intra prediction on CU0a to CU0d. Specifically, operation in intra prediction on a prediction unit whose intra prediction mode is the "128×128 vertical prediction mode" is completed.

In the present embodiment, a prediction unit used for the motion compensation process or the intra prediction process is divided. Accordingly, pipeline processing which includes a motion compensation process and an intra prediction process is executed for each 64×64-pixel data unit which has the size of the largest transform unit.

Here, only an example in which the size of a prediction unit is larger than a 64×64-pixel size which is the size of the largest transform unit is described. A prediction unit does not need to be divided if the size of a prediction unit is smaller than 64×64 pixels. In that case, a motion compensation process and an intra prediction process need only be executed on all the prediction units included in the 64×64-pixel block.

In addition, if there is a prediction unit located across a boundary of 64×64 pixels, the image decoding device may divide the prediction unit into plural blocks at the boundary of 64×64 pixels, and the motion compensation process and the intra prediction process may be executed for each 64×64-pixel data unit, as with the above operation.

Figure 24:
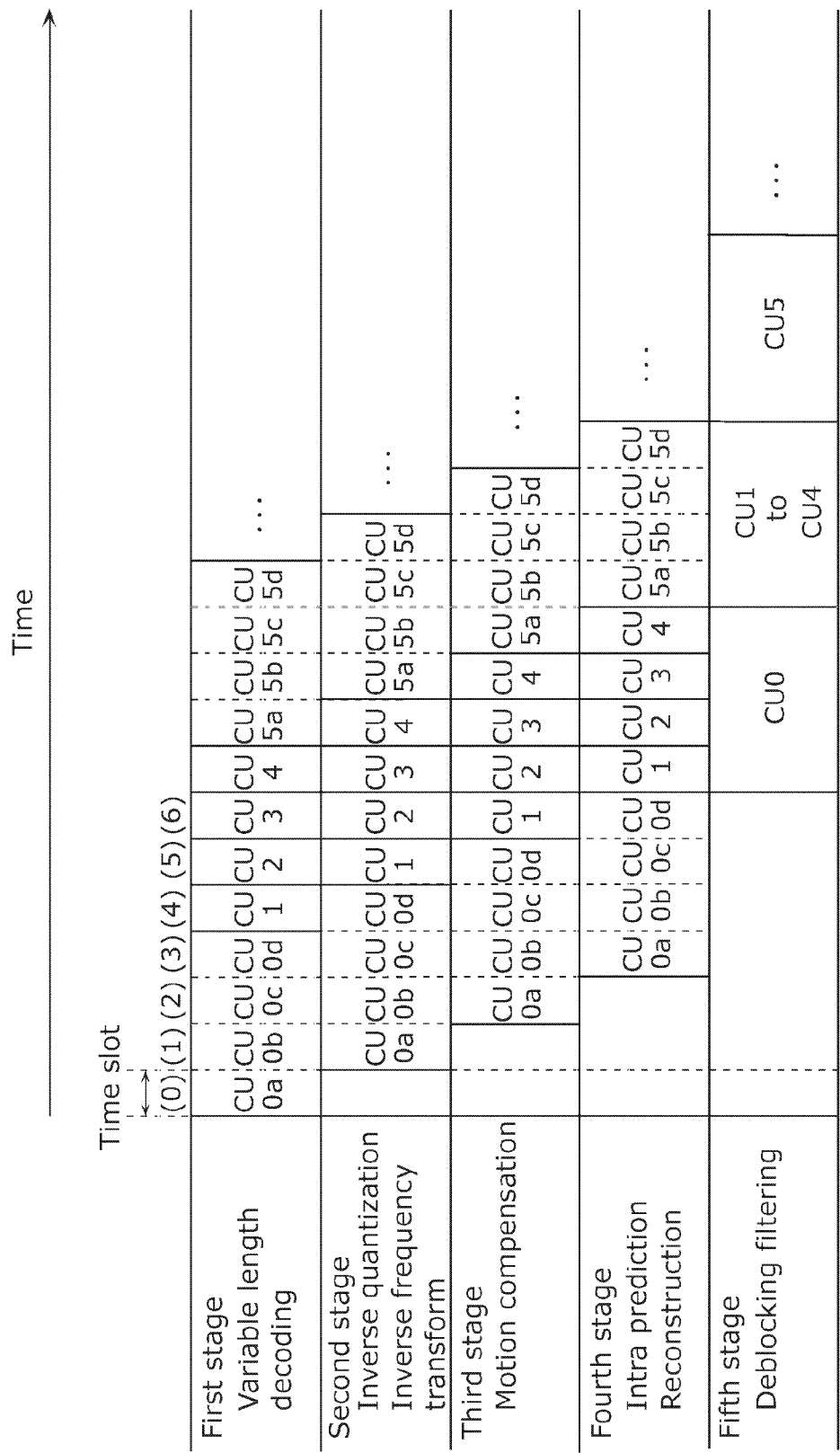
FIG. 24 is a time chart illustrating operation of the image decoding device according to Embodiment 3.

FIG. 24 illustrates time series operation of the image decoding device according to the present embodiment. FIG. 24 illustrates the operation performed when plural coding units illustrated in FIG. 7A are processed. To facilitate a description, among four 64×64-pixel areas obtained by dividing CU0 into four, the upper left area is referred to as CU0a, the upper right area is referred to as CU0b, the lower left area is referred to as CU0c, and the lower right area is referred to as CU0d.

In TS=0, a variable-length decoding process (S1001) at the first stage is performed on CU0a. CU0a is at a head of a coding unit. Thus, the CU header is also processed.

In TS=1, an inverse quantization process (S1002) and an inverse frequency transform process (S1003) at the second stage are performed on CU0a. Simultaneously, the variable-length decoding process (S1001) at the first stage is performed on CU0b.

In TS=2, a motion compensation process (S1005) at the third stage is performed on CU0a, and the inverse quantization process (S1002) and the inverse frequency transform process (S1003) at the second stage are performed on CU0b. Simultaneously, the variable-length decoding process (S1001) at the first stage is performed on CU0c. Here, a prediction unit has a 128×128-pixel size, and is divided into 64×64-pixel data units, as described above.

In TS=3, an intra prediction process (S1006) and a reconstruction process (S1007) at the fourth stage are performed on CU0a, and the motion compensation process (S1005) at the third stage is performed on CU0b. Simultaneously, the inverse quantization process (S1002) and the inverse frequency transform process (S1003) at the second stage are performed on CU0c, and the variable-length decoding process (S1001) at the first stage is performed on CU0d. Here, the prediction unit of CU0 has a 128×128-pixel size, and is divided into 64×64-pixel data units, as described above.

In TS=4, the intra prediction process (S1006) and the reconstruction process (S1007) at the fourth stage are performed on CU0b, and the motion compensation process (S1005) at the third stage is performed on CU0c. Simultaneously, the inverse quantization process (S1002) and the inverse frequency transform process (S1003) at the second stage are performed on CU0d, and the variable-length decoding process (S1001) at the first stage is performed on CU1. Here, the prediction unit of CU0 has a 128×128-pixel size, and is divided into 64×64-pixel data units as described above.

In TS=5, the intra prediction process (S1006) and the reconstruction process (S1007) at the fourth stage are performed on CU0c, and the motion compensation process (S1005) at the third stage is performed on CU0d. Simultaneously, the inverse quantization process (S1002) and the inverse frequency transform process (S1003) at the second stage are performed on CU1, and the variable-length decoding process (S1001) at the first stage is performed on CU2. Here, the prediction unit of CU0 has a 128×128-pixel size, and is divided into 64×64-pixel data units, as described above.

In TS=6, the intra prediction process (S1006) and the reconstruction process (S1007) at the fourth stage are performed on CU0d, and the motion compensation process (S1005) at the third stage is performed on CU1. Simultaneously, the inverse quantization process (S1002) and the inverse frequency transform process (S1003) at the second stage are performed on CU2, and the variable-length decoding process (S1001) at the first stage is performed on CU3. Here, the prediction unit of CU0 has a 128×128-pixel size, and is divided into 64×64-pixel data units, as described above.

Processing in TS=7 and the following slots is similar to the processing in TS=0 through TS=6, and thus a description thereof is omitted.

In the present embodiment, as shown in FIGS. 5A and 5B, if the size of a coding unit is 128×128 pixels, the size of a transform unit is always 64×64 pixels or less. Further, a coded stream is sequentially formed based on a 64×64-pixel data unit. Accordingly, pipeline processing is executed based on the 64×64-pixel data unit which is the maximum size of a transform unit.

Furthermore, a prediction unit which includes more than 64×64 pixels is divided, whereby the motion compensation process and the intra prediction process are also executed for each 64×64-pixel data unit.

In the present embodiment, the amount of data to be processed at each stage of pipelining is constant, compared with FIG. 64 illustrating the conventional operation. Accordingly, idle time in the processes is reduced, and pipeline processing is executed efficiently.

Here, the variable-length decoding process (S1001) is performed on CU0a in TS=0, in TS=1, the inverse quantization process (S1002) is performed on CU0a, and the variable-length decoding process (S1001) is performed on CU0b simultaneously.

These processes are executed by disposing a memory 511 between the variable length decoding unit 503 and the inverse quantization unit 504, as illustrated in FIG. 2. Specifically, in TS=0, the variable length decoding unit 503 writes the result of the variable-length decoding process on CU0a into the memory 511. In TS=1, the inverse quantization unit 504 reads the result written by the variable length decoding unit 503, from the memory 511. Then, the inverse quantization unit 504 performs the inverse quantization process on CU0a.

Simultaneously, in TS=1, the variable length decoding unit 503 writes the result of the variable-length decoding process on CU0b into the memory 511. It is sufficient for the memory 511 to have the memory capacity for storing a data unit for executing pipeline processing. The data unit in the present embodiment is the largest transform unit, and the size thereof is 64×64 pixels. In other words, the memory capacity according to the present embodiment may be smaller than that in Embodiment 1 in which a data unit is the largest coding unit which includes 128×128 pixels.

Although the above description is given of the memory between the variable length decoding unit 503 and the inverse quantization unit 504, an equivalent memory may also be disposed between other process units. An equivalent memory may be disposed in a control unit 501. In addition, in the present embodiment, the pipelining is formed based on a largest coding unit in the deblocking filtering process at the fifth stage. Accordingly, the memory capacity for storing data necessary for processing at least a 128×128-pixel largest coding unit is necessary for this process, as with Embodiment 1.

The above is a description of operation of the image decoding device according to the present embodiment.

(3-4. Advantageous Effect)

The image decoding device described in the present embodiment executes pipeline processing for each data unit which is the largest transform unit. Accordingly, the amount of data to be processed at each stage is constant. Consequently, the processing time at each stage of pipelining is constant. Thus, pipeline processing is executed efficiently. As a result, processing performance improves. In addition, a circuit operates efficiently, thereby allowing reduction in power consumption.

Furthermore, compared with Embodiment 2, pipeline processing is executed for each data unit which is the largest transform unit also in the motion compensation process and the intra prediction process. The largest transform unit is smaller than the largest coding unit. Accordingly, it is possible to reduce the capacity of a memory disposed between process units, and it is possible to decrease a circuit size.

(3-5. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL 2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

The configuration of the pipeline processing described in the present embodiment is an example. Plural processes do not necessarily need to be divided at plural stages as described in the present embodiment. For example, some processes may be executed at one stage, or one process may be divided at some stages.

Variable length codes are used in the present embodiment. A coding scheme for variable length codes may be any coding scheme such as Huffman coding, run length coding, or arithmetic coding.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

Furthermore, pipeline processing is executed for each 64×64-pixel data unit which has the size of the largest transform unit, in the present embodiment. However, the size of a data unit is not necessarily limited to 64×64 pixels.

Generally, a frequency transform process is executed using all the data included in one data unit. Thus, it is difficult to divide a transform unit. Therefore, the size of the largest transform unit is selected in the present embodiment. However, if it is difficult to divide a data unit used for a process other than the frequency transform process, pipeline processing may be executed for each data unit used for that process.

In addition, in the present embodiment, the reconstructed image memory 509 is illustrated explicitly. However, a memory in each process unit may be used as the reconstructed image memory 509, and the frame memory 502 may be used as the reconstructed image memory 509.

In the present embodiment, the presence of a skip block for which the amount of coding a coding unit is zero is not described. However, even if a skip block is present, the image decoding device according to the present embodiment may execute pipeline processing based on the size of the largest transform unit. Furthermore, even if a skip block is present, the image decoding device according to the present embodiment may divide a prediction unit used for motion compensation or intra prediction, based on the size of the largest transform unit.

No mention is made of a peripheral pixel necessary for a filtering process on a reference image in the present embodiment. However, the image decoding device may obtain data of a peripheral pixel to be used for the filtering process as necessary, when a reference image is obtained from a picture decoded in the past.

In addition, decoding processing is described as an example in the present embodiment. However, pipeline processing is not limited to decoding processing. Coding processing which is processing opposite to decoding processing may be executed by pipelining, as with the present embodiment. Accordingly, the memory capacity is decreased, and the circuit size is reduced.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

Embodiment 4

(4-1. Outline)

First is a description of the outline of an image decoding device according to the present embodiment. The image decoding device according to the present embodiment decodes a coded stream. The size of each coding unit included in a coded stream can be changed. The image decoding device divides plural processes included in decoding processing at plural stages, and performs the plural processes in parallel by pipelining.

At that time, the image decoding device performs plural processes based on the size of a transform unit. It should be noted that a transform unit is a data unit for performing frequency transform. A transform unit is included in a coding unit which is included in a coded stream.

In addition, in the present embodiment, a deblocking filtering process on a coded stream is executed in order different from the order determined in the H.264 standard. Then, a motion compensation process, an intra prediction process, and a deblocking filtering process are executed based on the size of a transform unit.

Accordingly, even if plural coding units have various sizes, irrespective of the size of each coding unit, the amount of data to be processed in each of plural processes included in pipeline processing is equivalent. Consequently, idle time in pipeline processing is reduced, and pipeline processing is performed efficiently. Thus, performance improves. In addition, it is possible to further reduce the capacity of a memory disposed between process units, compared with Embodiment 3.

The above is a description of the outline of the image decoding device according to the present embodiment.

(4-2. Configuration)

FIG. 12 illustrates a configuration of the image decoding device according to the present embodiment. The configuration of the image decoding device according to the present embodiment is the same as that in Embodiment 3, and thus a description thereof is omitted.

FIG. 2 is a configuration diagram illustrating a connection between a variable length decoding unit 503 and an inverse quantization unit 504. The configuration of the connection is the same as that in Embodiment 3, and thus a description thereof is omitted.

(4-3. Operation)

The operation of the image decoding device according to the present embodiment is the same as that of the operation illustrated in the flowcharts in FIGS. 8 and 9, and also is the same as the operation in Embodiment 3. However, a difference is a deblocking filtering process (S1008).

Figure 26:
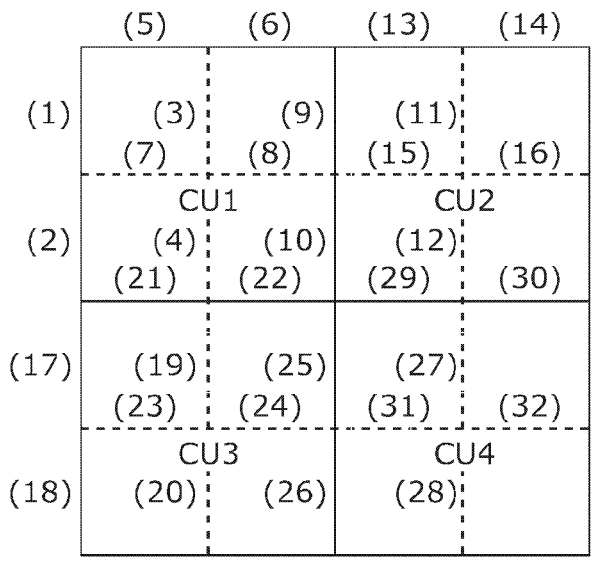
FIG. 26 illustrates a first example of the order of the deblocking filtering process according to Embodiment 4.

The image decoding device according to the present embodiment performs a deblocking filtering process on CU1 to CU4 illustrated in FIG. 7A in the numerical order illustrated in FIG. 26. Specifically, a deblocking filtering unit 510 performs a deblocking filtering process in the following order: the vertical boundary of CU1, the horizontal boundary of CU1, the vertical boundary of CU2, the horizontal boundary of CU2, the vertical boundary of CU3, the horizontal boundary of CU3, the vertical boundary of CU4, and the horizontal boundary of CU4.

Accordingly, immediately after a reconstruction unit 508 completes a reconstruction process (S1007) on CU1, the deblocking filtering unit 510 can perform a deblocking filtering process (S1008) on CU1. A memory which can store a 64×64-pixel data unit need only be disposed between the reconstruction unit 508 and the deblocking filtering unit 510.

Figure 27:
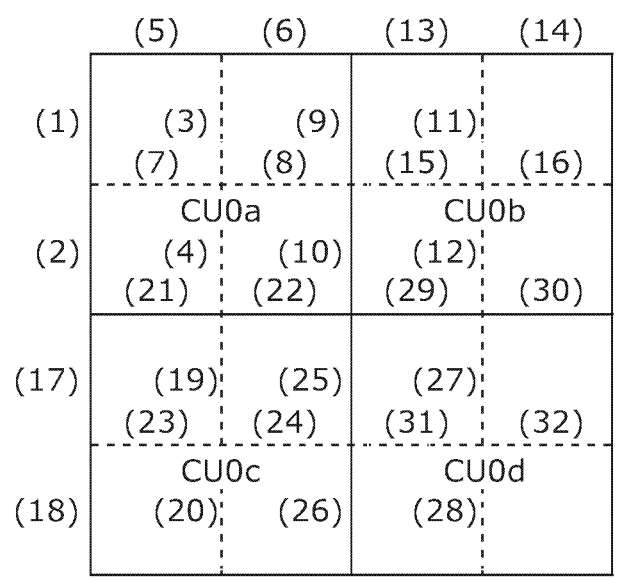
FIG. 27 illustrates a second example of the order of the deblocking filtering process according to Embodiment 4.

In addition, similarly, the image decoding device according to the present embodiment performs a deblocking filtering process on CU0 illustrated in FIG. 7A, in the numerical order illustrated in FIG. 27. Specifically, the deblocking filtering unit 510 performs a deblocking filtering process in the following order: the vertical boundary of CU0a, the horizontal boundary of CU0a, the vertical boundary of CU0b, the horizontal boundary of CU0b, the vertical boundary of CU0c, the horizontal boundary of CU0c, the vertical boundary of CU0d, and the horizontal boundary of CU0d.

Accordingly, immediately after the reconstruction unit 508 completes the reconstruction process (S1007) on CU0a, the deblocking filtering unit 510 can perform the deblocking filtering process (S1008) on CU0a. It should be noted that CU0a is an upper left area among four 64×64-pixel areas obtained by dividing CU0 into four. Similarly, CU0b is an upper right area, CU0c is a lower left area, and CU0d is a lower right area.

Figure 28:
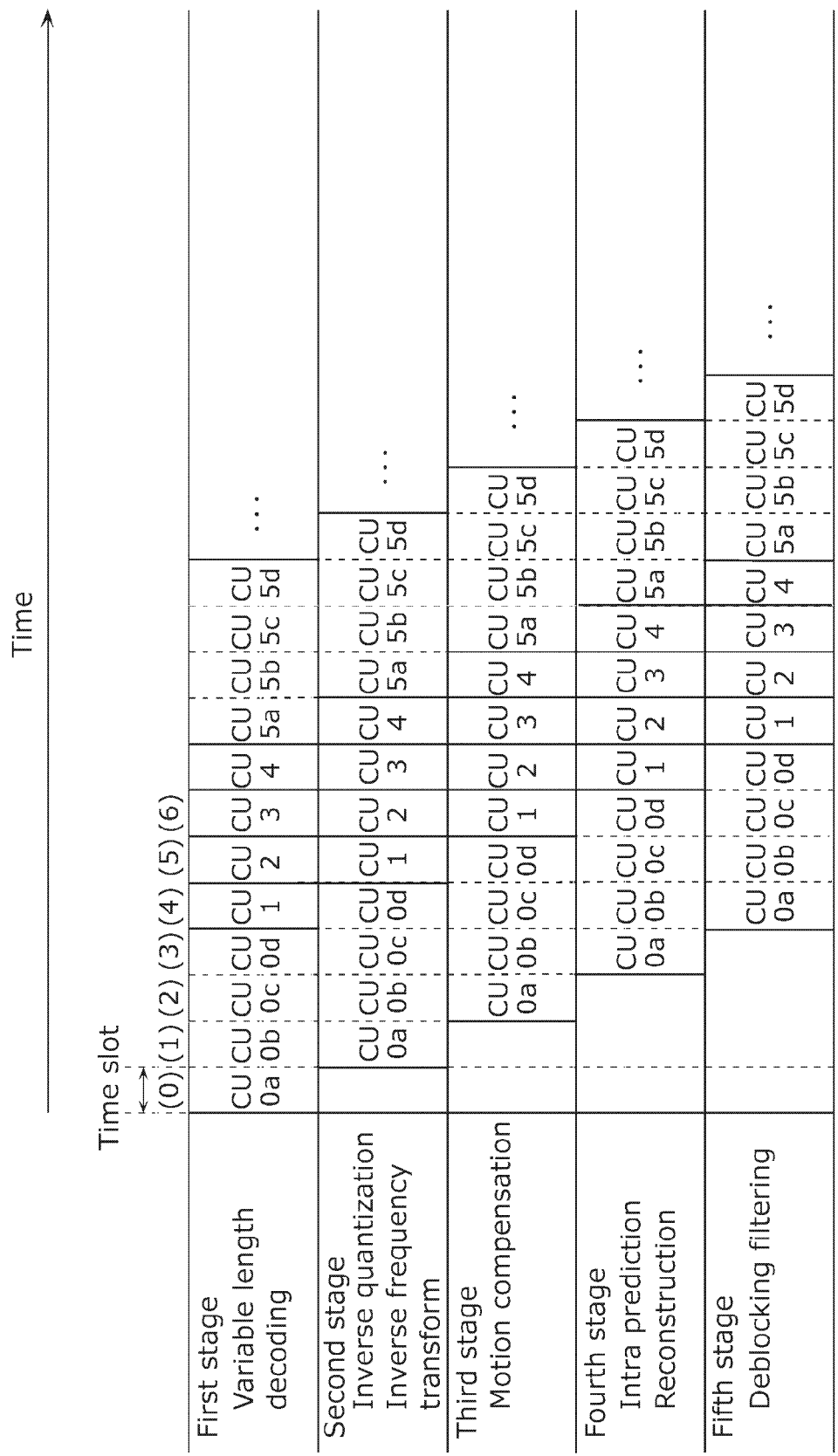
FIG. 28 is a time chart illustrating operation of an image decoding device according to Embodiment 4.

FIG. 28 illustrates time series operation of the image decoding device according to the present embodiment. FIG. 28 illustrates the operation performed when plural coding units illustrated in FIG. 7A are processed.

In TS=0, a variable-length decoding process (S1001) at the stage is performed on CU0a. CU0a is at a head of a coding unit. Accordingly, the CU header is also processed.

In TS=1, an inverse quantization process (S1002) and an inverse frequency transform process (S1003) at the second stage are performed on CU0a. Simultaneously, the variable-length decoding process (S1001) at the first stage is performed on CU0b.

In TS=2, a motion compensation process (S1005) at the third stage is performed on CU0a, and the inverse quantization process (S1002) and the inverse frequency transform process (S1003) at the second stage are performed on CU0b. Simultaneously, the variable-length decoding process (S1001) at the first stage is performed on CU0c. Here, although the size of a prediction unit is 128×128 pixels, the prediction unit is divided into 64×64-pixel data units, as described above.

In TS=3, an intra prediction process (S1006) and a reconstruction process (S1007) at the fourth stage are performed on CU0a, and the motion compensation process (S1005) at the third stage is performed on CU0b. Simultaneously, the inverse quantization process (S1002) and the inverse frequency transform process (S1003) at the second stage are performed on CU0c, and the variable-length decoding process (S1001) at the first stage is performed on CU0d. Here, the size of the prediction unit of CU0 is 128×128 pixels, and is divided into 64×64-pixel data units, as described above.

In TS=4, the deblocking filtering process (S1008) at the fifth stage is performed on CU0a, and the intra prediction process (S1006) and the reconstruction process (S1007) at the fourth stage are performed on CU0b, Simultaneously, the motion compensation process (S1005) at the third stage is performed on CU0c, and the inverse quantization process (S1002) and the inverse frequency transform process (S1003) at the second stage are performed on CU0d. Simultaneously, the variable-length decoding process (S1001) at the first stage is performed on CU1. Here, the size of the prediction unit of CU0 is 128×128 pixels, and is divided into 64×64-pixel data units, as described above.

In TS=5, the deblocking filtering process (S1008) at the fifth stage is performed on CU0b, and the intra prediction process (S1006) and the reconstruction process (S1007) at the fourth stage are performed on CU0c. Simultaneously, the motion compensation process (S1005) at the third stage is performed on CU0d, and the inverse quantization process (S1002) and the inverse frequency transform process (S1003) at the second stage are performed on CU1. Simultaneously, the variable-length decoding process (S1001) at the first stage is performed on CU2. Here, the size of the prediction unit of CU0 is 128×128 pixels, and is divided into 64×64-pixel data units, as described above.

In TS=6, the deblocking filtering process (S1008) at the fifth stage is performed on CU0c, and the intra prediction process (S1006) and the reconstruction process (S1007) at the fourth stage are performed on CU0d. Simultaneously, the motion compensation process (S1005) at the third stage is performed on CU1, and the inverse quantization process (S1002) and the inverse frequency transform process (S1003) at the second stage are performed on CU2. Simultaneously, the variable-length decoding process (S1001) at the first stage is performed on CU3. Here, the size of the prediction unit of CU0 is 128×128 pixels, and is divided into 64×64-pixel data units as described above.

Processing in TS=7 and the following slots is similar to the processing in TS=0 through TS=6, and thus a description thereof is omitted.

In the present embodiment, the amount of data to be processed at each stage of pipelining is constant, compared with FIG. 64 illustrating the conventional operation. Accordingly, idle time in each process is reduced, and pipeline processing is executed efficiently.

Here, in TS=0, the variable-length decoding process (S1001) is performed on CU0a, In TS=1, the inverse quantization process (S1002) is performed on CU0a, and the variable-length decoding process (S1001) is performed on CU0b, simultaneously.

These processes are executed by disposing a memory 511 between the variable length decoding unit 503 and the inverse quantization unit 504, as illustrated in FIG. 2. Specifically, in TS=0, the variable length decoding unit 503 writes the result of the variable-length decoding process on CU0a into the memory 511. In TS=1, the inverse quantization unit 504 reads the result written by the variable length decoding unit 503 from the memory 511. Then, the inverse quantization unit 504 performs an inverse quantization process on CU0*a*.

Simultaneously, in TS=1, the variable length decoding unit 503 writes the result of the variable-length decoding process on CU0*b* into the memory 511. It is sufficient that the memory 511 has the memory capacity for storing a data unit for executing pipelining. The data unit in the present embodiment is the largest transform unit, and the size thereof is 64×64 pixels. Accordingly, the memory capacity according to the present embodiment may be smaller than Embodiment 1 in which a data unit is the largest coding unit including 128×128 pixels.

Although the above description is given of the memory between the variable length decoding unit 503 and the inverse quantization unit 504, an equivalent memory may also be disposed between other process units. In addition, an equivalent memory may be disposed in a control unit 501. In addition, in the present embodiment, the entire pipelining is formed based on the size of the largest transform unit which includes 64×64 pixels. Accordingly, it is possible to reduce memory capacity compared with Embodiments 1 to 3.

The above is a description of operation of the image decoding device according to the present embodiment.

(4-4. Advantageous Effect)

The image decoding device described in the present embodiment executes pipeline processing for each data unit which is the largest transform unit. Accordingly, the amount of data to be processed at each stage is constant. Consequently, the processing time for each stage of pipelining is constant. Thus, pipeline processing is executed efficiently. As a result, processing performance improves. In addition, a circuit operates efficiently, thereby also allowing reduction in power consumption.

In addition, the processing order of the deblocking filtering process has been changed from that in Embodiment 3. Further, pipeline processing is executed for each data unit which is the largest transform unit, also in the deblocking filtering process. The largest transform unit is smaller than the largest coding unit. Accordingly, it is possible to reduce capacity of a memory disposed between process units, and it is possible to decrease a circuit size.

(4-5. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL 2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

The configuration of the pipeline processing described in the present embodiment is an example. Plural processes do not necessarily need to be divided at plural stages as described in the present embodiment. For example, some processes may be executed at one stage, or one process may be divided at some stages.

Variable length codes are used in the present embodiment. A coding scheme for variable length codes may be any coding scheme such as Huffman coding, run length coding, or arithmetic coding.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

Furthermore, pipeline processing is executed for each 64×64-pixel data unit which has the size of the largest transform unit, in the present embodiment. However, the size of a data unit is not necessarily limited to 64×64 pixels.

Generally, a frequency transform process is executed using all the data included in one data unit. Thus, it is difficult to divide a transform unit. Therefore, the size of the largest transform unit is selected in the present embodiment. However, if it is difficult to divide a data unit used for a process other than the frequency transform process, pipeline processing may be executed for each data unit used for that process.

In addition, in the present embodiment, the reconstructed image memory 509 is illustrated explicitly. However, a memory in each process unit may be used as the reconstructed image memory 509, and the frame memory 502 may be used as the reconstructed image memory 509.

Furthermore, in the present embodiment, the change of the processing order of the deblocking filtering process is applied to the image decoding device according to Embodiment 3. However, the change of the processing order of the deblocking filtering process may be applied to the image decoding device according to Embodiment 1 or 2.

Furthermore, in the present embodiment, the deblocking filtering process is performed on the vertical boundary of CU1, and thereafter on the horizontal boundary. However, the order of performing the deblocking filtering process is not limited to the above-described order, and may be any order.

In the present embodiment, the presence of a skip block for which the amount of coding a coding unit is zero is not described. However, even if a skip block is present, the image decoding device according to the present embodiment may execute pipeline processing based on the size of the largest frequency transform unit. Furthermore, even if a skip block is present, the image decoding device according to the present embodiment may divide a prediction unit used for motion compensation or intra prediction, based on the size of the largest frequency transform unit.

Furthermore, in the present embodiment, plural coding units are coded in the raster order. However, in the arbitrary slice order (ASO) according to the H.264 standard, plural coding units are not coded in the raster order. In such a case, the image decoding device does not perform the deblocking filtering process on the slice boundary, but performs the deblocking filtering process only on the inner part of a slice. This achieves the processing order similar to that in the present embodiment, and allows pipeline processing similar thereto to be executed.

In addition, decoding processing is described as an example in the present embodiment. However, pipeline processing is not limited to decoding processing. Coding processing which is processing opposite to decoding processing may be executed by pipelining, as with the present embodiment. Accordingly, the memory capacity is decreased, and the circuit size is reduced.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

Embodiment 5

(5-1. Outline)

First is a description of the outline of an image decoding device according to the present embodiment. The image decoding device according to the present embodiment decodes a coded stream. The size of a coding unit included in a coded stream can be changed. In addition, the image decoding device divides plural processes included in decoding processing at plural stages, and performs plural processes in parallel by pipelining.

At this time, the image decoding device performs plural processes based on the size of a transform unit. It should be noted that a transform unit is a data unit for performing frequency transform. In addition, a transform unit is included in a coding unit which is included in a coded stream.

In addition, the Image decoding device divides a prediction unit to be used for a motion compensation process and an intra prediction process, based on the size of a transform unit, when performing plural processes included in decoding processing.

Accordingly, even if plural coding units have various sizes, irrespective of the size of each coding unit, the amount of data to be processed in each of plural processes included in pipeline processing is equivalent. Accordingly, idle time in pipeline processing is reduced, and pipeline processing is performed efficiently. Therefore, performance improves.

In addition, the image decoding device according to the present embodiment can use the result of inter prediction for intra prediction in each time slot.

The above is a description of the outline of the image decoding device according to the present embodiment.

(5-2. Configuration)

Next is a description of the configuration of the image decoding device according to the present embodiment.

Figure 29:
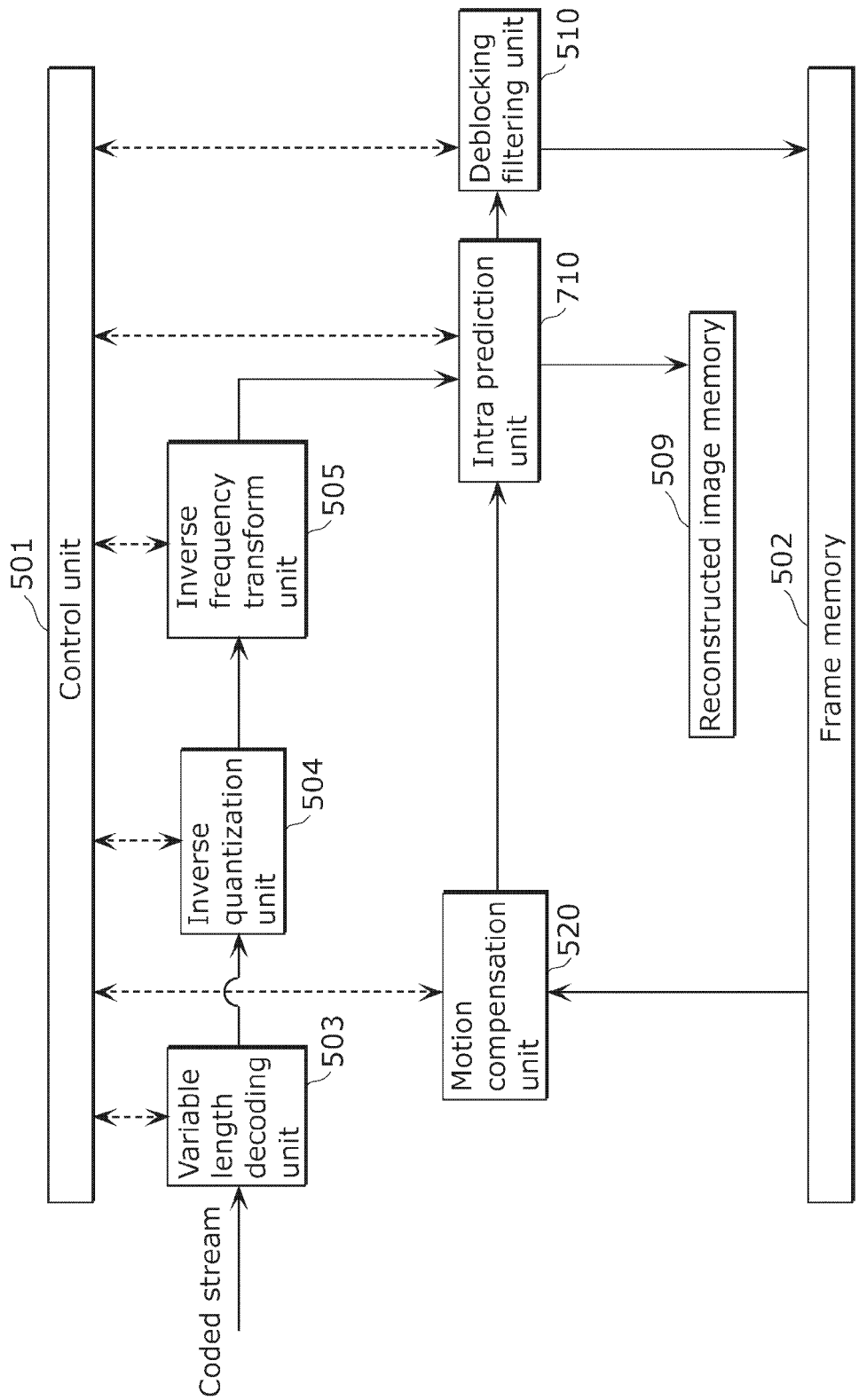
FIG. 29 illustrates a configuration of an image decoding device according to Embodiment 5.

FIG. 29 illustrates a configuration of the image decoding device according to the present embodiment. The same numerals are assigned to the same constituent elements as those in Embodiment 1 illustrated in FIG. 1, and a description thereof is omitted. The image decoding device according to the present embodiment includes an intra prediction unit 710. The intra prediction unit 710 performs an intra prediction process for each data unit having the size of the largest coding unit, while performing a reconstruction process.

FIG. 2 is a configuration diagram illustrating a connection between a variable length decoding unit 503 and an inverse quantization unit 504. The configuration of the connection is the same as that in Embodiment 1, and thus a description thereof is omitted.

Figure 30:
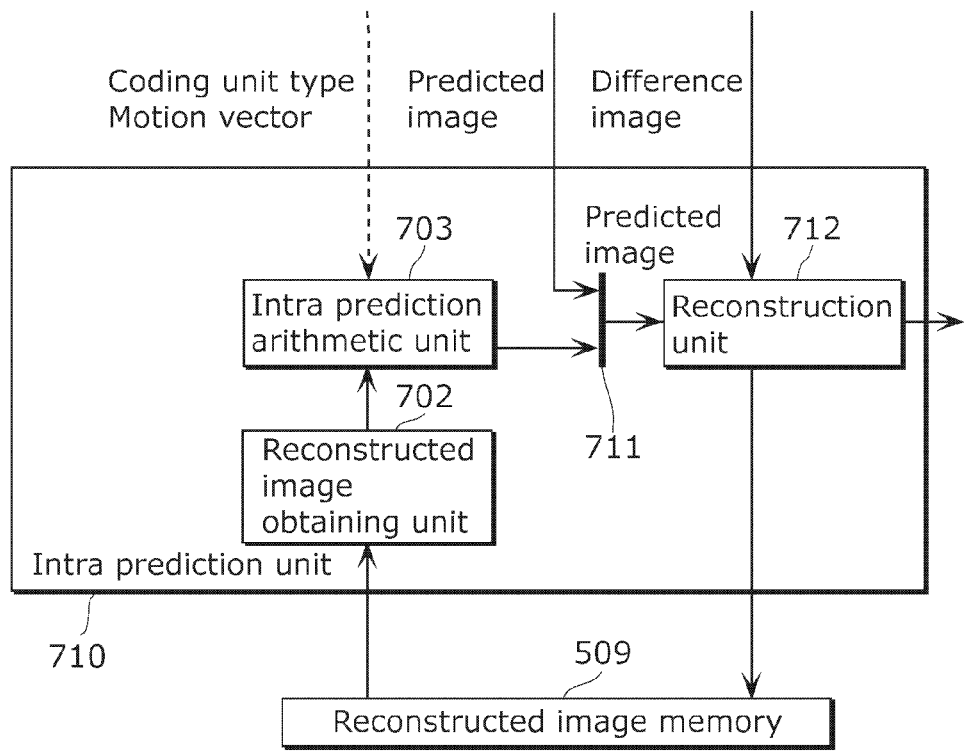
FIG. 30 illustrates a configuration of an intra prediction unit according to Embodiment 5.

FIG. 30 illustrates the configuration of the intra prediction unit 710 in FIG. 29. The same numerals are assigned to the same constituent elements as those illustrated in FIG. 29, and a description thereof is omitted. The intra prediction unit 710 includes a reconstructed image obtaining unit 702, an intra prediction arithmetic unit 703, a switch 711, and a reconstruction unit 712.

The reconstructed image obtaining unit 702 obtains a reconstructed image. The intra prediction arithmetic unit 703 generates an intra-predicted image. The switch 711 switches between inter prediction and intra prediction. The reconstruction unit 712 generates a decoded image using a predicted image and a difference image. A reconstructed image memory 509 is a memory for storing a reconstructed image.

The above is a description of the configuration of the image decoding device according to the present embodiment.

(5-3. Operation)

In the present embodiment, the structure of a coded stream illustrated in FIGS. 3A to 6B is used as with Embodiment 1.

Figure 31:
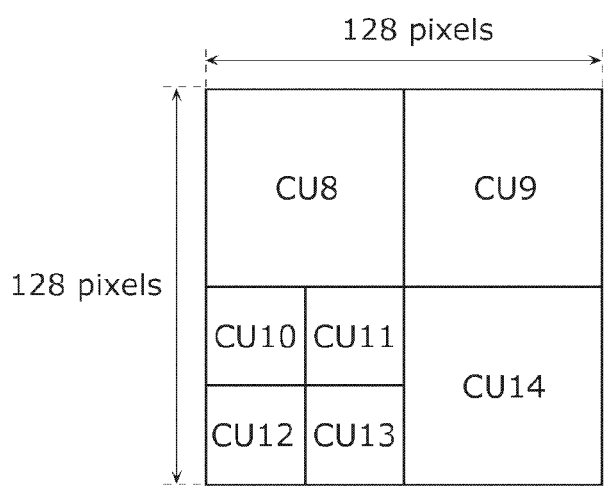
FIG. 31 illustrates an example of a configuration of plural coding units used for describing operation according to Embodiment 5.

FIG. 31 illustrates an example of a configuration of plural coding units used for describing the operation. In addition, FIG. 31 illustrates plural coding units subsequent to the coding units in FIG. 7A. The plural coding units illustrated in FIG. 31 include CU8 and CU9 each including 64×64 pixels, CU10 to CU13 each including 32×32 pixels, and CU14 including 64×64 pixels. Intra prediction is used for CU12. Inter prediction is used for all the coding units except for CU12.

The operation flow of the image decoding device according to the present embodiment is the same as that in Embodiment 1 illustrated in FIGS. 8 and 9, except for an intra prediction process (S1006) and a reconstruction process (S1007), and thus a description thereof is omitted. The following is a description of the intra prediction process (S1006) and the reconstruction process (S1007).

Figure 32:
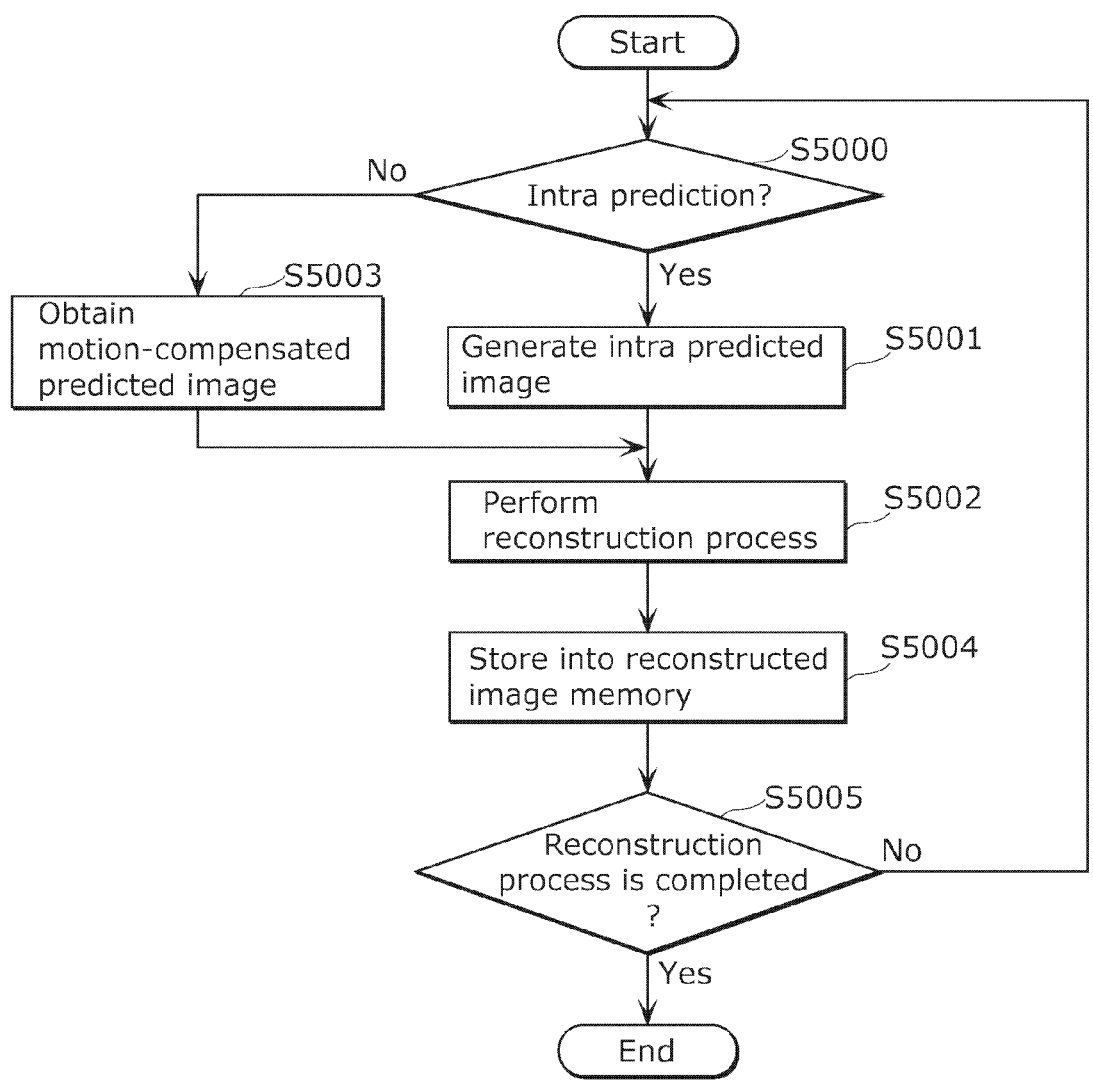
FIG. 32 is a flowchart illustrating operation of the intra prediction unit according to Embodiment 5.

A description is given of the intra prediction process (S1006) and the reconstruction process (S1007) performed by the intra prediction unit 710 according to the present embodiment, using the flowchart illustrated in FIG. 32. First, the intra prediction unit 710 determines whether intra prediction is used for a current coding unit to be processed (S5000). If intra prediction is used for the coding unit (Yes in S5000), the reconstructed image obtaining unit 702 obtains an image from the reconstructed image memory 509. Then, the intra prediction arithmetic unit 703 generates an intra-predicted image (S5001).

If intra prediction is not used for the coding unit (No in S5000), the reconstruction unit 712 obtains the predicted image generated by a motion compensation unit 520 performing inter prediction (S5003). Next, the reconstruction unit 712 generates a reconstructed image from the predicted image and a difference image (S5002). Then, the reconstruction unit 712 stores, into the reconstructed image memory 509, an image which may be referred to, among generated reconstructed images (S5004).

Next, the intra prediction unit 710 determines whether the reconstruction process is completed for all the coding units (S5005).

If the reconstruction process is not completed for all the coding units (No in S5005), the intra prediction unit 710 determines again whether intra prediction is used (S5000). If the reconstruction process is completed for all the coding units (Yes in S5005), the intra prediction unit 710 ends the processing.

The above is the operation of the image decoding device according to the present embodiment. In the present embodiment, the intra prediction unit 710 performs the reconstruction process as described above. Accordingly, pipeline processing is executed smoothly.

For example, there are cases where a 64×64-pixel block which is one data unit is further divided into plural coding units, and intra prediction is used for one of the plural coding units, as shown by CU12 illustrated in FIG. 31. Even in such a case, the intra prediction unit 710 performs the reconstruction process on CU10 and on CU11, and thereafter can perform the intra prediction process on CU12 using the resultant reconstructed images.

(5-4. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL 2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

Pipeline configuration achieved using the intra prediction unit 710 according to the present embodiment may be any of the configurations described in Embodiment 1 (FIG. 10), Embodiment 2 (FIG. 11), Embodiment 3 (FIG. 24), and Embodiment 4 (FIG. 29), for instance.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

Furthermore, pipeline processing is executed for each 64×64-pixel data unit which has the size of the largest transform unit, in the present embodiment. However, the size of a data unit is not necessarily limited to 64×64 pixels.

Generally, a frequency transform process is executed using all the data included in one data unit. Thus, it is difficult to divide a transform unit. Therefore, the size of the largest transform unit is selected in the present embodiment. However, if it is difficult to divide a data unit used for a process other than the frequency transform process, pipeline processing may be executed for each data unit used for that process.

In addition, in the present embodiment, the reconstructed image memory 509 is illustrated explicitly. However, a memory in each process unit may be used as the reconstructed image memory 509, and the frame memory 502 may be used as the reconstructed image memory 509.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

Embodiment 6

(6-1. Outline)

First is a description of the outline of an image decoding device according to the present embodiment. The image decoding device according to the present embodiment decodes a coded stream. The size of a coding unit included in a coded stream can be changed, in addition, the image decoding device divides plural processes included in decoding processing at plural stages, and performs the plural processes in parallel by pipelining.

At that time, the image decoding device performs plural processes, based on the size of a transform unit. It should be noted that a transform unit is a data unit for performing frequency transform. In addition, a transform unit is included in a coding unit which is included in a coded stream.

In addition, the image decoding device divides a prediction unit to be used for a motion compensation process and an intra prediction process, based on the size of a transform unit, when performing plural processes included in decoding processing.

Accordingly, even if plural coding units have various sizes, the amount of data to be processed in each of plural processes included in pipeline processing is equivalent, irrespective of the size of each coding unit. Consequently, idle time in pipeline processing is reduced, and pipeline processing is performed efficiently. Thus, processing performance improves.

In addition, the image decoding device efficiently decodes a coded stream in which luma data (luma information) and chroma data (chroma information) are arranged separately. In other words, the image decoding device executes a following process on luma data, without waiting for the end of a variable-length decoding process on chroma data. Thus, the capacity of a buffer memory can be reduced.

The above is a description of the outline of the image decoding device according to the present embodiment.

(6-2. Configuration)

FIG. 29 illustrates a configuration of the image decoding device according to the present embodiment. The configuration of the image decoding device according to the present embodiment is the same as that in Embodiment 5, and thus a description thereof is omitted.

FIG. 2 is a configuration diagram illustrating a connection between a variable length decoding unit 503 and an inverse quantization unit 504. The configuration of the connection is the same as that in Embodiment 1, and thus a description thereof is omitted.

FIG. 30 illustrates the configuration of an intra prediction unit 710 in FIG. 29. The configuration of the intra prediction unit 710 is the same as that in Embodiment 5, and thus a description thereof is omitted.

(6-3. Operation)

Figure 33:
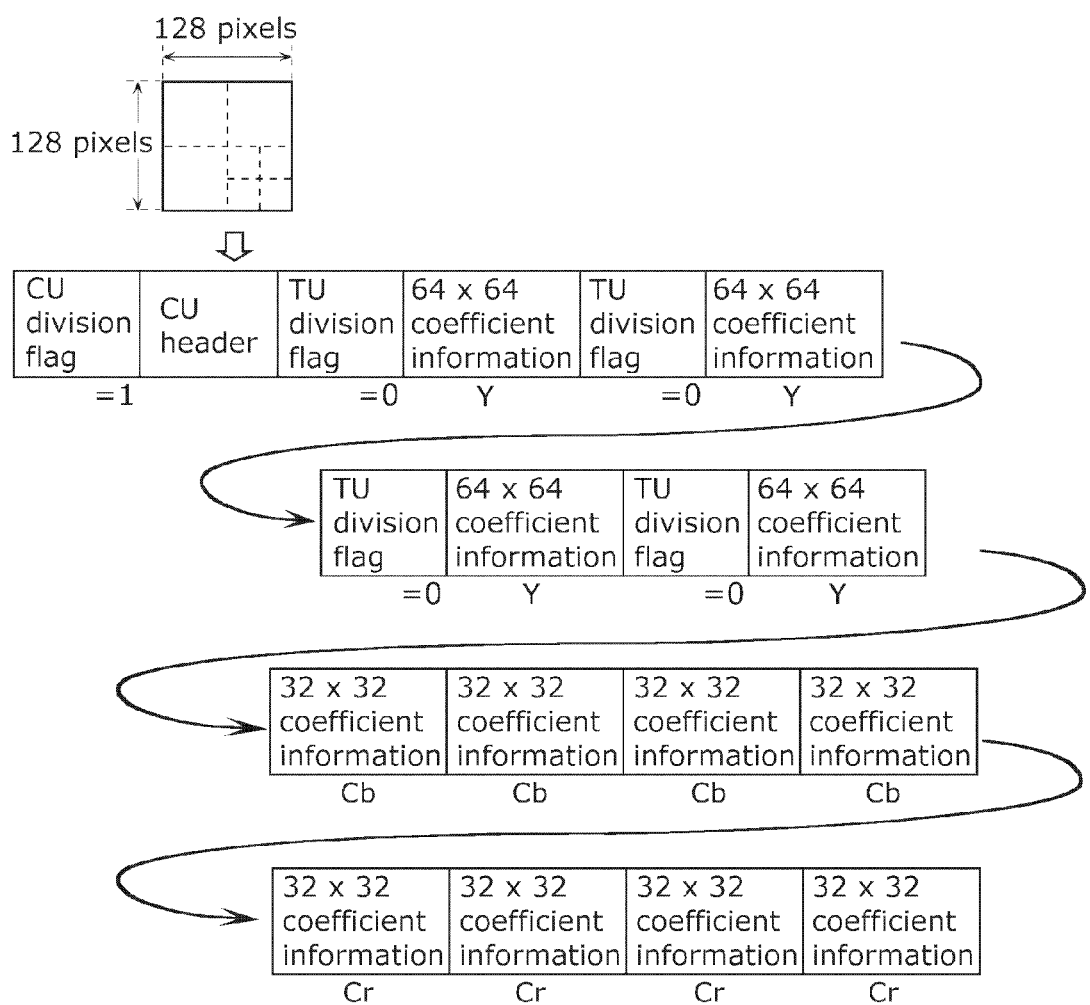
FIG. 33 illustrates an example of a configuration of transform units according to Embodiment 6.

In the present embodiment, as with Embodiment 5, the structure of a coded stream illustrated in FIGS. 3A to 4B, 6A, and 6B is used. However, in the present embodiment, the configuration of coefficient information in a coded stream is different from the configuration in Embodiment 5, as illustrated in FIG. 33.

In the present embodiment, in a coded stream, coefficient data of luma (denoted by Y in FIG. 33) is provided for each 64×64-pixel transform unit. In addition, following luma, coefficient data of blue chroma (denoted by Cb in FIG. 33) is provided for each 32×32-pixel transform unit. Next, coefficient data of red chroma (denoted by Cr in FIG. 33) is provided for each 32×32-pixel transform unit.

In addition, in the present embodiment, the format of 4:2:0 is assumed to be a format of an image. Accordingly, the size of data of chroma (Cb, Cr) is 32×32 pixels.

The operation flow of the image decoding device according to the present embodiment is the same as that in Embodiment 5 illustrated in FIGS. 8, 9, and 32, and thus a description thereof is omitted.

Figure 34:
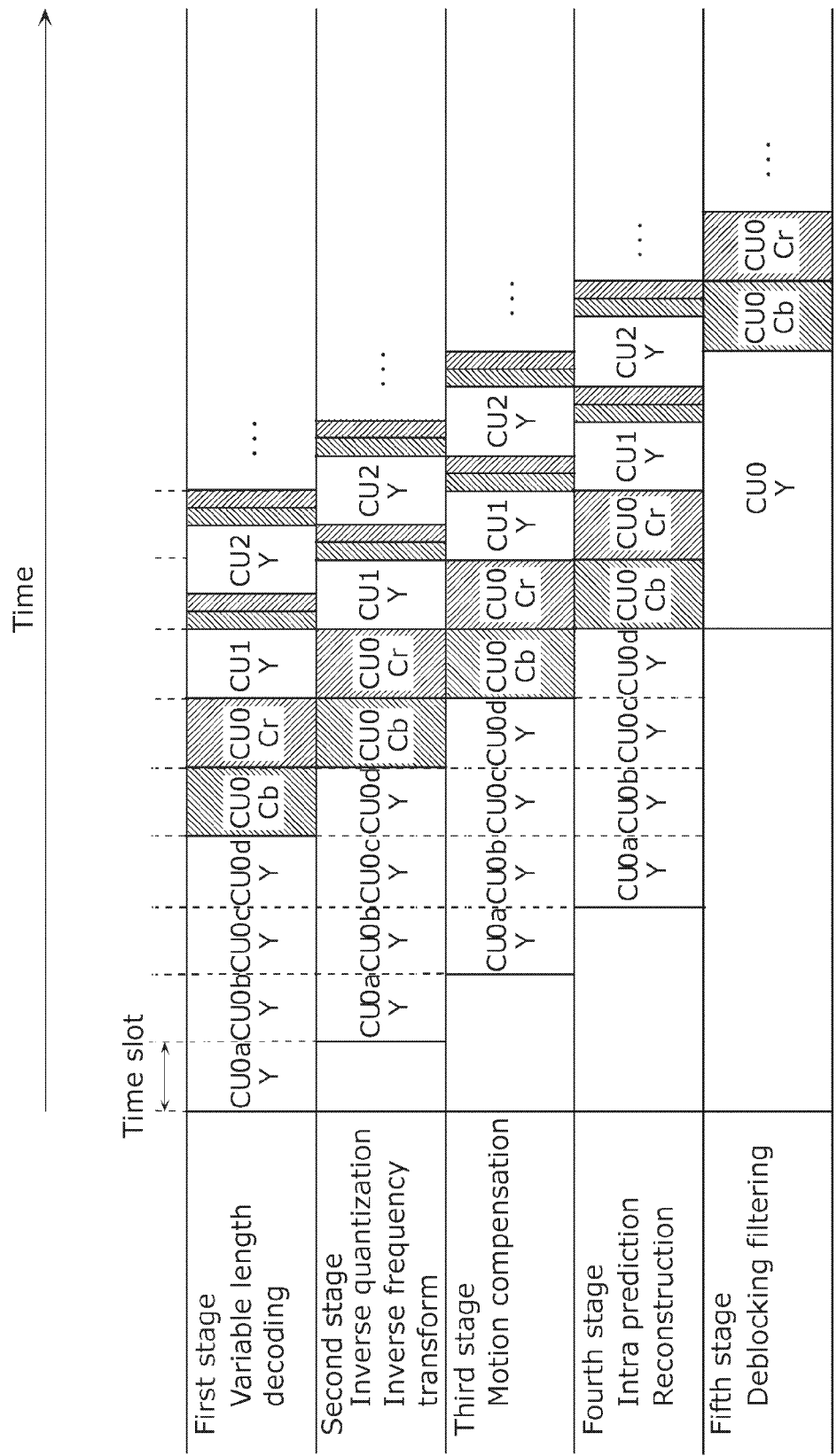
FIG. 34 is a time chart illustrating operation of an image decoding device according to Embodiment 6.

The present embodiment differs from Embodiment 5 in the configuration of pipeline processing. FIG. 34 illustrates time series operation in pipeline processing. In FIG. 34, a positive-slope hatched block represents a blue chroma block (Cb), and a negative-slope hatched block represents a red chroma block (Cr).

As illustrated in FIG. 34, the image decoding device according to the present embodiment divides CU0 into six blocks, namely, CU0aY to CU0dY, CU0Cb, and CU0Cr, and executes pipeline processing. Here, CU0 is one 128×128-pixel coding unit, CU0aY to CU0dY are luma blocks. CU0Cb is a blue chroma block. CU0Cr is a red chroma block.

Regarding the coding units each including 64×64-pixel luma data such as CU1 and CU2, the size of a data unit for chroma (Cb, Cr) is 32×32 pixels. The size of data units for chroma (Cb, Cr) of CU1 and CU2 is smaller than the size of other data units which is 64×64 pixels. Accordingly, it is difficult to switch processes for the same data unit at plural stages as in, for instance, Embodiment 5.

Figure 35:
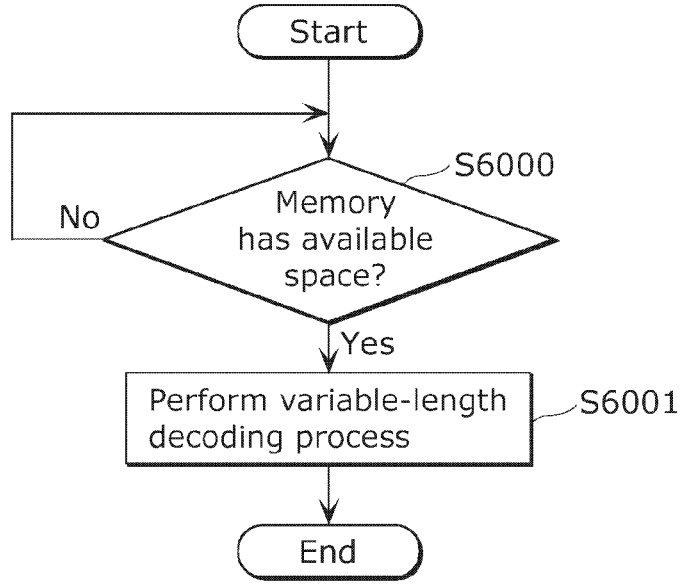
FIG. 35 is a flowchart illustrating operation of a variable length decoding unit according to Embodiment 6.
Figure 36:
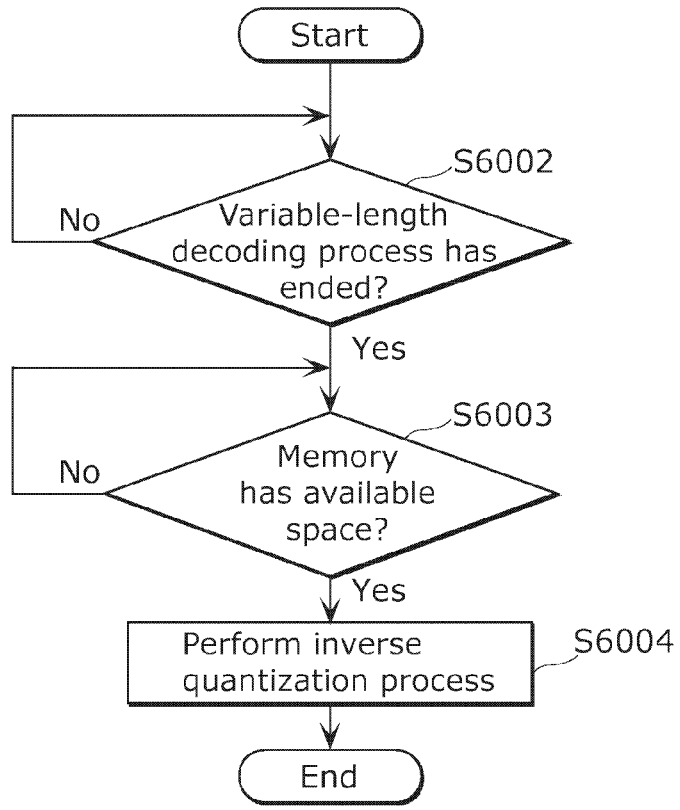
FIG. 36 is a flowchart illustrating operation of an inverse quantization unit according to Embodiment 6.

Thus, the image decoding device switches processes by operation illustrated in the flowcharts in FIGS. 35 and 36.

FIG. 35 illustrates operation performed when the variable length decoding unit 503 switches a process target to CU0aY, CU0bY, and so on. First, the variable length decoding unit 503 determines whether a memory 511 for output of the variable length decoding unit 503 has available space (S6000).

If the memory 511 does not have available space (No in S6000), the variable length decoding unit 503 waits until the memory 511 has available space, without performing any operation. If the memory 511 has available space (Yes in S6000), the variable length decoding unit 503 performs a variable-length decoding process on the next data (S6001).

FIG. 36 illustrates operation performed when the inverse quantization unit 504 switches a process target to CU0aY, CU0bY, and so on. First, the inverse quantization unit 504 determines whether the variable length decoding unit 503 has ended the variable-length decoding process on data to be processed (S6002).

If the variable-length decoding process has not ended (No in S6002), the inverse quantization unit 504 waits until the variable-length decoding process ends. If the variable-length decoding process has ended (Yes in S6002), the inverse quantization unit 504 checks whether a memory for output (not illustrated) of the inverse quantization unit 504 has available space (S6003). If the memory does not have available space (No in S6003), the inverse quantization unit 504 waits until the memory has available space. If the memory has available space (Yes in S6003), the inverse quantization unit 504 performs an inverse quantization process (S6004).

Here, the operation of the variable length decoding unit 503 and the inverse quantization unit 504 is described. If there is data to be processed and memory has available space, other process units can process the data, similarly. Thus, the image decoding device can execute pipeline processing even without switching processes at plural stages at exactly the same times.

In addition, the image decoding device handles luma and chroma as different data units. Accordingly, a process on luma data is executed without waiting for chroma data. Thus, the capacity of an internal buffer can be decreased.

(6-4. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL 2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

Furthermore, pipeline processing is executed for each 64×64-pixel data unit which has the size of the largest transform unit, in the present embodiment. However, the size of a data unit is not necessarily limited to 64×64 pixels.

Generally, a frequency transform process is executed using all the data included in one data unit. Thus, it is difficult to divide a transform unit. Therefore, the size of the largest transform unit is selected in the present embodiment. However, if it is difficult to divide a data unit used for a process other than the frequency transform process, pipeline processing may be executed for each data unit used for that process.

In addition, in the present embodiment, the reconstructed image memory 509 is illustrated explicitly. However, a memory in each process unit may be used as the reconstructed image memory 509, and the frame memory 502 may be used as the reconstructed image memory 509.

An example in the case where a format is 4:2:0 is described in the present embodiment. However, similar processing is possible also in other formats, such as 4:2:2 and 4:4:4.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

Embodiment 7

(7-1. Outline)

First is a description of the outline of an image decoding device according to the present embodiment. The image decoding device according to the present embodiment decodes a coded stream. The size of a coding unit included in a coded stream can be changed. In addition, the image decoding device divides plural processes included in decoding processing at plural stages, and performs the plural processes in parallel by pipelining.

At that time, the image decoding device performs plural processes, based on the size of a transform unit. It should be noted that a transform unit is a data unit for performing frequency transform. In addition, a transform unit is included in a coding unit which is included in a coded stream.

In addition, the image decoding device divides a prediction unit to be used for a motion compensation process and an intra prediction process, based on the size of a transform unit when performing plural processes included in decoding processing.

Accordingly, even when plural coding units have various sizes, the amount of data to be processed in each of plural processes included in pipeline processing is equivalent, irrespective of the size of each coding unit. Accordingly, idle time in pipeline processing is reduced, and pipeline processing is performed efficiently. Thus, processing performance improves.

In addition, the image decoding device executes a motion compensation process for each data unit which includes luma data and chroma data. Accordingly, the motion compensation process is executed efficiently.

The above is a description of the outline of the image decoding device according to the present embodiment.

(7-2. Configuration)

FIG. 29 illustrates a configuration of the image decoding device according to the present embodiment. The configuration of the image decoding device according to the present embodiment is the same as that of Embodiment 6, and thus a description thereof is omitted.

FIG. 2 is a configuration diagram illustrating a connection between a variable length decoding unit 503 and an inverse quantization unit 504. The configuration of the connection is the same as that in Embodiment 6, and thus a description thereof is omitted.

FIG. 30 illustrates the configuration of an intra prediction unit 710 in FIG. 29. The intra prediction unit 710 is the same as that according to Embodiment 6, and thus a description thereof is omitted.

(7-3. Operation)

In the present embodiment, the structure of a coded stream illustrated in FIGS. 3A to 4B, 6A, 6B, and 33 is used, as with Embodiment 6. In addition, the operation flow of the image decoding device according to the present embodiment is the same as that in Embodiment 6 illustrated in FIGS. 8, 9, and 32, and thus a description thereof is omitted.

Figure 37:
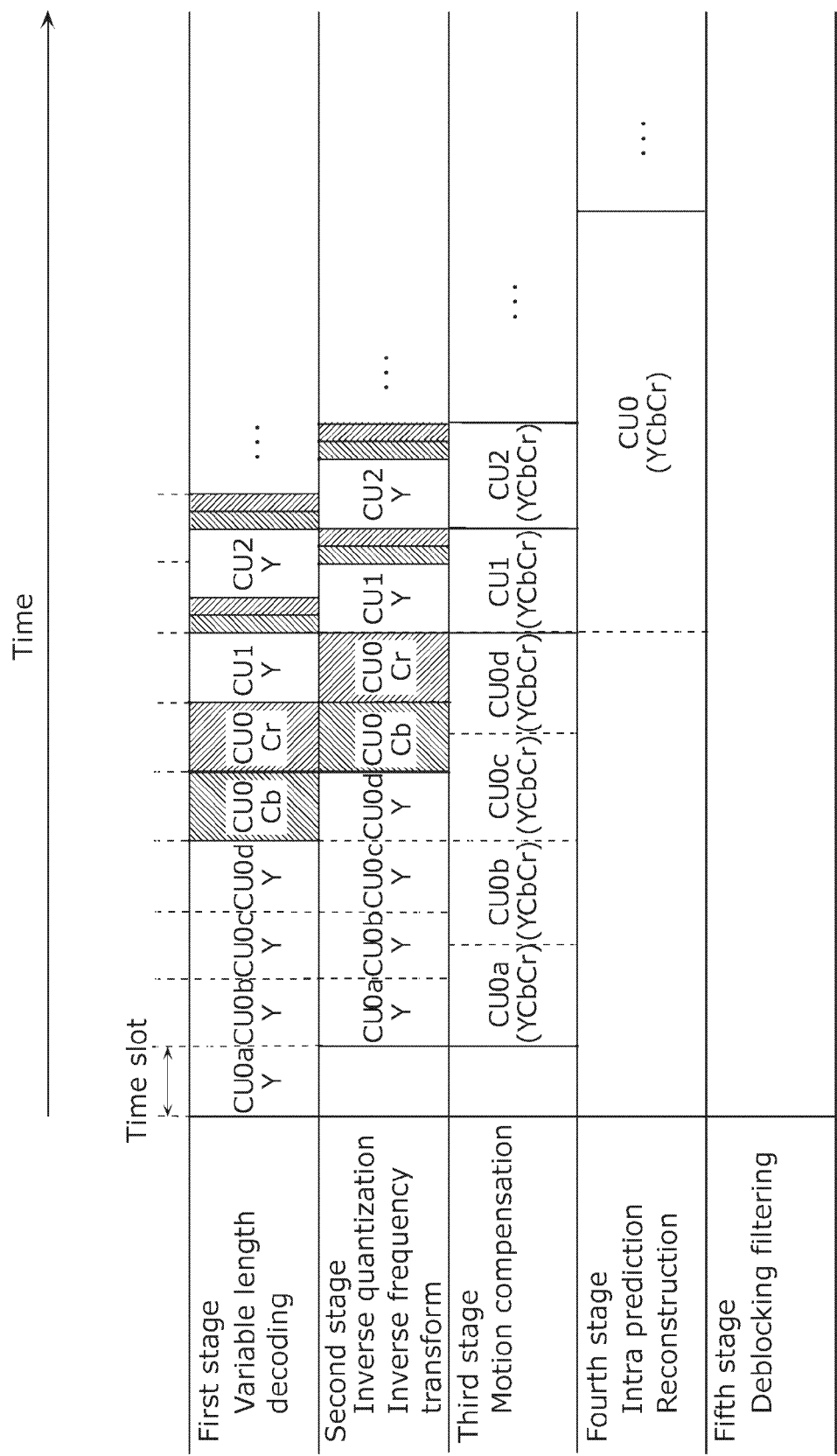
FIG. 37 is a time chart illustrating operation of an image decoding device according to Embodiment 7.

The present embodiment differs from Embodiment 6 in the configuration of pipeline processing. FIG. 37 illustrates time series operation in the pipeline processing. In FIG. 37, a positive-slope hatched block represents a blue chroma block (Cb), and a negative-slope hatched block represents a red chroma block (Cr).

As illustrated in FIG. 37, the image decoding device according to the present embodiment divides CU0 into six blocks, namely, CU0$a$Y to CU0$d$Y, CU0Cb, and CU0Cr, and executes pipeline processing. Here, CU0 is one 128×128-pixel coding unit. CU0$a$Y to CU0$d$Y are luma blocks, CU0Cb is a blue chroma block. CU0Cr is a red chroma block.

In the present embodiment, in the motion compensation process at the third stage, CU0 is handled as CU0$a$ to CU0$d$, without CU0 being divided into luma data and chroma data. In addition, the motion compensation process is performed simultaneously with the inverse quantization process at the third stage. These points are different from Embodiment 6.

In the flowchart in FIG. 9, an inverse frequency transform process (S1003) ends, and thereafter the motion compensation process (S1005) is executed, to facilitate a description. However, in practice, the motion compensation process (S1005) can be executed if variable-length decoding is performed on a motion vector. Accordingly, even if the inverse quantization process (S1002) and the inverse frequency transform process (S1003) have not ended, the motion compensation process (S1005) can be executed.

Accordingly, the image decoding device according to the present embodiment performs the motion compensation process, simultaneously with the inverse quantization process and the inverse frequency transform process on CU0$a$Y to CU0$d$Y, CU0Cb, and CU0Cr.

Accordingly, the image decoding device according to the present embodiment can simultaneously perform the motion compensation process which requires a large operation amount on luma and chroma in parallel. Thus, the configuration of a circuit is simplified, and performance improves.

(7-4. Supplementary Description)

In the present embodiment, the name "coding unit" is used as a data unit used for coding. However, the data unit used for coding may be a macroblock. Also, the data unit used for coding may be referred to as a super macroblock.

In the present embodiment, the coding scheme disclosed in NPL 2 is used. Examples of the details of the processes are described in the present embodiment. However, the details of the processes are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

In addition, part of or the entire each process unit may be achieved by a dedicated hardware circuit, or may be achieved by a program on a processor.

In addition, the frame memory 502, the reconstructed image memory 509, and the memory 511 are not limited to memories, and may be memory elements in which data can be stored. For example, these may be configured as other elements such as a flip-flop circuit and a register. Further, part of a memory area of a processor or part of cache memory may be used for these.

Furthermore, pipeline processing is executed for each 64×64-pixel data unit which has the size of the largest transform unit, in the present embodiment. However, the size of a data unit is not necessarily limited to 64×64 pixels.

Generally, a frequency transform process is executed using all the data included in one data unit. Thus, it is difficult to divide a transform unit. Therefore, the size of the largest transform unit is selected in the present embodiment. However, if it is difficult to divide a data unit used for a process other than the frequency transform process, pipeline processing may be executed for each data unit used for that process.

In addition, in the present embodiment, the reconstructed image memory 509 is illustrated explicitly. However, a memory in each process unit may be used as the reconstructed image memory 509, and the frame memory 502 may be used as the reconstructed image memory 509.

An example in the case where a format is 4:2:0 is described in the present embodiment. However, similar processing is possible also in other formats, such as 4:2:2 and 4:4:4.

In the present embodiment, the motion compensation process at the third stage is started simultaneously with the inverse quantization at the second stage. However, if the variable-length decoding process on a motion vector has ended, the motion compensation process may be started while executing the variable-length decoding process at the first stage, or may be started even later.

In addition, in the present embodiment, a CU division flag is included at the head of a division block. However, the CU division flag does not necessarily need to be included at such a position, and need only be included in a coded stream. For example, the CU division flag may be included at the head of a largest coding unit (LCU).

In the present embodiment, a TU division flag is included at the head of each coefficient information piece. However, the TU division flag does not necessarily need to be included at such a position, and need only be included in a coded stream. For example, the TU division flag may be included at the head of a coding unit or a largest coding unit.

In the present embodiment, a process is changed for each time slot. A process does not necessarily need to be changed for a fixed time period. If a previous process having dependency is completed, and furthermore the next process can be started, the next process may be started. In addition, processes may not be switched simultaneously at the stages.

In Embodiments 8 to 15 below, a description is given of the distinguishing constituent elements described in Embodiments 1 to 7 above.

Embodiment 8

Figure 38:
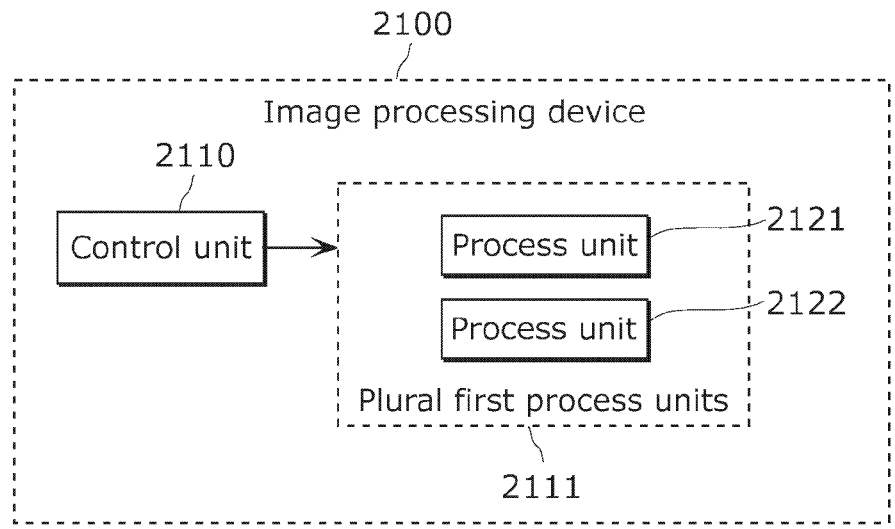
FIG. 38 illustrates a configuration of an image processing device according to Embodiment 8.

FIG. 38 illustrates the configuration of an image processing device according to Embodiment 8. An image processing device 2100 illustrated in FIG. 38 includes a control unit 2110 and plural first process units 2111. The plural first process units 2111 include a process unit 2121 and a process unit 2122. Accordingly, the process units 2121 and 2122 are each a first process unit.

The image processing device 2100 performs plural first processes on a coded stream by pipelining. The coded stream is obtained by dividing an image into plural coding unit blocks having at least two sizes, and coding the image on a coding unit block-by-block basis.

The plural first process units 2111 perform the plural first processes on the coded stream by pipelining. At that time, the process units 2121 and 2122 included in the plural first process units 2111 each execute one of the plural first processes.

The control unit 2110 divides the coded stream into plural first processing unit blocks each having a first size. Then, the control unit 2110 controls the plural first process units 2111 to cause the plural first processes to be executed for each of the first processing unit blocks.

Figure 39:
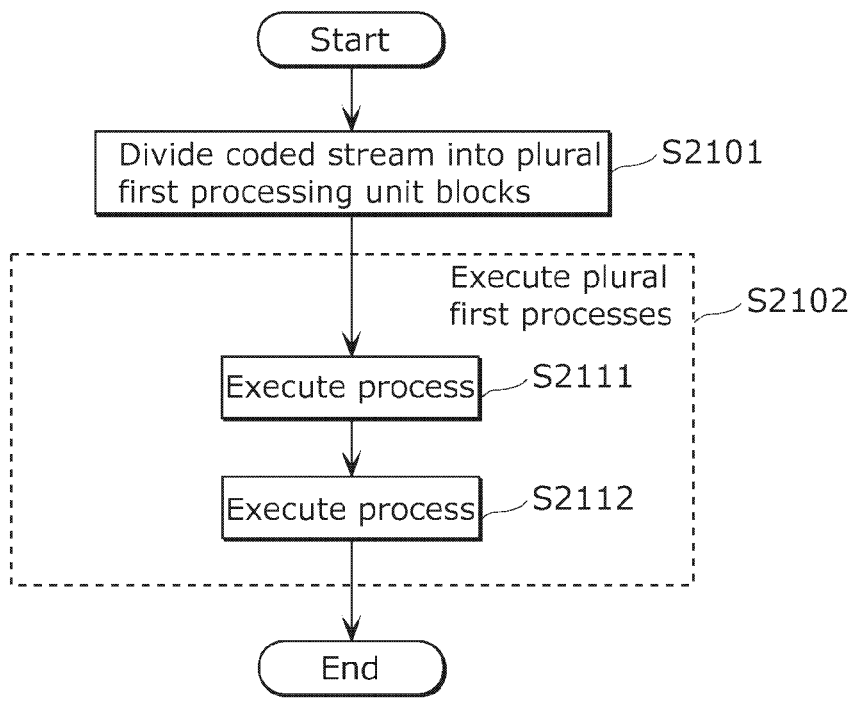
FIG. 39 is a flowchart illustrating operation of the image processing device according to Embodiment 8.

FIG. 39 is a flowchart illustrating operation of the image processing device 2100 illustrated in FIG. 38.

First, the control unit 2110 divides a coded stream into plural first processing unit blocks each having a first size (S2101). Then, the control unit 2110 controls the plural first process units 2111 to cause the plural first processes to be executed for each of the first processing unit blocks.

Next, the plural first process units 2111 perform the plural first processes on the coded stream by pipelining (S2102). At that time, the process units 2121 and 2122 included in the plural first process units 2111 each execute one of the plural first processes (S2111, S2112).

This allows the plural first process units 2111 to perform plural processes on the coded stream by pipelining, based on one size. Accordingly, idle time is reduced, and operation efficiency improves.

It should be noted that the plural first process units 2111 may perform, on a coded stream, the plural first processes for decoding an image.

In addition, the control unit 2110 may divide a coded stream into plural first processing unit blocks by dividing a coding unit block included in the coded stream. Alternatively, the control unit 2110 may divide a coded stream into plural first processing unit blocks by uniting at least two of the coding unit blocks included in the coded stream.

In addition, the control unit 2110 may control the plural first process units 2111 to cause each of the plural first processes to be executed on each of the plural first processing unit blocks in a predetermined period. The predetermined period is a predetermined number of time slots, for example.

Furthermore, a coding unit block may be a smallest unit or which intra prediction and inter prediction can be switched.

Furthermore, the above-mentioned first size may be a size predetermined to be a size of the largest coding unit block. For example, the first size may be a size predetermined to be a size of the largest coding unit block in a coded stream or a coding standard.

Furthermore, the above-mentioned first size may be a size predetermined to be a size of a largest coding unit which is the largest coding unit block. For example, the first size may be a size predetermined to be a size of the largest coding unit in a coded stream or a coding standard.

Furthermore, the above-mentioned first size may be a size predetermined to be a size of the largest frequency transform block. A frequency transform block is a data unit for frequency transform in coding processing or a data unit for inverse frequency transform in decoding processing. For example, the first size may be a size predetermined to be a size of the largest frequency transform block in a coded stream or a coding standard.

In addition, the above-mentioned first size may be a size predetermined to be a size of the largest transform unit that is the largest frequency transform block. For example, the first size may be a size predetermined to be a size of the largest transform unit in a coded stream or a coding standard.

Embodiment 9

Figure 40:
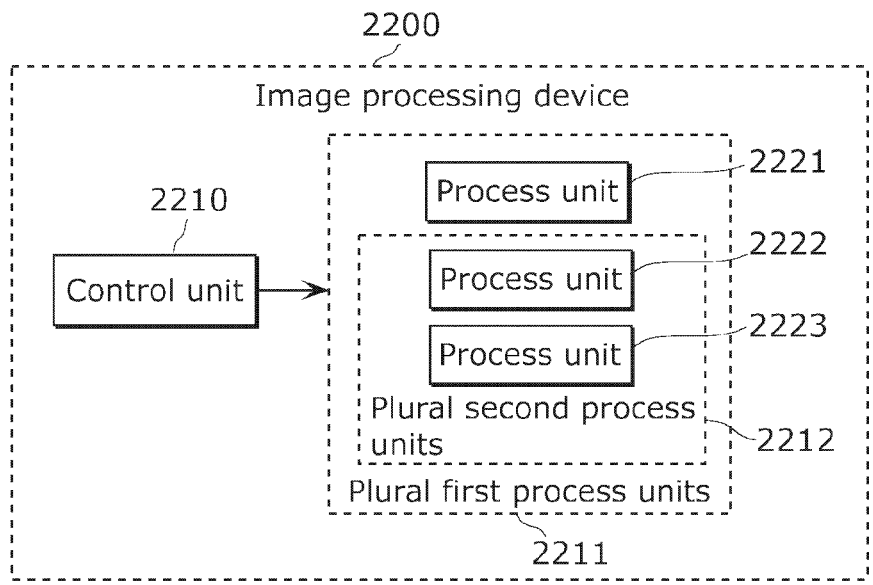
FIG. 40 illustrates a configuration of an image processing device according to Embodiment 9.

FIG. 40 illustrates the configuration of an image processing device according to Embodiment 9. An image processing device 2200 illustrated in FIG. 40 includes a control unit 2210 and plural first process units 2211.

The plural first process units 2211 include a process unit 2221, a process unit 2222, and a process unit 2223. The plural first process units 2211 include plural second process units 2212. The plural second process units 2212 include the process unit 2222 and the process unit 2223. In other words, the process unit 2221 is the first process unit. Both the process units 2222 and 2223 are the first process units and also the second process units.

The image processing device 2200 performs plural first processes on a coded stream by pipelining, as with the image processing device 2100 according to Embodiment 8.

The plural first process units 2211 perform plural first processes on a coded stream by pipelining, as with the plural first process units 2111 according to Embodiment 8. At that time, the process unit 2221, the process unit 2222, and the process unit 2223 included in the plural first process units 2211 each execute one of the plural first processes.

The plural second process units 2212 execute plural second processes included in the plural first processes.

The control unit 2210 divides a coded stream into plural first processing unit blocks each having a first size, as with the control unit 2110 according to Embodiment 8. Then, the control unit 2210 controls the plural first process units 2211 to cause the plural first processes to be executed for each of the first processing unit blocks.

In addition, the control unit 2210 divides the plural first processing unit blocks into plural second processing unit blocks each having a second size smaller than the first size. Then, the control unit 2210 controls the plural second process units 2212 to cause the plural second processes to be executed for each of the second processing unit blocks.

Figure 41:
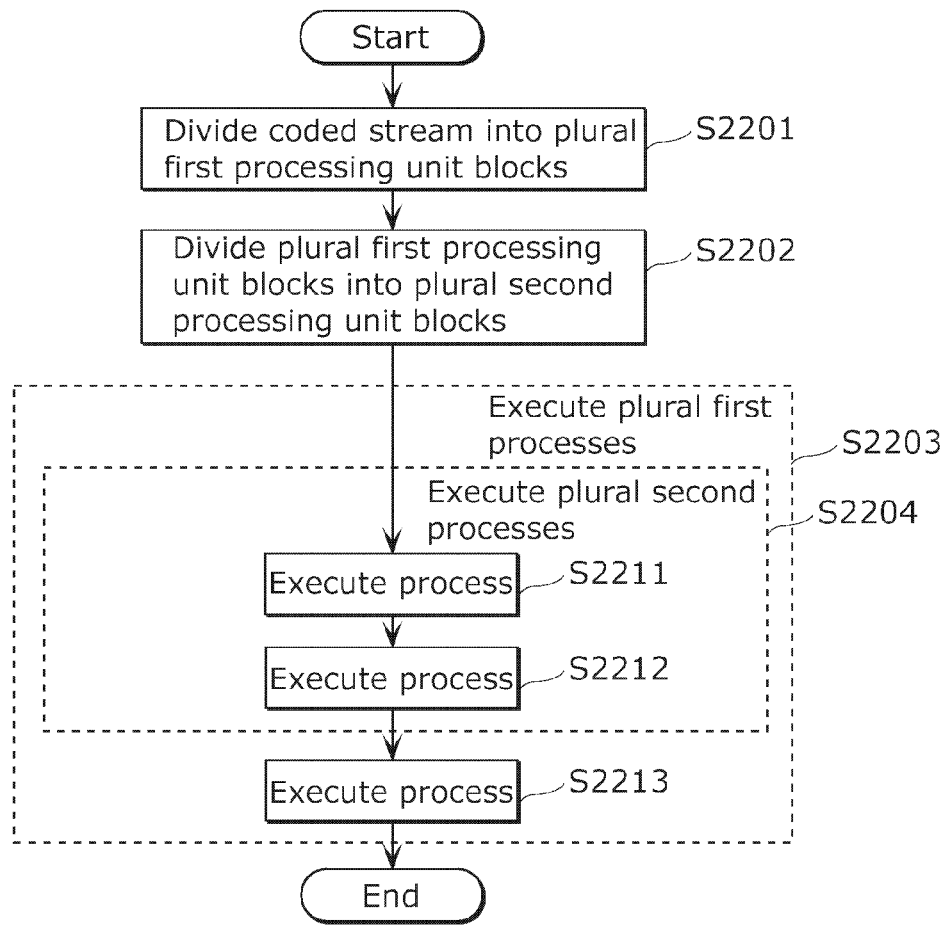
FIG. 41 is a flowchart illustrating operation of the image processing device according to Embodiment 9.

FIG. 41 is a flowchart illustrating operation of the image processing device 2200 illustrated in FIG. 40.

First, the control unit 2210 divides a coded stream into plural first processing unit blocks each having the first size (S2201). Then, the control unit 2210 controls the plural first process units 2211 to cause the plural first processes to be executed for each of the first processing unit blocks.

Next, the control unit 2210 divides the plural first processing unit blocks into plural second processing unit blocks each having the second size smaller than the first size (S2202). Then, the control unit 2210 controls the plural second process units 2212 to cause the plural second processes to be executed for each of the second processing unit blocks.

Next, the plural first process units 2211 perform the plural first processes on the coded stream by pipelining (S2203). At that time, the process unit 2221, the process unit 2222, and the process unit 2223 included in the plural first process units 2211 each execute one of the plural first processes (S2211, S2212, S2213).

Along with the above-mentioned operation, the plural second process units 2212 execute the plural second processes (S2204). At that time, the process unit 2222 and the process unit 2223 included in the plural second process units 2212 each execute one of the plural second processes (S2211, S2212).

Accordingly, pipeline processing is executed based on a smaller size. Thus, operation efficiency further improves.

It should be noted that the control unit 2210 may divide the plural first processing unit blocks into plural second processing unit blocks each having a size smaller than the first size. This also allows pipeline processing to be executed based on a small size. Consequently, operation efficiency improves.

In addition, the control unit 2210 may divide the plural first processing unit blocks into the plural second processing unit blocks to separate luma information and chroma information. Accordingly, luma information and chroma information are processed separately. Then, pipeline processing is executed based on a small size, and operation efficiency improves.

In addition, the plural first process units 2211 may include a motion compensation process unit which executes a motion compensation process.

Further, the control unit 2210 may divide the plural first processing unit blocks into plural third processing unit blocks each having a third size smaller than the first size. At that time, the control unit 2210 may divide the plural first processing unit blocks into the plural third processing unit blocks each including luma information and chroma information. Then, the control unit 2210 may control the motion compensation process unit to cause the motion compensation process to be executed for each of the third processing unit blocks.

Accordingly, luma information and chroma information are processed at the same time in the motion compensation process. Thus, wasteful operation is reduced.

Embodiment 10

Figure 42:
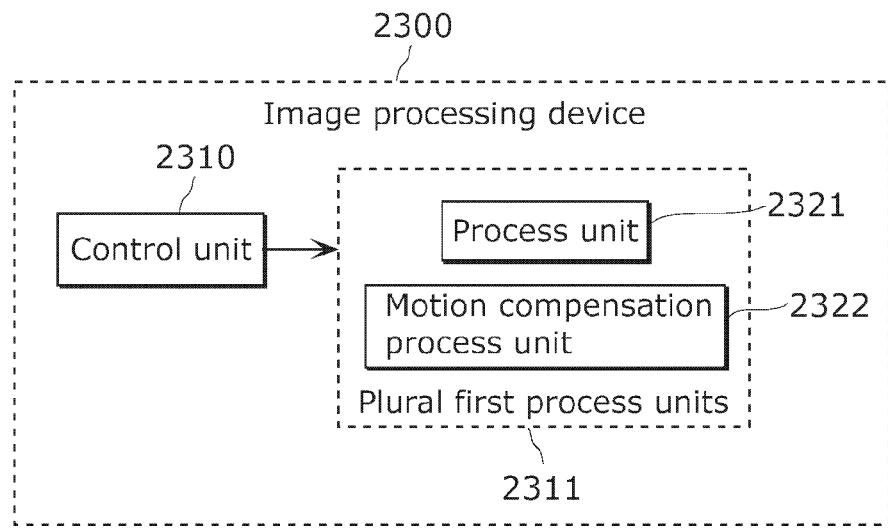
FIG. 42 illustrates a configuration of an image processing device according to Embodiment 10.

FIG. 42 illustrates the configuration of an image processing device according to Embodiment 10. An image processing device 2300 illustrated in FIG. 42 includes a control unit 2310 and plural first process units 2311. The plural first process units 2311 include a process unit 2321 and a motion compensation process unit 2322. Accordingly, both the process unit 2321 and the motion compensation process unit 2322 are the first process units.

The image processing device 2300 includes similar constituent elements to those of the image processing device 2100 according to Embodiment 8, and performs similar operation to that of the image processing device 2100 according to Embodiment 8. The control unit 2310, the plural first process units 2311, the process unit 2321, and the motion compensation process unit 2322 correspond to the control unit 2110, the plural first process units 2111, the process unit 2121, and the process unit 2122 according to Embodiment 8, respectively. The constituent elements of the image processing device 2300 each perform similar operation to that of a corresponding constituent element. However, the present embodiment differs from Embodiment 8 in the points below.

The motion compensation process unit 2322 executes a motion compensation process. If a prediction block used for the motion compensation process has a size larger than a first size, the control unit 2310 divides the prediction block into plural first processing unit blocks. Then, the control unit 2310 controls the motion compensation process unit 2322 to cause the motion compensation process to be executed for each of the first processing unit blocks. A prediction block is a data unit for prediction processing.

Figure 43:
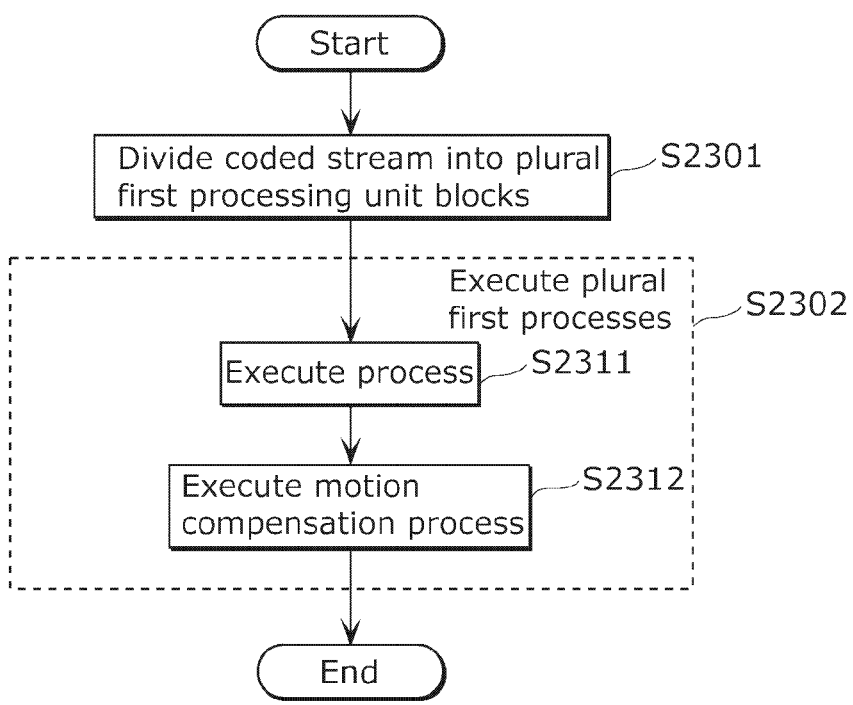
FIG. 43 is a flowchart illustrating operation of the image processing device according to Embodiment 10.

FIG. 43 is a flowchart illustrating operation of the image processing device 2300 illustrated in FIG. 42.

First, the control unit 2310 divides a coded stream into plural first processing unit blocks each having a first size (S2301). Then, the control unit 2310 controls the plural first process units 2311 to cause plural first processes to be executed for each of the first processing unit blocks.

In addition, if the prediction block used for the motion compensation process has a size larger than the first size at this time, the control unit 2310 divides the prediction block into the plural first processing unit blocks. Then, the control unit 2310 controls the motion compensation process unit 2322 to cause the motion compensation process to be executed for each of the first processing unit blocks.

Next, the plural first process units 2311 perform the plural first processes on the coded stream by pipelining (S2302). At that time, the process unit 2321 and the motion compensation process unit 2322 included in the plural first process units 2311 each execute one of the plural first processes (S2311, S2312). In particular, the motion compensation process unit 2322 executes the motion compensation process included in the plural first processes (S2312).

Accordingly, the amount of information to be exchanged between the motion compensation process unit 2322 and other process units is reduced. Thus, a circuit size can be decreased.

Embodiment 11

Figure 44:
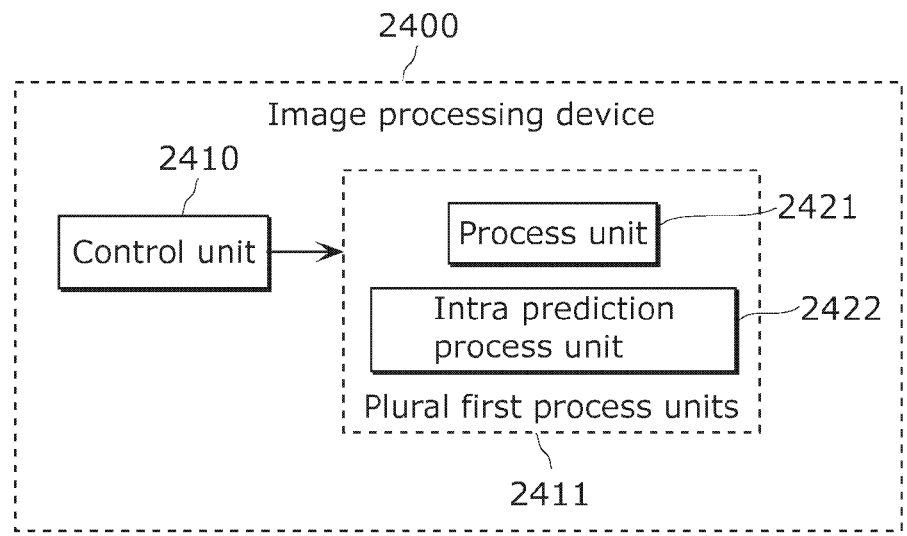
FIG. 44 illustrates a configuration of an image processing device according to Embodiment 11.

FIG. 44 illustrates the configuration of an image processing device according to Embodiment 11. The image processing device 2400 illustrated in FIG. 44 includes a control unit 2410 and plural first process units 2411. The plural first process units 2411 include a process unit 2421 and an intra prediction process unit 2422. Accordingly, both the process unit 2421 and the intra prediction process unit 2422 are the first process units.

The image processing device 2400 includes similar constituent elements to those of the image processing device 2100 according to Embodiment 8, and performs similar operation to that of the image processing device 2100 according to Embodiment 8. The control unit 2410, the plural first process units 2411, the process unit 2421, and the intra prediction process unit 2422 correspond to the control unit 2110, the plural first process units 2111, the process unit 2121, and the process unit 2122 according to Embodiment 8, respectively. Each constituent element of the image processing device 2400 performs similar operation to that of a corresponding constituent element. However, the present embodiment differs from Embodiment 8 in the points below.

The intra prediction process unit 2422 executes an intra prediction process. If a prediction block used for the intra prediction process has a size larger than a first size, the control unit 2410 divides the prediction block into plural first processing unit blocks. Then, the control unit 2410 controls the intra prediction process unit 2422 to cause the intra prediction process to be executed for each of the first processing unit blocks. A prediction block is a data unit for prediction processing.

Figure 45:
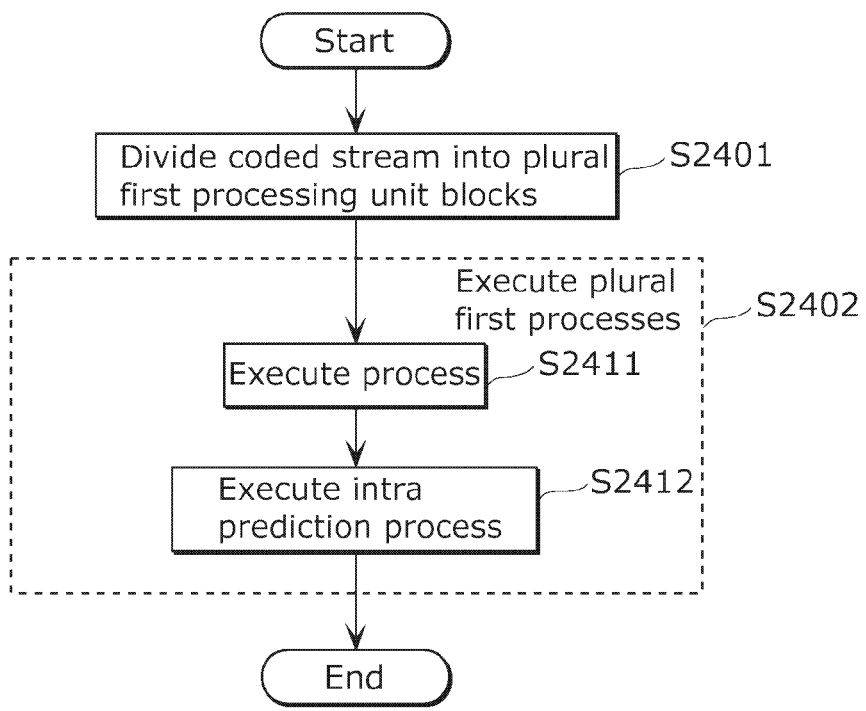
FIG. 45 is a flowchart illustrating operation of the image processing device according to Embodiment 11.

FIG. 45 is a flowchart illustrating operation of the image processing device 2400 illustrated in FIG. 44.

First, the control unit 2410 divides a coded stream into the plural first processing unit blocks each having the first size (S2401). Then, the control unit 2410 controls the plural first process units 2411 to cause the plural first processes to be executed for each of the first processing unit blocks.

In addition, at this time, if the prediction block used for the intra prediction process has a size larger than the first size, the control unit 2410 divides the prediction block into the plural first processing unit blocks. Then, the control unit 2410 controls the intra prediction process unit 2422 to cause the intra prediction process to be executed for each of the first processing unit blocks.

Next, the plural first process units 2411 perform the plural first processes on the coded stream by pipelining (S2402). At that time, the process unit 2421 and the intra prediction process unit 2422 included in the plural first process units 2411 each execute one of the plural first processes (S2411, S2412). In particular, the intra prediction process unit 2422 executes the intra prediction process included in the plural first processes (S2412).

Accordingly, the amount of information exchanged between the intra prediction process unit 2422 and other process units is reduced. Thus, a circuit size can be decreased.

Embodiment 12

Figure 46:
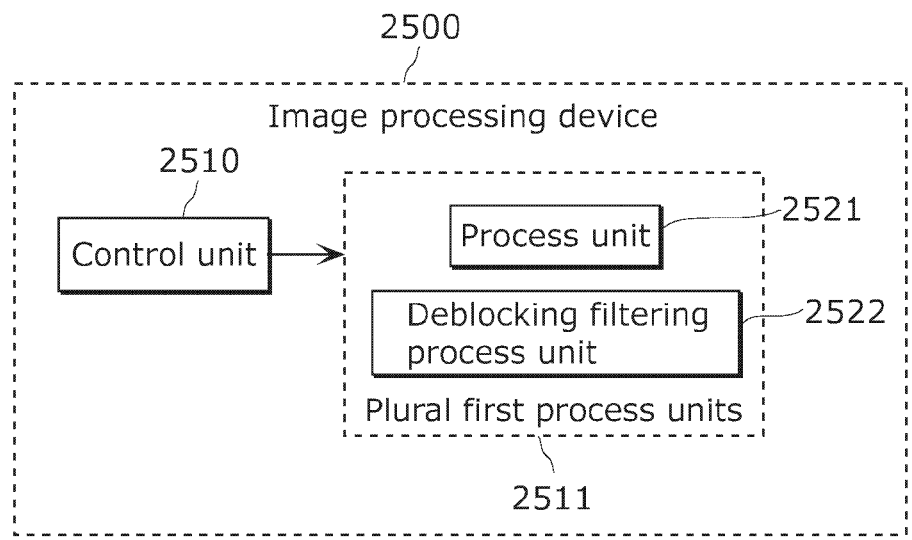
FIG. 46 illustrates a configuration of an image processing device according to Embodiment 12.

FIG. 46 illustrates the configuration of an image processing device according to Embodiment 12. An image processing device 2500 illustrated in FIG. 46 includes a control unit 2510 and plural first process units 2511. The plural first process units 2511 include a process unit 2521 and a deblocking filtering process unit 2522. Accordingly, both the process unit 2521 and the deblocking filtering process unit 2522 are the first process units.

The image processing device 2500 includes similar constituent elements to those of the image processing device 2100 according to Embodiment 8, and performs similar operation to that of the image processing device 2100 according to Embodiment 8. The control unit 2510, the plural first process units 2511, the process unit 2521, and the deblocking filtering process portion 2522 correspond to the control unit 2110, the plural first process units 2111, the process unit 2121, and the process unit 2122 according to Embodiment 8, respectively. Each constituent element of the image processing device 2500 performs similar operation to that of a corresponding constituent element. However, the present embodiment differs from Embodiment 8 in the points below.

The deblocking filtering process unit 2522 executes a deblocking filtering process for eliminating coding distortion at the block boundary such as a frequency transform block. The control unit 2510 controls the deblocking filtering process unit 2522 to cause the deblocking filtering process to be executed for each of frequency transform blocks according to the order in which the frequency transform process is executed when an image is coded.

Figure 47:
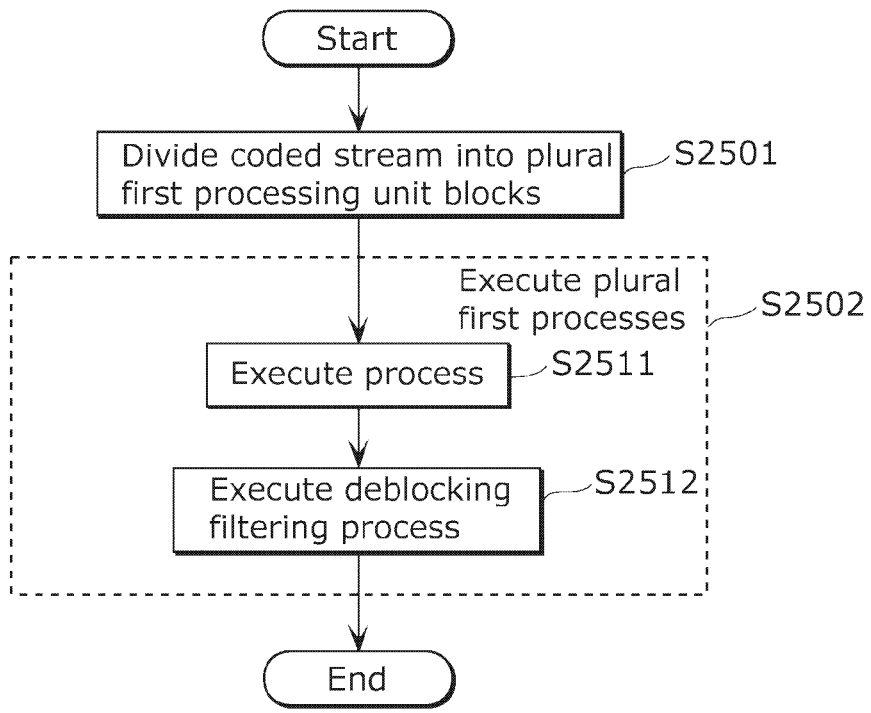
FIG. 47 is a flowchart illustrating operation of the image processing device according to Embodiment 12.

FIG. 47 is a flowchart illustrating operation of the image processing device 2500 illustrated in FIG. 46.

First, the control unit 2510 divides a coded stream into plural first processing unit blocks each having a first size (S2501). Then, the control unit 2510 controls the plural first process units 2511 to cause the plural first processes to be executed for each of the first processing unit blocks. At this time, the control unit 2510 controls the deblocking filtering process unit 2522 to cause the deblocking filtering process to be executed for each of the frequency transform blocks according to the order in which the frequency transform process is executed when the image is coded.

Next, the plural first process units 2511 perform the plural first processes on the coded stream by pipelining (S2502). At that time, the process unit 2521 and the deblocking filtering process unit 2522 included in the plural first process units 2511 each execute one of the plural first processes (S2511, S2512). In particular, the deblocking filtering process unit 2522 executes the deblocking filtering process included in the plural first processes (S2512).

Accordingly, the deblocking filtering process is executed based on a small size. Thus, idle time is reduced, and operation efficiency improves.

Embodiment 13

Figure 48:
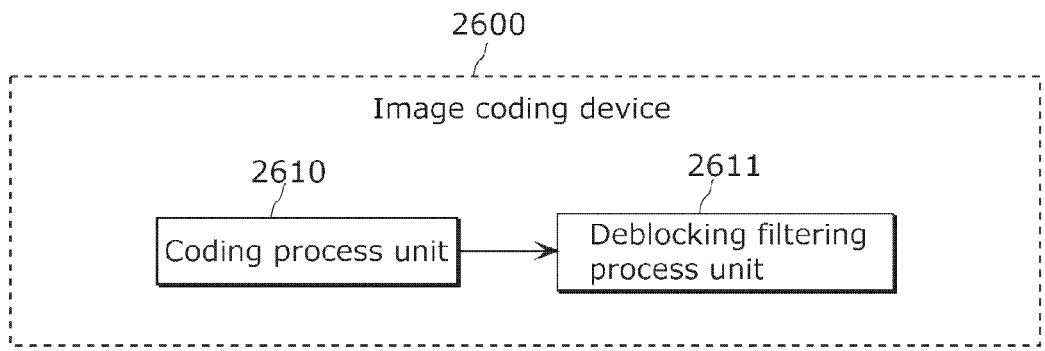
FIG. 48 illustrates a configuration of an image coding device according to Embodiment 13.

FIG. 48 illustrates the configuration of an image coding device according to Embodiment 13. An image coding device 2600 illustrated in FIG. 48 includes a coding process unit 2610 and a deblocking filtering process unit 2611. The image coding device 2600 codes an image.

Figure 49:
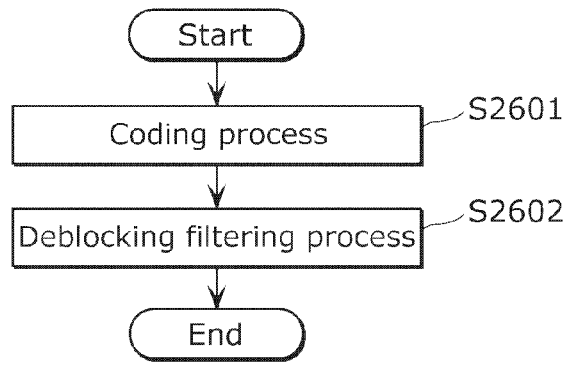
FIG. 49 is a flowchart illustrating operation of the image coding device according to Embodiment 13.

FIG. 49 is a flowchart illustrating operation of the image coding device 2600 illustrated in FIG. 48.

First, the coding process unit 2610 divides an image into plural coding unit blocks having at least two sizes. Then, the coding process unit 2610 executes a coding process on the image on a coding unit block-by-block basis (S2601). The coding process may include, for example, a frequency transform process, a quantization process, a variable-length-coding process, an inverse quantization process, an inverse frequency transform process, a motion compensation process, an intra prediction process, and the like.

Next, the deblocking filtering process unit 2611 executes a deblocking filtering process for each of the coding unit blocks according to the order in which the coding process is executed on the coding unit blocks (S2602). For example, the deblocking filtering process unit 2611 executes a deblocking filtering process in the order illustrated in FIG. 26. A coding unit block on which the deblocking filtering process has been performed is used in a coding process such as the motion compensation process on a succeeding coding unit block as a reference image.

Accordingly, the idle time between the deblocking filtering process and the process performed at a previous stage is reduced. Thus, operation efficiency improves. Typically, the same order is used by a coding device and a decoding device. Consequently, the operation efficiency of the decoding device also improves.

It should be noted that the deblocking filtering process unit 2611 may execute the deblocking filtering process, not according to the order in which the coding process is executed (S2602). Further, the deblocking filtering process unit 2611 may execute the deblocking filtering process for each of predetermined data units different from coding unit blocks. For example, the deblocking filtering process unit 2611 may execute the deblocking filtering process on one of the vertical boundary and the horizontal boundary and thereafter execute the process on the other one, for each predetermined data unit, as in FIG. 25.

Embodiment 14

Figure 50:
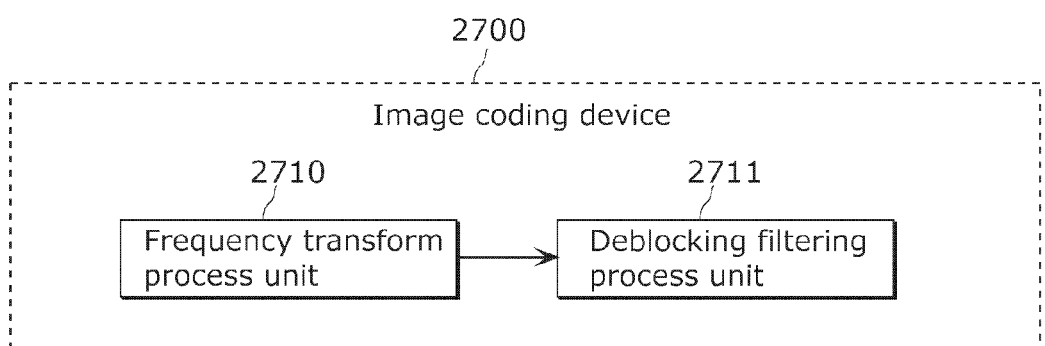
FIG. 50 illustrates a configuration of an image coding device according to Embodiment 14.

FIG. 50 illustrates the configuration of an image coding device according to Embodiment 14. An image coding device 2700 illustrated in FIG. 50 includes a frequency transform process unit 2710 and a deblocking filtering process unit 2711. The image coding device 2700 codes an image on a coding unit block-by-block basis.

Figure 51:
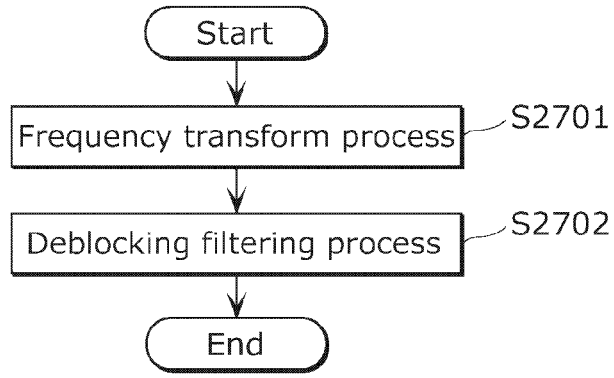
FIG. 51 is a flowchart illustrating operation of the image coding device according to Embodiment 14.

FIG. 51 is a flowchart illustrating operation of the image coding device 2700 illustrated in FIG. 50.

First, the frequency transform process unit 2710 divides a coding unit block included in an image into plural frequency transform blocks. Then, the frequency transform process unit 2710 executes a frequency transform process on the coding unit block on a frequency transform block-by-block basis (S2701).

Next, the deblocking filtering process unit 2711 executes the deblocking filtering process for each of the frequency transform blocks according to the order in which the frequency transform process is executed on the coding unit block (S2702).

Accordingly, the deblocking filtering process is executed based on a small size. Thus, idle time is reduced, and operation efficiency improves.

Embodiment 15

Figure 52:
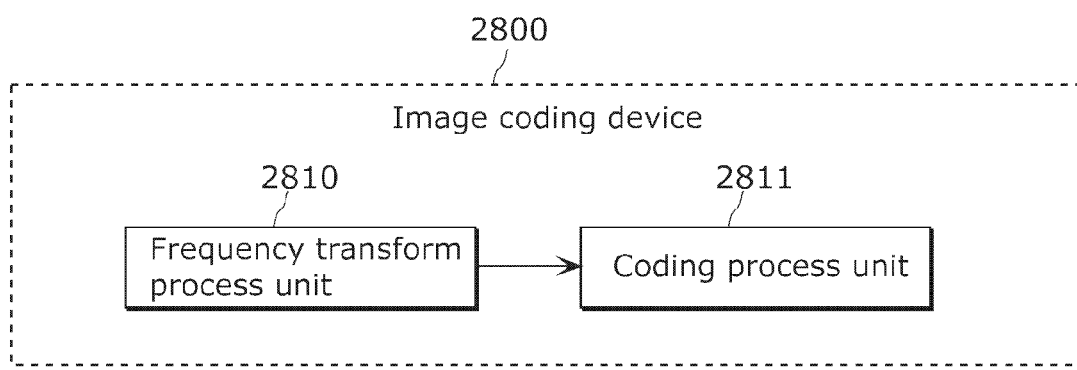
FIG. 52 illustrates a configuration of an image coding device according to Embodiment 15.

FIG. 52 illustrates the configuration of an image coding device according to Embodiment 15. An image coding device 2800 illustrated in FIG. 52 includes a frequency transform process unit 2810 and a coding process unit 2811. The image coding device 2800 codes an image on a coding unit block-by-block basis.

Figure 53:
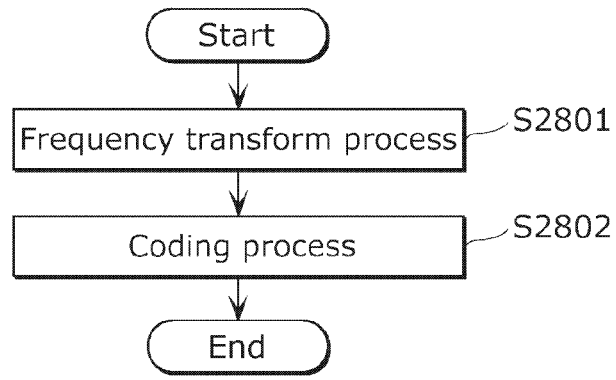
FIG. 53 is a flowchart illustrating operation of the image coding device according to Embodiment 15.

FIG. 53 is a flowchart illustrating operation of the image coding device 2800 illustrated in FIG. 52.

First, the frequency transform process unit 2810 divides a coding unit block included in an image into plural frequency transform blocks. Then, the frequency transform process unit 2810 executes a frequency transform process on the coding unit block on a frequency transform block-by-block basis (S2801).

Next, the coding process unit 2811 codes the coding unit block on which the frequency transform process has been executed. For example, the coding process unit 2811 executes a variable-length-coding process. Then, the coding process unit 2811 generates a coded stream in which luma information and chroma information of the image are collectively included for each of the frequency transform blocks (S2802). For example, the coding process unit 2811 generates a coded stream in which luma information and chroma information are collectively included for each of the frequency transform blocks, as in the coded stream illustrated in FIGS. 5A and 5B.

Figure 54:
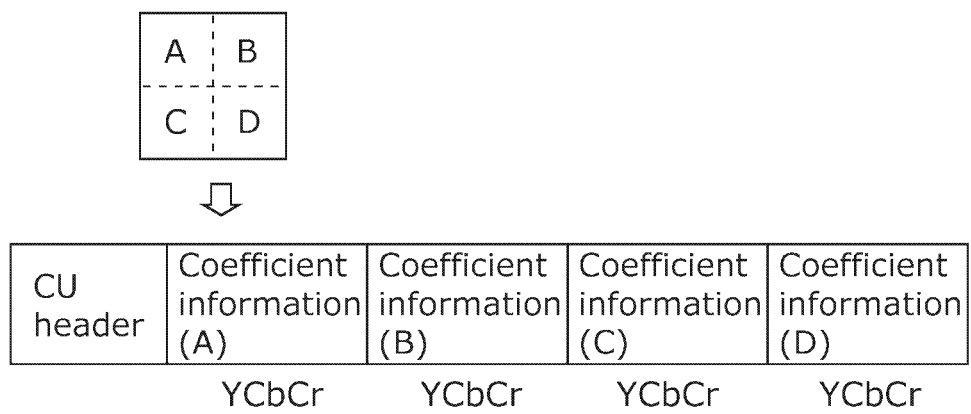
FIG. 54 illustrates an example of a configuration of transform units according to Embodiment 15.

FIG. 54 illustrates an example of a coded stream according to the present embodiment. In the example in FIG. 54, a coding unit block includes four frequency transform blocks A, B, C, and D.

Further, coefficient information corresponding to each frequency transform block includes luma information (Y) and chroma information (Cb, Cr). Accordingly, as shown in FIG. 54, the coding process unit 2811 generates a coded stream in which luma information (Y) and chroma information (Cb, Cr) are collectively included for each frequency transform block.

Accordingly, the decoding device can also execute pipeline processing for data units of frequency transform blocks, without separating luma information and chroma information. Accordingly, operation efficiency improves.

It should be noted that a coded stream may be formed so as to include information in the following order luma information of a first frequency transform block, chroma information of the first frequency transform block, luma information of a second frequency transform block, and chroma information of the second frequency transform block. In other words, luma information and chroma information may be each independently included in a coded stream, and furthermore, luma information and chroma information may be collectively included for each of the frequency transform blocks. Such a configuration also allows pipeline processing to be executed for data units of frequency transform blocks.

The above is a description of the image processing device, the image decoding device, and the image coding device according to the present invention, based on plural embodiments. However, the present invention is not limited to those embodiments. The present invention also includes forms obtained by performing modification that may be conceived by those skilled in the art on the embodiments and other forms realized by arbitrarily combining the constituent elements in the embodiments.

For example, another process unit may execute the process executed by a specific process unit. Furthermore, the order of executing processes may be changed, and plural processes may be executed in parallel.

In addition, the present invention can be achieved not only as an image processing device, an image decoding device, and an image coding device, but also as a method in which process units constituting the image processing device, the image decoding device, and the image coding device are achieved as steps. For example, those steps are executed by a computer. In addition, the present invention can be realized as a program for causing a computer to execute the steps included in the method. Furthermore, the present invention can be realized as a computer-readable recording medium such as a CD-ROM in which the program is stored.

In addition, the plural constituent elements included in the image processing device, the image decoding device, and the image coding device may be achieved as a large scale integration (LSI) which is an integrated circuit. These constituent elements may be each formed as a single chip or may be formed as a single chip to include some or all of the elements. For example, constituent elements except for a memory may be formed as a single chip. Although an LSI is described here, the integrated circuit may also be called an integrated circuit (IC), a system LSI, a super LSI, or an ultra LSI, depending on the difference in the degree of integration.

Moreover, ways to achieve integration are not limited to the LSI, and a dedicated circuit or a general purpose processor can also achieve the integration. A field programmable gate array (FPGA) that allows programming or a reconfigurable processor that allows reconfiguration of the connections and settings of the circuit cells inside the LSI may also be used.

In addition, depending on the emergence of circuit integration technology that replaces LSI due to the progress of semiconductor technology or other derivative technology, such technology may of course be used to perform circuit integration of the constituent elements included in the image processing device, the image decoding device, and the image coding device.

Embodiment 16

Furthermore, by recording a program, which realizes the image coding method and the image decoding method described in each of the embodiments, onto a recording medium, it is possible to easily perform the processing as described in each of the embodiments in an independent computer system. The recording medium may be a magnetic disc, an optical disc, a magnet-optical disc, an integrated circuit (IC) card, or a semiconductor memory, as far as the media can record the program.

Furthermore, applications of the image coding method and the image decoding method described in each of the above embodiments, and a system using such applications are described below.

Figure 55:
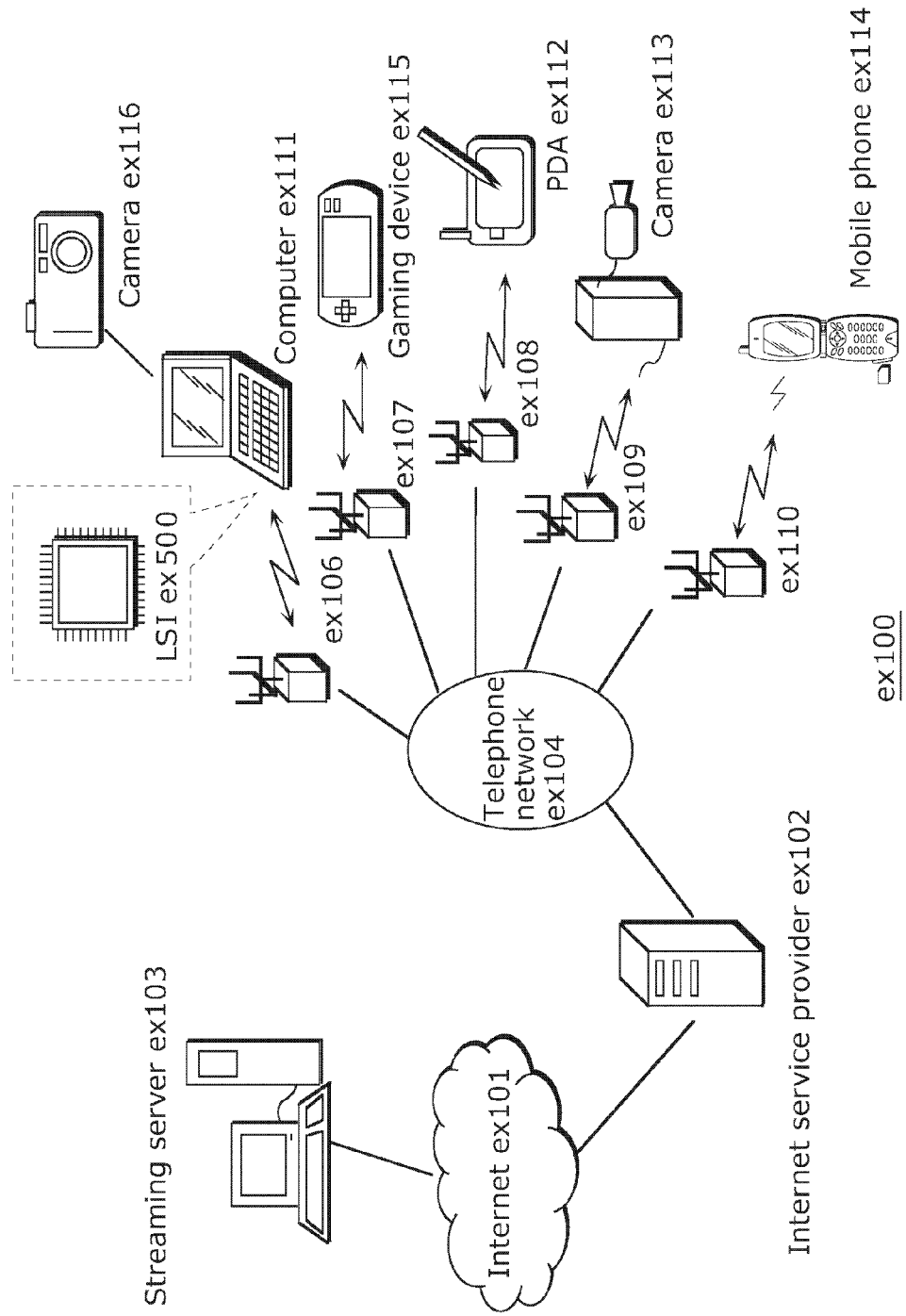
FIG. 55 illustrates an overall configuration of a content providing system for implementing content distribution services.

FIG. 55 is a block diagram showing the overall configuration of a content providing system ex100 for realizing content distribution service. The area for providing communication service is divided into cells of a desired size, and base stations ex106 to ex110 which are fixed wireless stations are placed in the respective cells.

In this content providing system ex100, various devices such as a computer ex111, a Personal Digital Assistant (PDA) ex112, a camera ex113, a mobile phone ex114 and a gaming machine ex115 are connected to one another, via a telephone network ex104 and base stations ex106 to ex110. Furthermore, the various devices are connected to the Internet ex101 via an Internet service provider ex102.

However, the content providing system ex100 is not limited to the combination as shown in FIG. 55, and may include a combination of any of these devices which are connected to each other. In addition, each device may be connected directly to the telephone network ex104, not through the base stations ex106 to ex110 which are fixed wireless stations. Furthermore, the devices may be connected directly to one another via Near Field Communication (NFC) or the like.

The camera ex113 is a device such as a digital video camera capable of shooting moving images. The camera ex116 is a device such as a digital video camera capable of shooting still images and moving images. The mobile phone ex114 may be any of a mobile phone of a Global System for Mobile Communications (GSM) system, a Code Division Multiple Access (CDMA) system, a Wideband-Code Division Multiple Access (W-CDMA) system, a Long Term Evolution (LTE) system, a High Speed Packet Access (HSPA) system, a Personal Handy-phone System (PHS), and the like.

In the content providing system ex100, the camera ex113 is connected to a streaming server ex103 via the base station ex109 and the telephone network ex104, which realizes live distribution or the like. In the live distribution, the coding as described in the above embodiments is performed for a content (such as a video of a live music performance) shot by a user using the camera ex113, and the coded content is provided to the streaming server ex103. On the other hand, the streaming server ex103 makes steam distribution of the received content data to the clients at their requests. The clients include the computer ex111, the PDA ex112, the camera ex113, the mobile phone ex114, the gaming machine ex115, and the like, capable of decoding the above-mentioned coded data. Each device receiving the distributed data decodes the received data to be reproduced.

Here, the coding of the data shot by the camera may be performed by the camera ex113, the streaming server ex103 for transmitting the data, or the like. Likewise, either the client or the streaming server ex103 may decode the distributed data, or both of them may share the decoding. In addition, the still image and/or moving image data shot by the camera ex116 may be transmitted not only to the camera ex113 but also to the streaming server ex103 via the computer ex111. In this case, either the camera ex116, the computer ex111, or the streaming server ex103 may perform the coding, or all of them may share the coding.

It should be noted that the above-described coding and the decoding are performed by a Large Scale Integration (LSI) ex500 generally included in each of the computer ex111 and the devices. The LSI ex500 may be implemented as a single chip or a plurality of chips. It should be noted that software for encoding and decoding images may be integrated into any of various type of recording media (such as a CD-ROM, a flexible disc and a hard disk) that is readable by the computer ex111 or the like, so that the encoding and decoding are performed by using the software. Furthermore, if the mobile phone ex114 is a camera-equipped mobile phone, it may transmit generated moving image data. This moving image data is the data coded by the LSI ex500 included in the mobile phone ex114.

It should be noted that the streaming server ex103 may be implemented as a plurality of servers or a plurality of computers, so that data is divided into pieces to be processed, recorded, and distributed separately.

As described above, the content providing system ex100 enables the clients to receive and reproduce coded data. Thus, in the content providing system ex100, the clients can receive information transmitted by the user, then decode and reproduce it, so that the user without specific rights nor equipment can realize individual broadcasting.

Figure 56:
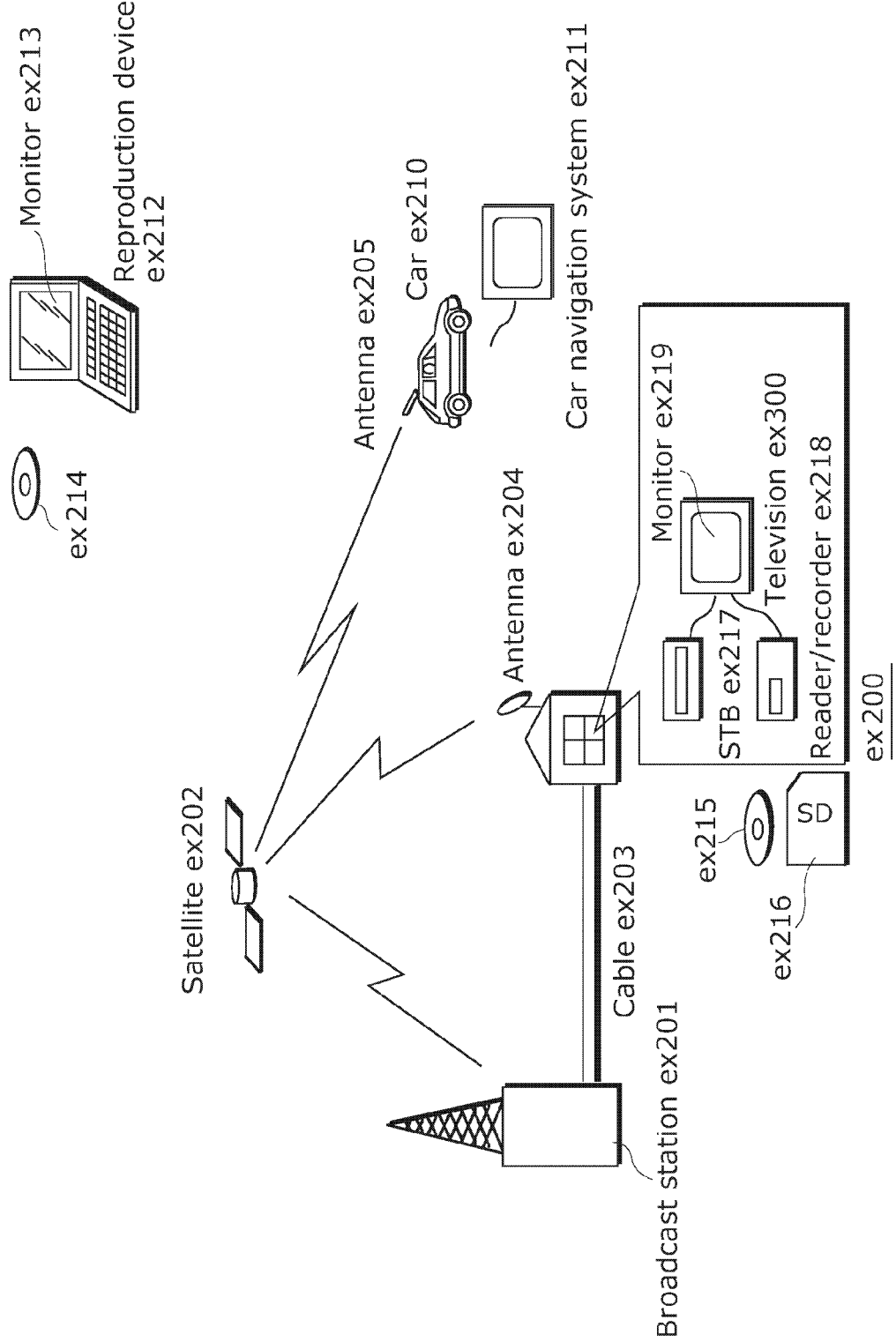
FIG. 56 illustrates an overall configuration of a digital broadcasting system.

The present invention is not limited to the example of the content providing system ex100. At least one of an image coding device and an image decoding device in the above embodiments can be incorporated into the digital broadcast system ex200 as shown in FIG. 56. More specifically, a bit stream of video information is transmitted from a broadcast station ex201 to a communication or broadcast satellite ex202 via radio waves. The bitstream is a coded bitstream generated by the image coding method described in the above embodiments. Upon receipt of it, the broadcast satellite ex202 transmits radio waves for broadcasting, and a home antenna ex204 with a satellite broadcast reception function receives the radio waves. A device such as a television (receiver) ex300 or a Set Top Box (STB) ex217 decodes the coded bit stream for reproduction.

The image decoding device apparatus described in the above embodiments can be implemented in a reproduction device ex212 for reading and decoding a coded bit stream recorded on a recording medium ex214 such as a CD and DVD that is a recording medium. In this case, the reproduced video signals are displayed on a monitor ex213.

The image decoding device or the image coding device described in the above embodiments can be implemented in a reader/recorder ex218 for reading and decoding a coded bitstream recorded on a recording medium ex215 such as a DVD and a BD or for coding and writing video signals into the recording medium ex215. In this case, the reproduced video signals are displayed on a monitor ex219, and the recording medium ex215, on which the coded bitstream is recorded, allows a different device of system to reproduce the video signals. It is also conceived to implement the image decoding device in the set top box ex217 connected to a cable ex203 for cable television or the antenna ex204 for satellite and/or terrestrial broadcasting so as to reproduce them on a monitor ex219 of the television. The image decoding device may be incorporated into the television, not in the set top box.

Figure 57:
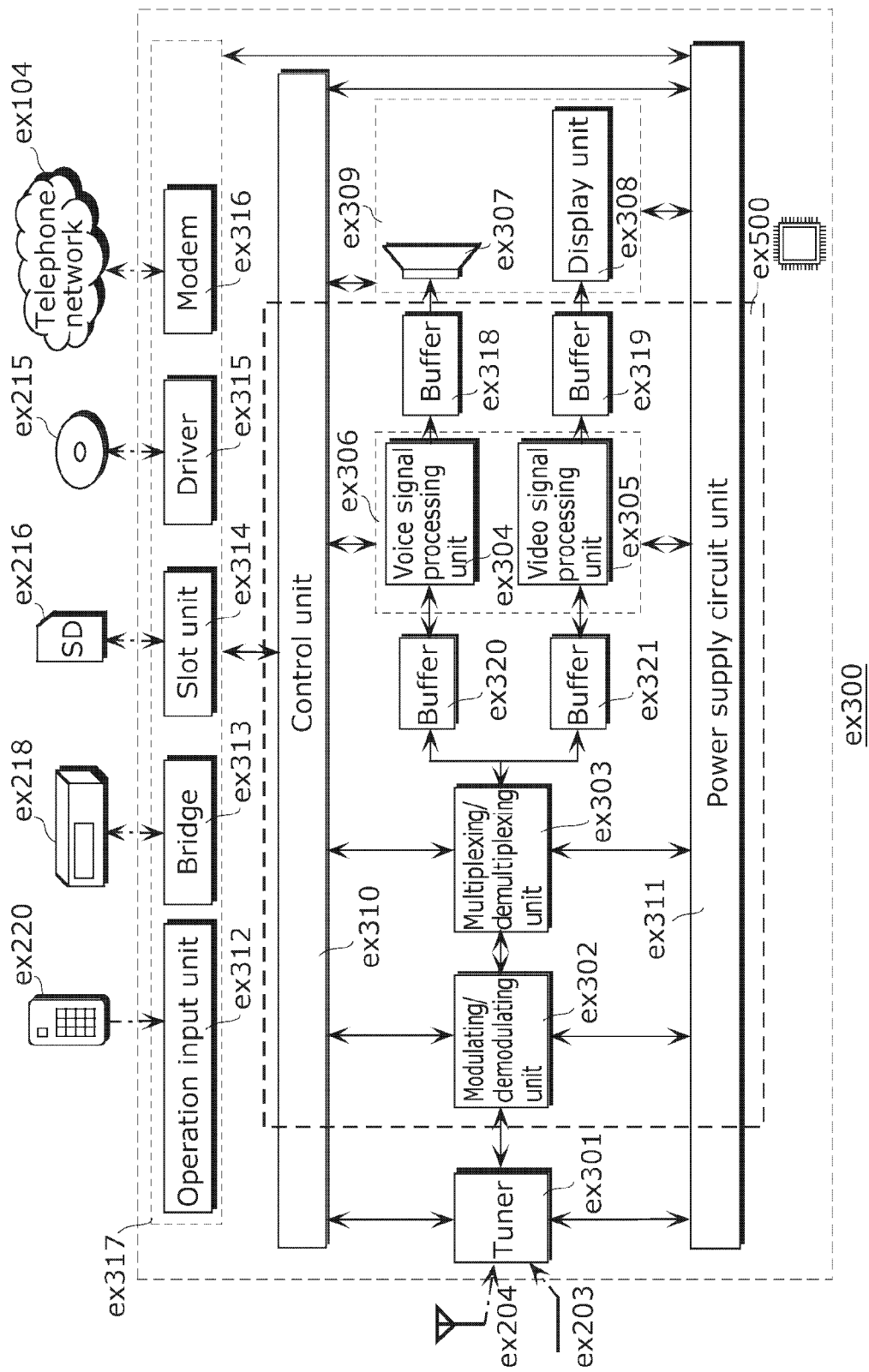
FIG. 57 is a block diagram illustrating an example of a configuration of a television.

FIG. 57 is a diagram showing a television (receiver) ex300 using the image decoding method described in the above embodiments. The television ex300 includes: a tuner ex301 that receives or outputs a bitstream of video information via the antenna ex204, the cable ex203, or the like that receives the above broadcasting; a modulating/demodulating unit ex302 that demodulates the received coded data or modulates generated coded data to be transmitted to the outside; and a multiplexing/demultiplexing unit ex303 that demultiplexes the modulated video data from the modulated audio data or multiplexes the coded video data and the coded audio data.

In addition, the television ex300 includes: a signal processing unit ex306 having (a) an audio signal processing unit ex304 that decodes or codes audio data and (b) a video signal processing unit ex305 that decodes or encodes video data; and an output unit ex309 having (c) a speaker ex307 that outputs the decoded audio signal and (d) a display unit ex308, such as a display, that displays the decoded video signal. Furthermore, the television ex300 includes an interface unit ex317 having an operation input unit ex312 that receives inputs of user operations, and the like. Moreover, the television ex300 includes: a control unit ex310 for the overall controlling of the respective units; and a power supply circuit unit ex311 that supplies the respective units with power.

In addition to the operation input unit ex312, the interface unit ex317 may include: a bridge ex313 connected to external devices such as the reader/recorder ex218; a slot unit ex314 enabling the recording medium ex216 such as an SD card to be attached to the interface unit ex317; a driver ex315 for connecting to an external recording medium such as a hard disk; a modem ex316 connected to a telephone network; and the like. It should be noted that the recording medium ex216 enables information to be electrically recorded on a stored nonvolatile/volatile semiconductor memory device.

The units in the television ex300 are connected to one another via a synchronous bus.

First, the description is given for the structure by which the television ex300 decodes and reproduces data received from the outside via the antenna ex204 or the like. The television ex300 receives a user operation from a remote controller ex220 or the like. Then, under control of the control unit ex310 having a CPU and the like, the television ex300 demodulates video data and audio data at the modulating/demodulating unit ex302, and demultiplexes the demodulated video data from the demodulated audio data at the multiplexing/demultiplexing unit ex303. In addition, the television ex300 decodes the demultiplexed audio data at the audio signal processing unit ex304, and decodes the demultiplexed video data at the video signal processing unit ex305 using the decoding method described in the above embodiments. The decoded audio signal and the decoded video signal are separately outputted from the output unit ex309 to the outside. When outputting the signals, the signals may be temporarily stored in, for example, buffers ex318 and ex319, so that the audio signal and the video signal are reproduced in synchronization with each other. Furthermore, the television ex300 may read the coded bitstream, not from broadcasting or the like but from the recording media ex215 and ex216 such as a magnetic/optical disc and a SD card.

Next, the description is given for the structure by which the television ex300 codes audio signal and video signal, and transmits the coded signals to the outside or writes them onto a recording medium or the like. The television ex300 receives a user operation from the remote controller ex220 or the like, and then, under control of the control unit ex310, codes audio signal at the audio signal processing unit ex304, and codes video data at the video signal processing unit ex305 using the coding method described in the above embodiments. The coded audio signal and the coded video signal are multiplexed at the multiplexing/demultiplexing unit ex303 and then outputted to the outside. When multiplexing the signals, the signals may be temporarily accumulated in, for example, buffers ex320 and ex321, so that the audio signal and the video signal are in synchronization with each other.

It should be noted that the buffers ex318 to ex321 may be implemented as a plurality of buffers as shown, or may share one or more buffers. It should also be noted that, besides the shown structure, it is possible to include a buffer, for example, between the modulating/demodulating unit ex302 and the multiplexing/demultiplexing unit ex303, so that the buffer serves as a buffer preventing system overflow and underflow, and thereby accumulate data in the buffer.

It should also be noted that, in addition to the structure for receiving audio data and video data from broadcasting, recording media, and the like, the television ex300 may also have a structure for receiving audio inputs from a microphone and a camera, so that the coding is preformed for the received data. Here, although it has been described that the television ex300 can perform the above-described coding, multiplexing, and providing to the outside, it is also possible that the television ex300 cannot perform all of them but can perform one of the coding, multiplexing, and providing to the outside.

It should be noted that, when the reader/recorder ex218 is to read or write a coded bitstream from/into a recording medium, either the television ex300 or the reader/recorder ex218 may perform the above-described decoding or encoding, or the television ex300 and the reader/recorder ex218 may share the above-described decoding or encoding.

Figure 58:
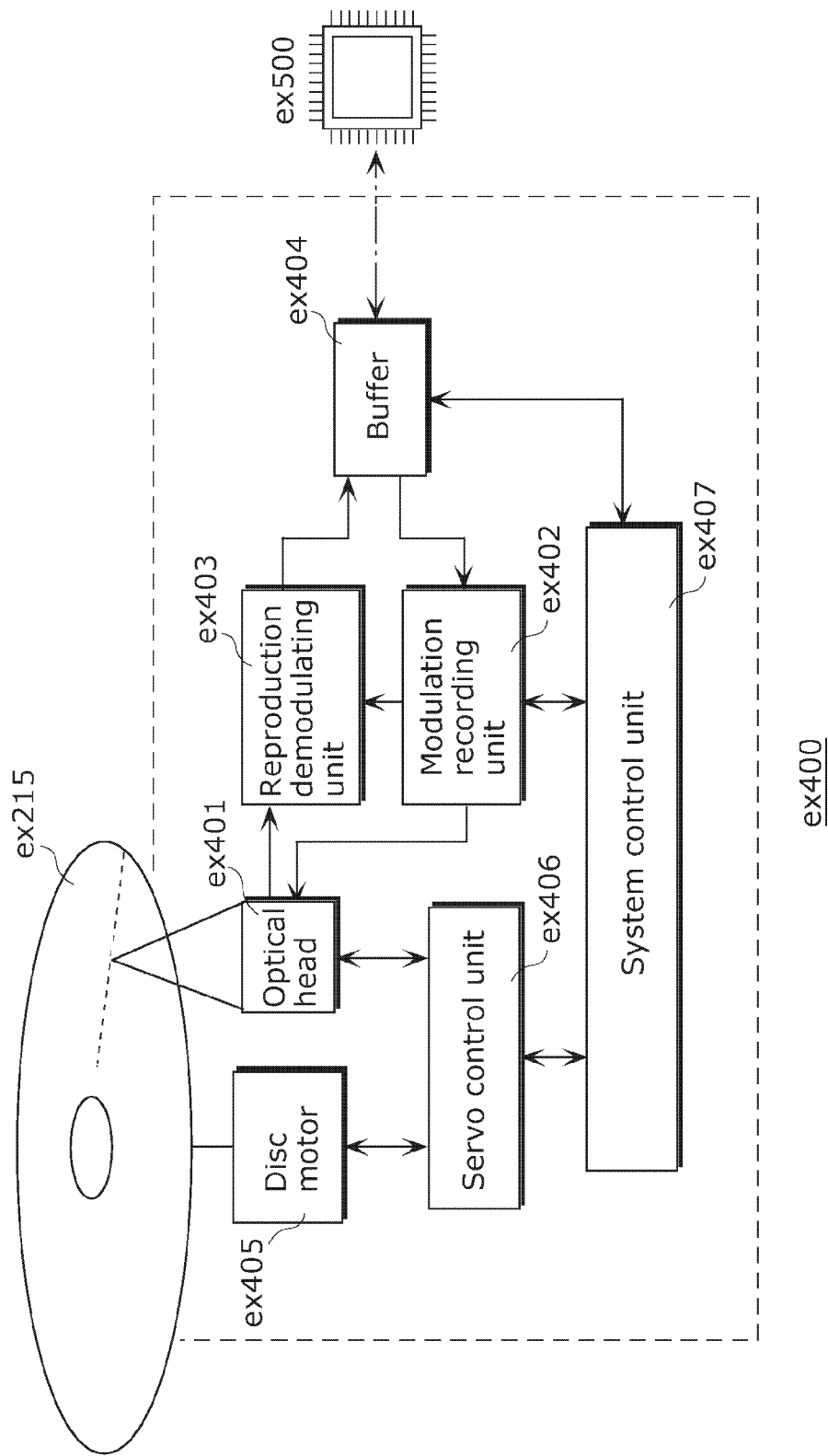
FIG. 58 is a block diagram illustrating an example of a configuration of an information reproducing/recording unit that reads and writes information from and on a recording medium that is an optical disk.

As an example, FIG. 58 shows a structure of an information reproducing/recording unit ex400 in the case where data is read from or written into an optical disc. The information reproducing/recording unit ex400 includes the following units ex401 to ex407.

The optical head ex401 writes information into the recording medium ex215 as an optical disc by irradiating laser spot on a recording surface of the recording medium ex215, and reads information from the recording medium ex215 by detecting light reflected on the recording surface of the recording medium ex215. The modulation recording unit ex402 electrically drives a semiconductor laser included in the optical head ex401, and thereby modulates laser light according to recorded data. A reproduction demodulating unit ex403 amplifies reproduction signal that is obtained by electrically detecting light reflected on the recording surface by a photo detector included in the optical head ex401, then demultiplexes and demodulates signal components recorded on the recording medium ex215, and reproduces necessary information. A buffer ex404 temporarily stores the information to be recorded onto the recording medium ex215, and the information reproduced from the recording medium ex215. A disc motor ex405 rotates the recording medium ex215. A servo control unit ex406 moves the optical head ex401 to a predetermined information track while controlling rotation driving of the disc motor ex405, thereby performing tracking processing of the laser spot.

The system control unit ex407 controls the overall information reproducing/recording unit ex400. The above-described reading and writing are realized when the system control unit ex407 records and reproduces information via the optical head ex401 while cooperating the modulation recording unit ex402, the reproduction demodulating unit ex403, and the servo control unit ex406, by using various information stored in the buffer ex404 and new information generated and added as needed. The system control unit ex407 includes, for example, a microprocessor, and performs the above processing by executing a reading/writing program.

Although it has been described above that the optical head ex401 irradiates laser spot, the optical head ex401 may perform higher-density recording by using near-field light.

Figure 59:
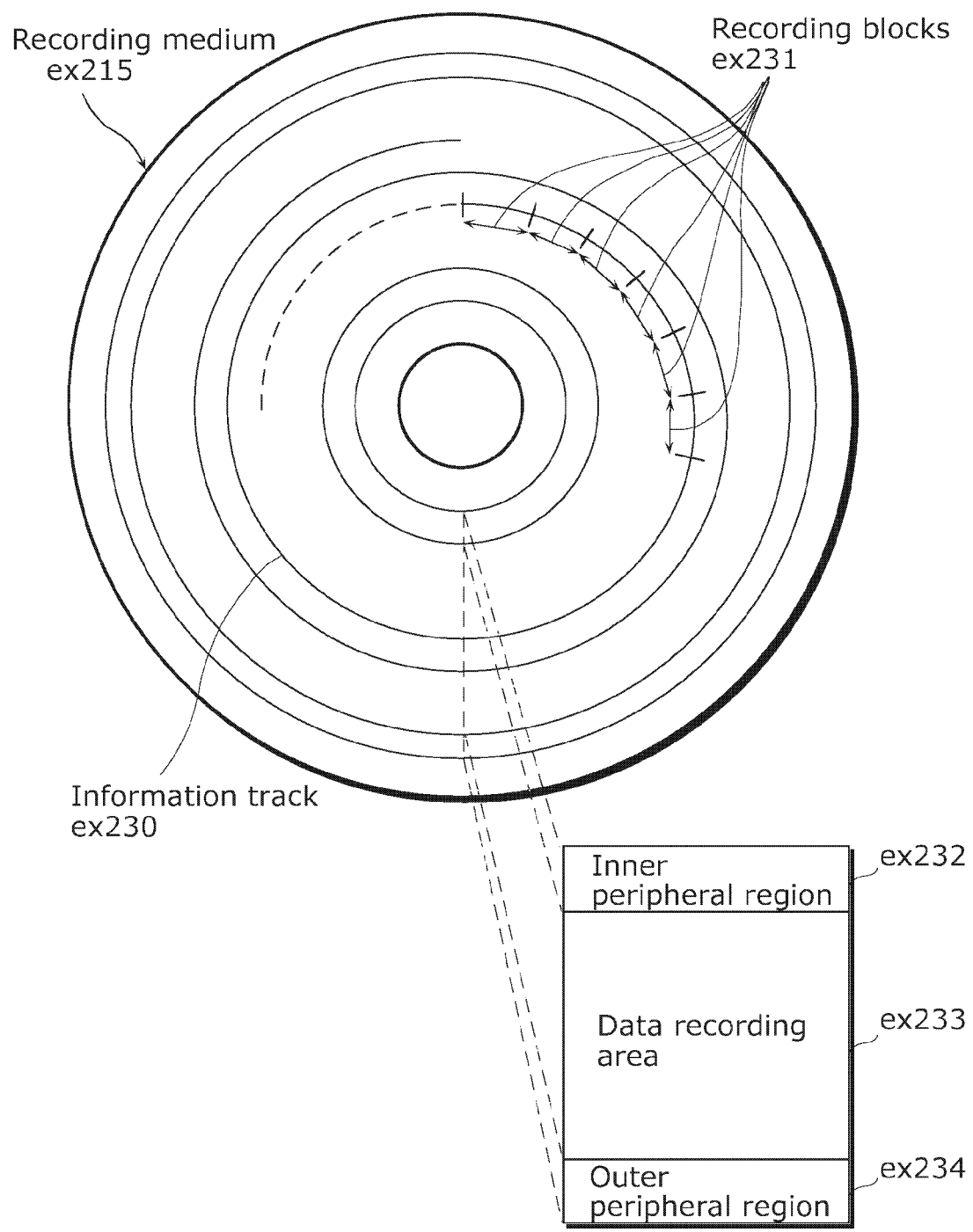
FIG. 59 illustrates an example of a configuration of a recording medium that is an optical disk.

FIG. 59 shows a schematic diagram of the recording medium ex215 that is an optical disc. On the recording surface of the recording medium ex215, guide grooves are formed in a spiral shape, and on an information track ex230, address information indicating an absolute position on the disc is previously recorded using a change of the groove shape. The address information includes information for identifying a position of a recording block ex231 that is a unit for recording data, and a devise performing recording and reproduction is capable of specifying the recording block by reproducing the information track ex230 to read the address information. Moreover, the recording medium ex215 includes a data recording region ex233, an inner peripheral region ex232, and an outer peripheral region ex234. The data recording region ex233 is a region on which user data is recorded. The inner peripheral region ex232 and the outer peripheral region ex234 which are provided in the inner periphery and the outer periphery, respectively, of the data recording region ex233 are for specific uses except the user data recording.

The information reproducing/recording unit ex400 reads/writes coded audio data and video data or coded data generated by multiplexing them, from/into such data recording region ex233 of the recording medium ex215.

Although the above has been described giving the example of a one-layer optical disc such as a DVD or a BD, the optical disc is not limited to the above but may be a multi-layer optical disc so that data can be recorded onto other regions in addition to the surface. Furthermore, the optical disc may have a structure for multidimensional recording/reproducing, such as data recording using color lights having various different wavelengths on the same position of the disc, or recording of layers of different pieces of information from various angles.

It should also be noted that it is possible in the digital broadcasting system ex200 that the car ex210 having the antenna ex205 receives data from the satellite ex202 or the like, and reproduces moving images on the display device such as the car navigation system ex211 or the like in the car ex210. As for the configuration of the car navigation system ex211, a configuration added with a GPS receiving unit to the units as shown in FIG. 57, is conceivable. The same applies to the computer ex111, the mobile phone ex114 and others. Moreover, likewise the television ex300, three types of implementations can be conceived for a terminal such as the above-mentioned mobile phone ex114: a communication terminal equipped with both an encoder and a decoder; a sending terminal equipped with an encoder only; and a receiving terminal equipped with a decoder only.

Thus, the image coding method and the image decoding method described in the above embodiments can be used in any of the above-described devices and systems, and thereby the effects described in the above embodiments can be obtained.

It should be noted that the present invention is not limited to the above embodiments but various variations and modifications are possible in the embodiments without departing from the scope of the present invention.

Embodiment 17

Figure 60:
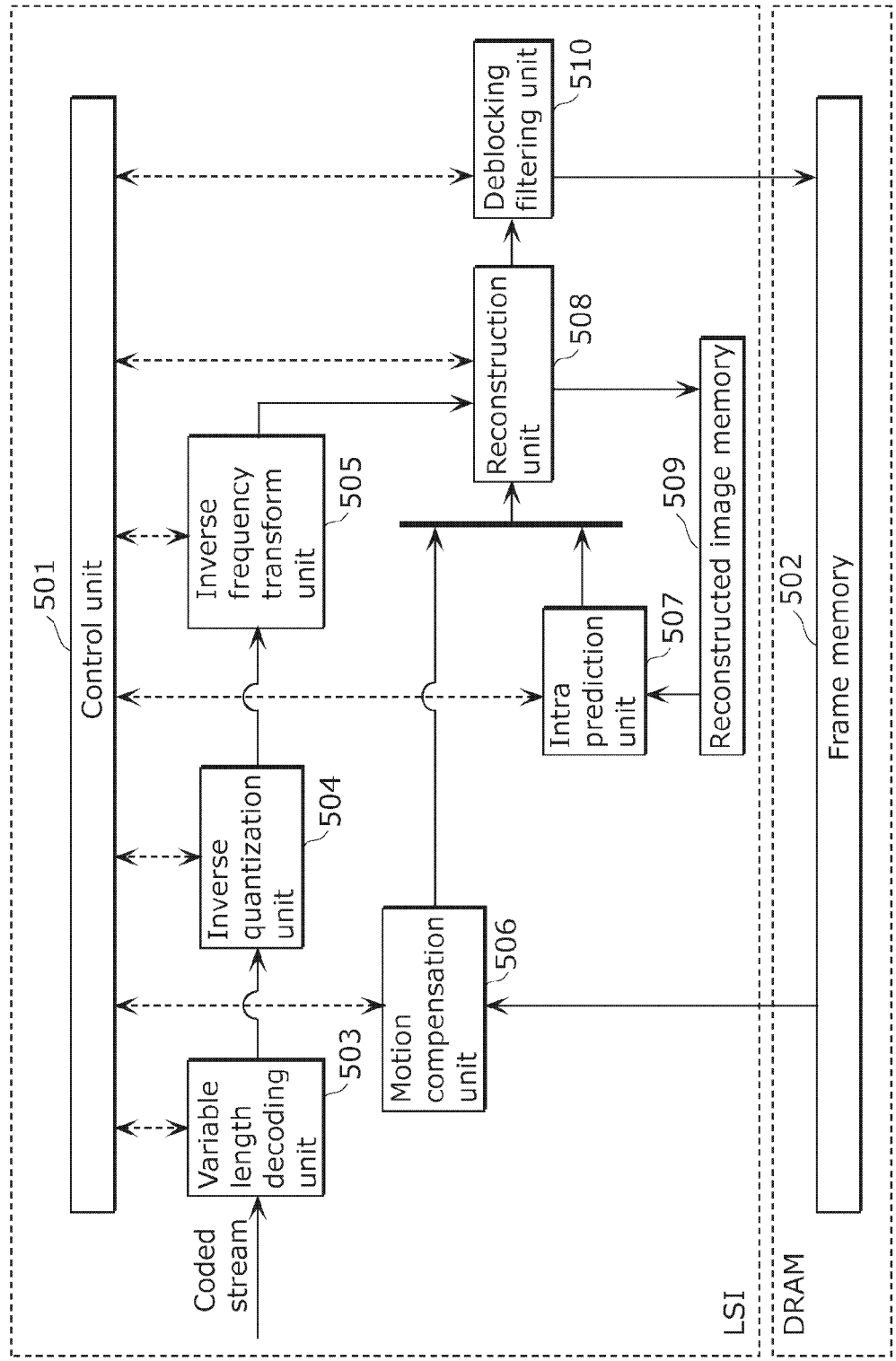
FIG. 60 illustrates an example of a configuration of an integrated circuit for executing image decoding processing.

In this embodiment, the image decoding device according to Embodiment 1 is typically implemented into a Large Scale Integration (LSI) which is an integrated circuit. FIG. 60 shows this embodiment. A frame memory 502 is implemented into a DRAM and the other circuits and memories are implemented into the LSI. A stream buffer for storing a bitstream may be realized on the DRAM.

These structural elements may be integrated separately, or a part or all of them may be integrated into a single chip. Here, the integrated circuit is referred to as an LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements. Application of biotechnology is one such possibility.

Moreover, the semiconductor chip on which the image decoding device according to the embodiments is combined with a display for drawing images to form an image drawing device depending on various applications. The present invention can thereby be used as an information drawing means for a mobile phone, a television set, a digital video recorder, digital camcorder, a vehicle navigation device, and the like. The display in the combination may be a cathode-ray tube (CRT), a flat display such as a liquid crystal display, a plasma display panel (PDP), or an organic light emitting display (OLED), a projection display represented by a projector, or the like.

It should also be noted that the LSI according to this embodiment may perform encoding and decoding in cooperation with a bitstream buffer on which coded streams are accumulated and a Dynamic Random Access Memory (DRAM) including a frame memory on which images are accumulated. The LSI according to this embodiment may be cooperated not with a DRAM, but with a different storage device such as an embedded DRAM (eDRAM), a Static Random Access Memory (SRAM), or a hard disk.

Embodiment 18

Figure 61:
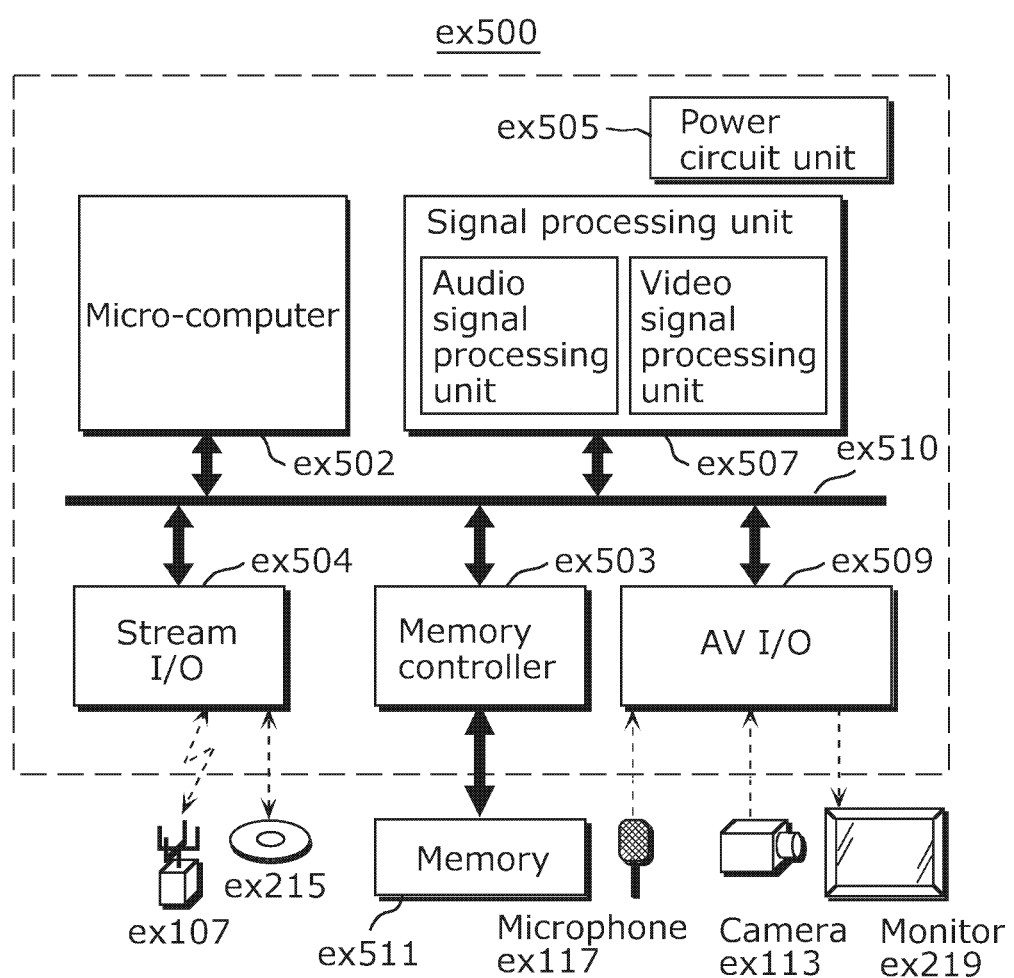
FIG. 61 illustrates an example of a configuration of an integrated circuit for executing image decoding processing and image coding processing.
Figure 62:
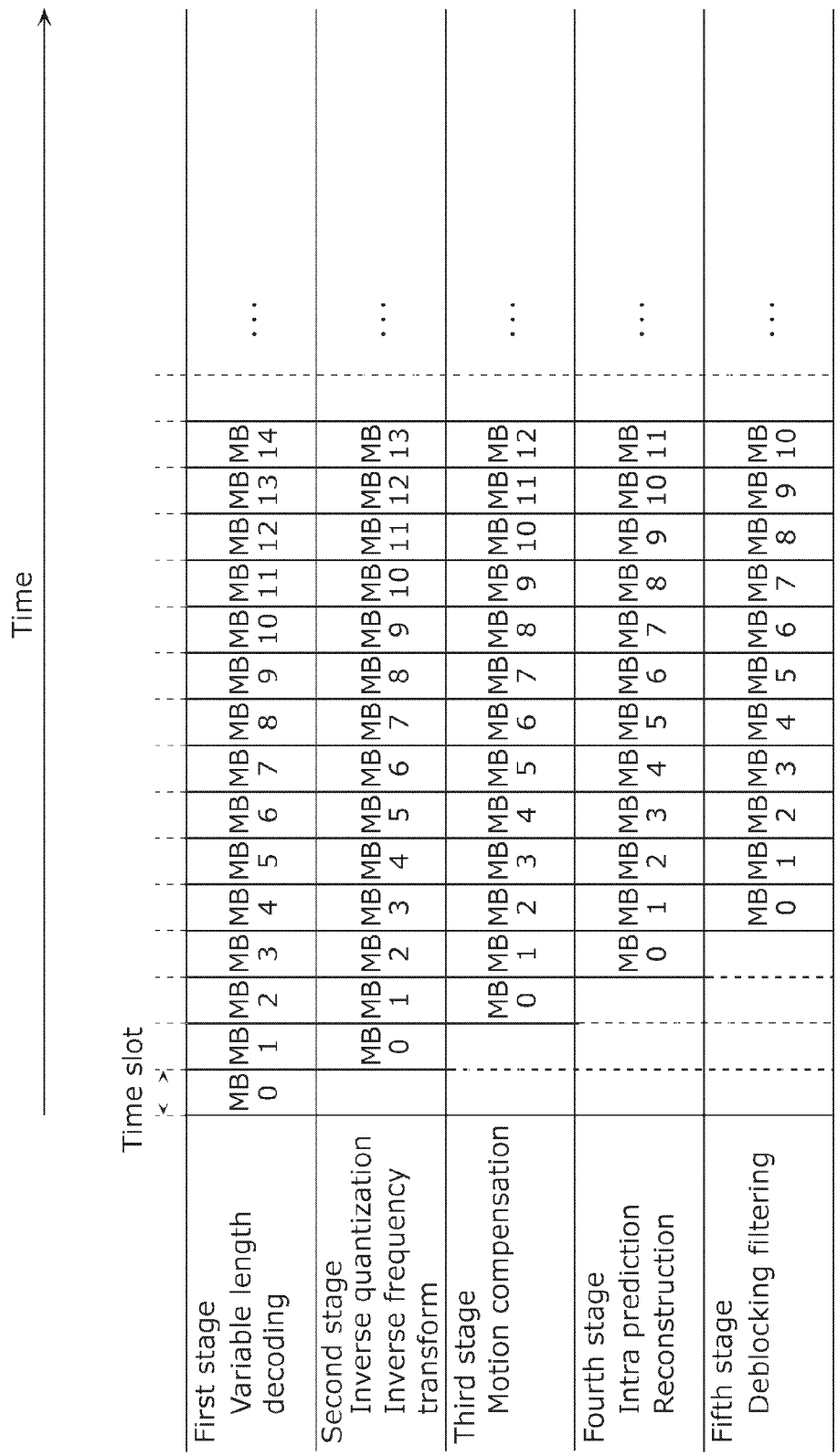
FIG. 62 is an explanatory diagram illustrating pipeline processing according to conventional technology.
Figure 63:
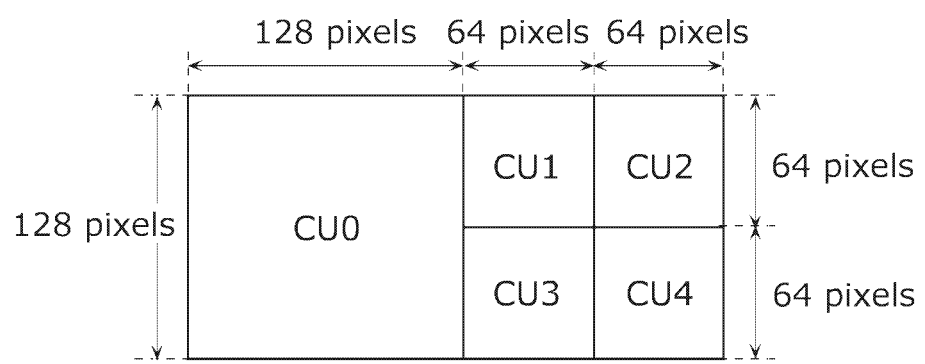
FIG. 63 is an explanatory diagram illustrating blocks having changeable sizes according to conventional technology.

In this embodiment, the image coding device, the image decoding device, the image coding method, and the image decoding method which have been described in the above embodiments are typically implemented into a Large Scale Integration (LSI) which is an integrated circuit. As an example, FIG. 61 shows a structure of an LSI ex500 on which they are integrated into a single chip. The LSI ex500 includes the following units ex502 to ex509 which are connected to one another via a bus ex510. When a power source is ON, a power supply circuit unit ex505 supplies power to each of the units to activate them to be capable of operating.

For example, in the case of coding, the LSI ex500 receives input audio/visual (AV) signals from an AV I/O ex509 via the microphone ex117, the camera ex113, or the like. The input AV signals are temporarily stored in an external memory ex511 such as an SDRAM. The accumulated data is, for example, divided into a plurality of times depending on a processing amount and a processing speed, and eventually provided to a signal processing unit ex507. The signal processing unit ex507 performs coding of audio signal and/or coding of video signal. Here, the coding of video signal is the coding described in the above embodiments. Furthermore, the signal processing unit ex507 performs multiplexing of the coded audio data and the coded video data and other processing as needed, and provides the resulting data from a stream I/O ex504 to the outside. The output bitstream is transmitted to the base station ex107, or written to the recording medium ex215.

Moreover, for example, in the case of decoding, under the control of the microcomputer ex502, the LSI ex500 temporarily accumulates, to a memory ex511 or the like, coded data that is obtained using the stream I/O ex504 via the base station ex107, or coded data that is obtained by reading it from the recording medium ex215. Under control of the microcomputer ex502, the accumulated data is, for example, divided into a plurality of times depending on a processing amount and a processing speed, and eventually provided to the signal processing unit ex507. The signal processing unit ex507 performs decoding of audio signal and/or decoding of video signal. Here, the decoding of a video signal is the decoding described in the above embodiments. It is preferable that the decoded audio signal and the decoded video signal are temporarily stored in the memory ex511 or the like as needed, so that they can be reproduced in synchronization with each other. The decoded output signal is outputted from the AV I/O ex509 to the monitor ex219 or the like appropriately via the memory ex511 or the like. The access to the memory ex511 is actually performed via the memory controller ex503.

Although it has been described above that the memory ex511 is outside the LSI ex500, the memory ex511 may be included in the LSI ex500. It is possible that the LSI ex500 may be integrated into a single chip, or may be integrated separately.

Here, the integrated circuit is referred to as an LSI, but the integrated circuit can be called an IC, a system LSI, a super LSI or an ultra LSI depending on their degrees of integration.

Moreover, ways to achieve integration are not limited to the LSI, and a special circuit or a general purpose processor and so forth can also achieve the integration. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements. Application of biotechnology is one such possibility.

INDUSTRIAL APPLICABILITY

The image processing device according to the present invention is applicable to various usages. For example, the image processing device is applicable to high resolution information display devices and image capturing devices such as television, digital video recorders, car navigation systems, mobile phones, digital cameras, and digital video cameras, and thus is of high utility value.

REFERENCE SIGNS LIST 501, 2110, 2210, 2310, 2410, 2510, ex310 Control unit
502 Frame memory
503 Variable length decoding unit
504 Inverse quantization unit
505 Inverse frequency transform unit
506, 520 Motion compensation unit
507, 521, 710 Intra prediction unit
508, 712 Reconstruction unit
509 Reconstructed image memory
510 Deblocking filtering unit
511, ex511 Memory
601 Motion compensation block division unit
602 Reference image obtaining unit
603 Motion compensation arithmetic unit
701 Intra prediction block division unit
702 Reconstructed image obtaining unit
703 intra prediction arithmetic unit
711 Switch
2100, 2200, 2300, 2400, 2500 Image processing device
2121, 2122, 2221, 2222, 2223, 2321, 2421, 2521 Process unit
2111, 2211, 2311, 2411, 2511 Plural first process units
2212 Second plural process units
2322 Motion compensation process unit
2422 Intra prediction process unit
2522, 2611, 2711 Deblocking filtering process unit
2600, 2700, 2800 Image coding device
2610, 2811 Coding process unit
2710, 2810 Frequency transform process unit
ex100 Content providing system
ex101 Internet
ex102 Internet service provider
ex103 Streaming server
ex104 Telephone network
ex106, ex107, ex108, ex109, ex110 Base station
ex111 Computer
ex112 Personal Digital Assistant (PDA)
ex113, ex116 Camera
ex114 Mobile phone
ex115 Gaming machine
ex117 Microphone
ex200 Digital broadcasting system
ex201 Broadcast station
ex202 Broadcast satellite (satellite)
ex203 Cable
ex204, ex205 Antenna
ex210 Car ex211 Car navigation system
ex212 Reproduction device
ex213, ex219 Monitor
ex214, ex215, ex216 Recording medium
ex217 Set Top Box (STB)
ex218 Reader/recorder
ex220 Remote controller
ex230 Information track
ex231 Recording block
ex232 Inner peripheral region
ex233 Data recording region
ex234 Outer peripheral region
ex300 Television (receiver)
ex301 Tuner
ex302 Modulating/demodulating unit
ex303 Multiplexing/demultiplexing unit
ex304 Audio signal processing unit
ex305 Video signal processing unit
ex306, ex507 Signal processing unit
ex307 Speaker
ex308 Display unit
ex309 Output unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321, ex404 Buffer
ex400 Information reproducing/recording unit
ex401 Optical head
ex402 Modulation recording unit
ex403 Reproduction demodulating unit
ex405 Disc motor
ex405 Servo control unit
ex407 System control unit
ex500 LSI
ex502 Microcomputer
ex503 Memory controller
ex504 Stream I/O
ex509 AV I/O
ex510 Bus

The invention claimed is:

1. An image processing device which performs plural first processes, by pipelining, on a coded stream obtained by dividing an image into plural coding unit blocks according to at least two numbers of pixels and coding the image on a coding unit block-by-block basis, the image processing device comprising:
plural first process units configured to perform, by the pipelining, the plural first processes on the coded stream by each executing one of the plural first processes; and
a control unit configured to divide or connect portions of the coded stream into plural first processing unit blocks according to a first number of pixels, each of the first processing unit blocks having the same number of pixels in the image, and control the plural first process units to cause the plural first processes to be executed for each of the first processing unit blocks.

2. The image processing device according to claim 1,
wherein the plural first process units are configured to perform, on the coded stream, the plural first processes for decoding the image.

3. The image processing device according to claim 1,
wherein the control unit is configured to divide or connect the portions of the coded stream into the plural first processing unit blocks by dividing a coding unit block included in the coded stream or uniting at least two coding unit blocks included in the coded stream, and control the plural first process units to cause the plural first processes to be executed for each of the first processing unit blocks.

4. The image processing device according to claim 1,
wherein the control unit is configured to control the plural first process units to cause each of the plural first processes to be executed on each of the plural first processing unit blocks in a predetermined period.

5. The image processing device according to claim 1,
wherein the control unit is configured to divide or connect the portions of the coded stream into the plural first processing unit blocks, and control the plural first process units to cause the plural first processes to be executed for each of the first processing unit blocks, the coded stream being obtained by dividing the image into the plural coding unit blocks which are smallest units for each of which inter prediction and intra prediction are switchable, and coding the image on the coding unit block-by-block basis.

6. The image processing device according to claim 1,
wherein the control unit is configured to divide or connect the portions of the coded stream into the plural first processing unit blocks according to the first number of pixels, the first number of pixels being predetermined to be the number of pixels of a largest coding unit block, and control the plural first process units to cause the plural first processes to be executed for each of the first processing unit blocks.

7. The image processing device according to claim 1,
wherein the control unit is configured to divide or connect the portions of the coded stream into the plural first processing unit blocks according to the first number of pixels, the first number of pixels being predetermined to be the number of pixels of a largest frequency transform block, and control the plural first process units to cause the plural first processes to be executed for each of the first processing unit blocks.

8. The image processing device according to claim 1,
wherein the plural first process units include plural second process units configured to execute plural second processes included in the plural first processes, and
the control unit is configured to divide the plural first processing unit blocks into plural second processing unit blocks according to a second number of pixels, the second processing unit blocks having the same number of pixels in the image, and the second number of pixels being smaller than the first number of pixels, and control the plural second process units to cause the plural second processes to be executed for each of the second processing unit blocks.

9. The image processing device according to claim 1,
wherein the plural first process units include plural second process units configured to execute plural second processes included in the plural first processes, and
the control unit is configured to divide the plural first processing unit blocks into plural second processing unit blocks according to at least two numbers of pixels, each of the at least two numbers of pixels being equal to or smaller than the first number of pixels, and control the plural second process units to cause the plural second processes to be executed for each of the second processing unit blocks.

10. The image processing device according to claim 9,
wherein the control unit is configured to divide the plural first processing unit blocks into the plural second processing unit blocks to separate luma information and chroma information, and control the plural second process units to cause the plural second processes to be executed for each of the second processing unit blocks.

11. The image processing device according to claim 10,
wherein the plural first process units include a motion compensation process unit configured to execute a motion compensation process, the control unit is configured to divide the plural first processing unit blocks into plural third processing unit blocks according to a number of pixels smaller than the first number of pixels, and control the motion compensation process unit to cause the motion compensation process to be executed for each of the third processing unit blocks, and the control unit is configured to divide the plural first processing unit blocks into the plural third processing unit blocks each including the luma information and the chroma information.

12. The image processing device according to claim 7,
wherein the plural first process units include a motion compensation process unit configured to execute a motion compensation process, and when a prediction block to be used for the motion compensation process has a number of pixels larger than the first number of pixels, the control unit is configured to divide the prediction block into the plural first processing unit blocks, and control the motion compensation process unit to cause the motion compensation process to be executed for each of the first processing unit blocks.

13. The image processing device according to claim 7,
wherein the plural first process units include an intra prediction process unit configured to execute an intra prediction process, and when a prediction block to be used for the intra prediction process has a number of pixels larger than the first number of pixels, the control unit is configured to divide the prediction block into the plural first processing unit blocks, and control the intra prediction process unit to cause the intra prediction process to be executed for each of the first processing unit blocks.

14. The image processing device according to claim 7,
wherein the plural first process units include a deblocking filtering process unit configured to execute a deblocking filtering process for eliminating coding distortion at a block boundary, and the control unit is configured to control the deblocking filtering process unit to cause the deblocking filtering process to be executed for each of frequency transform blocks according to order in which a frequency transform process has been executed when the image is coded.

15. An image processing method for performing plural first processes, by pipelining, on a coded stream obtained by dividing an image into plural coding unit blocks according to at least two numbers of pixels and coding the image on a coding unit block-by-block basis, the image processing method comprising:
(a) performing, by the pipelining, the plural first processes on the coded stream by executing each of the plural first processes; and
(b) dividing or connect portions of the coded stream into plural first processing unit blocks according to a first number of pixels, each of the first processing unit blocks having the same number of pixels in the image, and controlling step (a) to cause the plural first processes to be executed for each of the first processing unit blocks.

16. A non-transitory computer-readable recording medium having stored therein a program for causing a computer to execute the image processing method according to claim 15.

17. An integrated circuit for performing plural first processes, by pipelining, on a coded stream obtained by dividing an image into plural coding unit blocks according to at least two number of pixels and coding the image on a coding unit block-by-block basis, the integrated circuit comprising:
plural first process units configured to perform, by the pipelining, the plural first processes on the coded stream by each executing one of the plural first processes; and
a control unit configured to divide or connect portions of the coded stream into plural first processing unit blocks according to a first number of pixels, each of the first processing unit blocks having the same number of pixels in the image, and control the plural first process units to cause the plural first processes to be executed for each of the first processing unit blocks.

* * * * *